US008738103B2

(12) United States Patent
Puente Baliarda et al.
(10) Patent No.: US 8,738,103 B2
(45) Date of Patent: May 27, 2014

(54) MULTIPLE-BODY-CONFIGURATION MULTIMEDIA AND SMARTPHONE MULTIFUNCTION WIRELESS DEVICES

(75) Inventors: Carles Puente Baliarda, Sant Cugat del Valles (ES); Josep Mumbru, Barcelona (ES); Jordi Ilario, Barcelona (ES)

(73) Assignee: Fractus, S.A., Barcelona (ES)

( * ) Notice: Subject to any disclaimer, the term of this patent is extended or adjusted under 35 U.S.C. 154(b) by 777 days.

(21) Appl. No.: 11/614,429

(22) Filed: Dec. 21, 2006

(65) Prior Publication Data

US 2008/0018543 A1 Jan. 24, 2008

Related U.S. Application Data

(60) Provisional application No. 60/831,544, filed on Jul. 18, 2006, provisional application No. 60/856,410, filed on Nov. 3, 2006.

(30) Foreign Application Priority Data

Jul. 18, 2006 (EP) .................................... 06117352

(51) Int. Cl.
*H04M 1/00* (2006.01)

(52) U.S. Cl.
USPC ....................................................... 455/575.7

(58) Field of Classification Search
USPC ........................................... 455/575.5, 575.7
See application file for complete search history.

(56) References Cited

U.S. PATENT DOCUMENTS 3,079,602 A 2/1963 Du Hamel et al.
3,521,284 A 7/1970 Shelton
3,599,214 A 8/1971 Altmayer
3,622,890 A 11/1971 Fujimoto
3,683,376 A 8/1972 Pronovost
3,683,379 A 8/1972 Saddler et al.
3,689,929 A 9/1972 Moody
(Continued)

FOREIGN PATENT DOCUMENTS

CA 2382128 A1 3/2001
CA 2416437 A1 1/2002
(Continued)

OTHER PUBLICATIONS

Guterman, J., et al, "Dual-band miniaturized microstrip fractal antenna for a small GSM1800+UMTS mobile handset", IEEE Melecon 2004, May 12-15, 2004, Croatia.

(Continued)

*Primary Examiner* — Marisol Figueroa

(74) *Attorney, Agent, or Firm* — Edell, Shapiro & Finnan, LLC

(57) ABSTRACT

A multifunction wireless device having at least one of multimedia functionality and smartphone functionality, the multifunction wireless device including an upper body and a lower body, the upper body and the lower body being adapted to move relative to each other in at least one of a clamshell, a slide, and a twist manner. The multifunction wireless device further includes an antenna system disposed within at least one of the upper body and the lower body and having a shape with a level of complexity of an antenna contour defined by complexity factors $F_{21}$ having a value of at least 1.05 and not greater than 1.80 and $F_{32}$ having a value of at least 1.10 and not greater than 1.90.

20 Claims, 27 Drawing Sheets

(56) References Cited

U.S. PATENT DOCUMENTS

| | | | |
|---|---|---|---|
| 3,818,490 | A | 6/1974 | Leahy |
| 3,967,276 | A | 6/1976 | Goubau |
| 3,969,730 | A | 7/1976 | Fuchser |
| 4,021,810 | A | 5/1977 | Urpo |
| 4,024,542 | A | 5/1977 | Ikawa |
| 4,038,662 | A | 7/1977 | Turner |
| 4,072,951 | A | 2/1978 | Kaloi |
| 4,131,893 | A | 12/1978 | Munson |
| 4,141,016 | A | 2/1979 | Nelson |
| 4,318,109 | A | 3/1982 | Weathers |
| 4,356,492 | A | 10/1982 | Kaloi |
| 4,381,566 | A | 4/1983 | Kane |
| 4,471,358 | A | 9/1984 | Glasser |
| 4,471,493 | A | 9/1984 | Shober |
| 4,504,834 | A | 3/1985 | Garay |
| 4,536,725 | A | 8/1985 | Hübler |
| 4,543,581 | A | 9/1985 | Nemet |
| 4,571,595 | A | 2/1986 | Phillips |
| 4,584,709 | A | 4/1986 | Kneisel |
| 4,590,614 | A | 5/1986 | Erat |
| 4,608,572 | A | 8/1986 | Blakney et al. |
| 4,623,894 | A | 11/1986 | Lee |
| 4,628,322 | A | 12/1986 | Marko et al. |
| 4,673,948 | A | 6/1987 | Kuo |
| 4,723,305 | A | 2/1988 | Phillips |
| 4,730,195 | A | 3/1988 | Phillips |
| 4,752,968 | A | 6/1988 | Lindenmeier et al. |
| 4,827,266 | A | 5/1989 | Sato et al. |
| 4,827,271 | A | 5/1989 | Berneking et al. |
| 4,839,660 | A | 6/1989 | Hadzoglou |
| 4,843,468 | A | 6/1989 | Drewery |
| 4,847,629 | A | 7/1989 | Shimazaki |
| 4,849,766 | A | 7/1989 | Inaba |
| 4,857,939 | A | 8/1989 | Shimazaki |
| 4,860,019 | A | 8/1989 | Jiang et al. |
| 4,890,114 | A | 12/1989 | Egaschira |
| 4,894,663 | A | 1/1990 | Urbisch |
| 4,907,011 | A | 3/1990 | Kuo |
| 4,912,481 | A | 3/1990 | Mace |
| 4,975,711 | A | 12/1990 | Lee |
| 5,030,963 | A | 7/1991 | Tadama |
| 5,138,328 | A | 8/1992 | Zibrik |
| 5,168,472 | A | 12/1992 | Lockwood |
| 5,172,084 | A | 12/1992 | Fiedziuszko |
| 5,200,756 | A | 4/1993 | Feller |
| 5,212,742 | A | 5/1993 | Normile |
| 5,214,434 | A | 5/1993 | Hsu |
| 5,218,370 | A | 6/1993 | Blaese |
| 5,227,804 | A | 7/1993 | Oda |
| 5,227,808 | A | 7/1993 | Davis |
| 5,245,350 | A | 9/1993 | Sroka |
| 5,248,988 | A | 9/1993 | Makino |
| 5,255,002 | A | 10/1993 | Day |
| 5,257,032 | A | 10/1993 | Diamond |
| 5,307,075 | A | 4/1994 | Huynh |
| 5,337,063 | A | 8/1994 | Takahira |
| 5,337,065 | A | 8/1994 | Bonnet et al. |
| 5,347,291 | A | 9/1994 | Moore |
| 5,355,144 | A | 10/1994 | Walton |
| 5,355,318 | A | 10/1994 | Dionnet |
| 5,363,114 | A | 11/1994 | Shoemaker |
| 5,373,300 | A | 12/1994 | Jenness et al. |
| 5,402,134 | A | 3/1995 | Miller |
| 5,410,322 | A | 4/1995 | Sonoda |
| 5,420,599 | A | 5/1995 | Erkocevic |
| 5,422,651 | A | 6/1995 | Chang |
| 5,451,965 | A | 9/1995 | Matsumoto |
| 5,451,968 | A | 9/1995 | Emery |
| 5,453,751 | A | 9/1995 | Tsukamoto |
| 5,453,752 | A | 9/1995 | Wang et al. |
| 5,457,469 | A | 10/1995 | Diamond |
| 5,471,224 | A | 11/1995 | Barkeshli |
| 5,493,702 | A | 2/1996 | Crowley |
| 5,495,261 | A | 2/1996 | Baker |
| 5,508,709 | A | 4/1996 | Krenz |
| 5,534,877 | A | 7/1996 | Sorbello |
| 5,537,367 | A | 7/1996 | Loockwood |
| 5,557,293 | A | 9/1996 | McCoy et al. |
| 5,569,879 | A | 10/1996 | Gloton et al. |
| H1631 | H | 2/1997 | Montgomery et al. |
| 5,608,417 | A | 3/1997 | De Vall |
| 5,619,205 | A | 4/1997 | Johnson |
| 5,627,550 | A | 5/1997 | Sanad |
| 5,646,635 | A | 7/1997 | Cockson |
| 5,657,028 | A | 8/1997 | Sanad |
| 5,680,144 | A | 10/1997 | Sanad |
| 5,684,672 | A | 11/1997 | Karidis |
| 5,703,600 | A | 12/1997 | Burrell |
| 5,712,640 | A | 1/1998 | Andou |
| 5,767,811 | A | 6/1998 | Mandai |
| 5,784,032 | A | 7/1998 | Johnston et al. |
| 5,790,080 | A | 8/1998 | Apostolos |
| 5,798,688 | A | 8/1998 | Schofield |
| 5,808,586 | A | 9/1998 | Philips |
| 5,809,433 | A | 9/1998 | Thompson et al. |
| 5,821,907 | A | 10/1998 | Zhu |
| 5,838,285 | A | 11/1998 | Tay et al. |
| 5,841,402 | A | 11/1998 | Dias et al. |
| 5,841,403 | A | 11/1998 | West |
| 5,870,066 | A | 2/1999 | Asakura |
| 5,872,546 | A | 2/1999 | Ihara |
| 5,898,404 | A | 4/1999 | Jou |
| 5,903,240 | A | 5/1999 | Kakahata |
| 5,918,183 | A | 6/1999 | Janky et al. |
| 5,926,139 | A | 7/1999 | Korish |
| 5,926,141 | A | 7/1999 | Lindenmeier |
| 5,929,825 | A | 7/1999 | Niu et al. |
| 5,936,583 | A | 8/1999 | Sekine |
| 5,936,587 | A | 8/1999 | Gudilev et al. |
| 5,943,020 | A | 8/1999 | Liebendoerfer |
| 5,966,098 | A | 10/1999 | Qi |
| 5,973,651 | A | 10/1999 | Suesada |
| 5,986,609 | A | 11/1999 | Spall |
| 5,986,610 | A | 11/1999 | Miron |
| 5,986,615 | A | 11/1999 | Westfall |
| 5,990,838 | A | 11/1999 | Burns |
| 5,995,052 | A | 11/1999 | Sadler |
| 6,002,367 | A | 12/1999 | Engblom |
| 6,005,524 | A | 12/1999 | Hayes |
| 6,008,764 | A | 12/1999 | Ollikainen |
| 6,011,518 | A | 1/2000 | Yamagishi et al. |
| 6,011,699 | A | 1/2000 | Murray et al. |
| 6,016,130 | A | 1/2000 | Annamaa |
| 6,028,567 | A | 2/2000 | Lahti |
| 6,028,568 | A | 2/2000 | Asakura |
| 6,031,495 | A | 2/2000 | Simmons |
| 6,031,499 | A | 2/2000 | Dichter |
| 6,031,505 | A | 2/2000 | Qi |
| 6,040,803 | A | 3/2000 | Spall |
| 6,058,211 | A | 5/2000 | Bormans et al. |
| 6,069,592 | A | 5/2000 | Wass |
| 6,072,434 | A | 6/2000 | Papatheodorou |
| 6,075,489 | A | 6/2000 | Sullivan |
| 6,075,500 | A | 6/2000 | Kurz |
| 6,078,294 | A | 6/2000 | Mitarai |
| 6,081,237 | A | 6/2000 | Sato |
| 6,087,990 | A | 7/2000 | Thill et al. |
| 6,091,365 | A | 7/2000 | Derneryt |
| 6,094,179 | A | 7/2000 | Davidson |
| 6,097,339 | A | 8/2000 | Filipovic et al. |
| 6,097,345 | A | 8/2000 | Walton |
| 6,104,349 | A | 8/2000 | Cohen |
| 6,107,920 | A | 8/2000 | Eberhardt |
| 6,111,545 | A | 8/2000 | Saari |
| 6,122,533 | A | 9/2000 | Zhang |
| 6,127,977 | A | 10/2000 | Cohen |
| 6,130,651 | A | 10/2000 | Yanagisawa et al. |
| 6,131,042 | A | 10/2000 | Lee |
| 6,138,245 | A | 10/2000 | Son et al. |
| 6,140,966 | A | 10/2000 | Pankinaho |
| 6,140,969 | A | 10/2000 | Lindenmeier |
| 6,140,975 | A | 10/2000 | Cohen |
| 6,141,540 | A | 10/2000 | Richards et al. |
| 6,147,649 | A | 11/2000 | Ivrissimtzis et al. |

(56) References Cited

U.S. PATENT DOCUMENTS 6,147,652 A 11/2000 Sekine
6,147,655 A 11/2000 Roesner
6,157,344 A 12/2000 Bateman et al.
6,160,513 A 12/2000 Davidson
6,166,694 A 12/2000 Ying
6,172,618 B1 1/2001 Hakozaki
6,181,281 B1 1/2001 Desclos
6,181,284 B1 1/2001 Madsen
6,195,048 B1 2/2001 Chiba
6,198,442 B1 3/2001 Rutkowski et al.
6,201,501 B1 3/2001 Arkko et al.
6,204,826 B1 3/2001 Rutkowski et al.
6,211,824 B1 4/2001 Holden et al.
6,211,826 B1 4/2001 Aoki
6,211,889 B1 4/2001 Stoutamire
6,215,474 B1 4/2001 Shah
6,218,992 B1 4/2001 Sadler
D441,733 S 5/2001 Do
6,236,366 B1 5/2001 Yamamoto et al.
6,236,372 B1 5/2001 Lindenmeier
6,239,765 B1 5/2001 Johnson et al.
6,243,592 B1 6/2001 Nakada et al.
6,255,994 B1 7/2001 Saito
6,259,407 B1 7/2001 Tran
6,266,023 B1 7/2001 Nagy
6,266,538 B1 7/2001 Waldron
6,271,794 B1 8/2001 Geeraert
6,272,356 B1 8/2001 Dolman
6,275,198 B1 8/2001 Kenoun
6,281,846 B1 8/2001 Puente Baliarda et al.
6,281,848 B1 8/2001 Nagumo et al.
6,285,326 B1 9/2001 Diximus
6,285,327 B1 9/2001 See
6,285,342 B1 9/2001 Brady
6,288,680 B1 9/2001 Tsuru et al.
6,292,154 B1 9/2001 Deguchi
6,300,910 B1 10/2001 Kim
6,300,914 B1 10/2001 Yang
6,301,489 B1 10/2001 Winstead
6,307,511 B1 10/2001 Ying
6,307,512 B1 10/2001 Geeraert
6,307,519 B1 10/2001 Livingston et al.
6,317,083 B1 11/2001 Johnson
6,320,543 B1 11/2001 Ohata
6,326,919 B1 12/2001 Diximus
6,327,485 B1 12/2001 Waldron
6,329,951 B1 12/2001 Wen
6,329,954 B1 12/2001 Fuchs
6,329,962 B2 12/2001 Ying
6,333,716 B1 12/2001 Pontoppidan
6,333,719 B1 12/2001 Varadan et al.
6,343,208 B1 1/2002 Ying
6,346,914 B1 2/2002 Annamaa
6,348,892 B1 2/2002 Annamaa
6,352,434 B1 3/2002 Emmert
6,353,443 B1 3/2002 Ying
6,360,105 B2 3/2002 Nakada
6,366,243 B1 4/2002 Isohätälä et al.
6,367,939 B1 4/2002 Carter
6,373,447 B1 4/2002 Rostoker
6,380,899 B1 4/2002 Madsen
6,380,902 B2 4/2002 Duroux
6,384,790 B2 5/2002 Dishart et al.
6,388,626 B1 5/2002 Gamalielsson
6,392,610 B1 5/2002 Braun
6,396,444 B1 5/2002 Goward et al.
6,407,710 B2 6/2002 Keilen et al.
6,408,190 B1 6/2002 Ying
6,417,810 B1 7/2002 Huels
6,417,816 B2 7/2002 Sadler
6,421,013 B1 7/2002 Chung
6,431,712 B1 8/2002 Turnbull
6,445,352 B1 9/2002 Cohen
6,452,549 B1 9/2002 Lo
6,452,553 B1 9/2002 Cohen
6,452,556 B1 9/2002 Ha
6,470,174 B1 10/2002 Schefte
6,476,766 B1 11/2002 Cohen
6,476,769 B1 * 11/2002 Lehtola ........................ 343/702
6,480,159 B1 11/2002 Hsu
6,483,462 B2 11/2002 Weinberger
6,496,154 B2 12/2002 Gyenes
6,498,586 B2 12/2002 Pankinaho
6,498,588 B1 12/2002 Callaghan
6,525,691 B2 2/2003 Varadan
6,538,604 B1 3/2003 Isohätala
6,552,690 B2 4/2003 Veerasamy
6,573,867 B1 6/2003 Desclos
6,597,319 B2 7/2003 Meng
6,603,434 B2 8/2003 Lindenmeier et al.
6,618,017 B1 9/2003 Ryken
6,650,294 B2 11/2003 Ying
6,664,932 B2 12/2003 Sabet et al.
6,680,705 B2 1/2004 Tan
6,697,022 B2 2/2004 Ponce de Leon et al.
6,697,024 B2 2/2004 Fuerst et al.
6,707,428 B2 3/2004 Gram
6,716,103 B1 4/2004 Eck et al.
6,741,215 B2 5/2004 Grant et al.
6,756,944 B2 6/2004 Tessier et al.
6,762,723 B2 7/2004 Nallo et al.
6,784,844 B1 8/2004 Boakes
6,801,164 B2 10/2004 Bit-Babik
6,806,834 B2 10/2004 Yoon
6,831,606 B2 12/2004 Sajadinia
6,839,040 B2 1/2005 Huber et al.
6,903,686 B2 6/2005 Vance
6,928,413 B1 8/2005 Pulitzer
6,967,731 B1 11/2005 Kizawa
6,989,794 B2 * 1/2006 Tran ............................. 343/702
6,992,633 B2 1/2006 Kim et al.
7,015,868 B2 3/2006 Puente Baliarde et al.
7,030,833 B2 4/2006 Ohara et al.
7,068,230 B2 6/2006 Qi
7,069,043 B2 6/2006 Sawamura
7,075,484 B2 7/2006 Sung
7,091,911 B2 8/2006 Qi et al.
7,123,208 B2 10/2006 Puente Baliarda et al.
7,148,850 B2 12/2006 Puente Baliarda et al.
7,151,955 B2 12/2006 Huber
7,183,983 B2 * 2/2007 Ozden .......................... 343/702
7,202,822 B2 4/2007 Baliarda et al.
7,229,385 B2 6/2007 Freeman et al.
7,265,724 B1 9/2007 Tan et al.
7,394,432 B2 7/2008 Baliarda et al.
7,397,431 B2 7/2008 Baliarda et al.
7,511,675 B2 3/2009 Puente-Baliarda et al.
7,528,782 B2 5/2009 Baliarda et al.
7,548,915 B2 * 6/2009 Ramer et al. .......................... 1/1
2001/0002823 A1 6/2001 Ying
2001/0033250 A1 10/2001 Keilen
2001/0050636 A1 12/2001 Weinberger
2002/0000940 A1 1/2002 Moren
2002/0000942 A1 1/2002 Duroux
2002/0036594 A1 3/2002 Gyenes
2002/0105468 A1 8/2002 Tesssier
2002/0109633 A1 8/2002 Ow
2002/0126051 A1 9/2002 Jha
2002/0126054 A1 9/2002 Fuerst
2002/0126055 A1 9/2002 Lindenmeier
2002/0140615 A1 10/2002 Carles et al.
2002/0149519 A1 10/2002 Varadan
2002/0164986 A1 11/2002 Briand
2002/0175211 A1 * 11/2002 Dominquez et al. .......... 235/492
2002/0175866 A1 11/2002 Gram
2002/0175879 A1 11/2002 Sabet
2002/0190904 A1 12/2002 Cohen
2003/0025637 A1 2/2003 Mendolia
2003/0064750 A1 4/2003 Oh
2003/0090421 A1 5/2003 Sajadinia
2003/0098814 A1 5/2003 Keller
2003/0189518 A1 10/2003 Johnson et al.
2003/0210200 A1 11/2003 McConnell
2003/0228892 A1 12/2003 Maaslismaa

(56) References Cited

U.S. PATENT DOCUMENTS

2004/0009755 A1 1/2004 Yoshida
2004/0027295 A1 2/2004 Huber
2004/0029581 A1 2/2004 Lu
2004/0056985 A1 3/2004 Seong
2004/0085244 A1 5/2004 Kadambi
2004/0090372 A1 5/2004 Nallo et al.
2004/0095289 A1 5/2004 Bae
2004/0110479 A1 6/2004 Ormson
2004/0119644 A1* 6/2004 Puente-Baliarda et al. .. 343/700 MS
2004/0176025 A1 9/2004 Holm
2004/0198436 A1 10/2004 Alden
2004/0204008 A1 10/2004 Deng
2004/0204126 A1 10/2004 Reyes
2004/0212545 A1 10/2004 Li et al.
2004/0214541 A1 10/2004 Choi
2005/0017910 A1 1/2005 Park
2005/0041624 A1 2/2005 Hui
2005/0057398 A1 3/2005 Ryken
2005/0069069 A1 3/2005 Gunzalmann
2005/0075098 A1 4/2005 Lee
2005/0088340 A1 4/2005 Deng
2005/0107052 A1 5/2005 Zangerl
2005/0136958 A1 6/2005 Seshadri
2005/0153709 A1 7/2005 Forrester
2005/0156785 A1 7/2005 Ryken, Jr.
2005/0157807 A1 7/2005 Shim
2005/0181826 A1 8/2005 Yueh
2005/0192009 A1 9/2005 Shaheen
2005/0195112 A1 9/2005 Baliarda et al.
2005/0195273 A1 9/2005 Yamamoto
2005/0201307 A1 9/2005 Chae
2005/0231439 A1 10/2005 Suwa
2005/0233705 A1 10/2005 Vare
2005/0239446 A1 10/2005 Tagawa
2005/0259031 A1 11/2005 Sanz et al.
2005/0264453 A1 12/2005 Baliarda et al.
2005/0270995 A1 12/2005 Byun
2006/0001576 A1 1/2006 Contopanagos
2006/0015664 A1 1/2006 Zhang
2006/0019730 A1 1/2006 Kim et al.
2006/0031616 A1 2/2006 Chuang
2006/0031886 A1 2/2006 Bae
2006/0033668 A1 2/2006 Ryu
2006/0050473 A1 3/2006 Zheng
2006/0050859 A1 3/2006 Ootsuka
2006/0060068 A1 3/2006 Hwang
2006/0077115 A1 4/2006 Oh et al.
2006/0077310 A1 4/2006 Wang
2006/0290573 A1 12/2006 Puente Baliarda et al.
2007/0013589 A1 1/2007 Park et al.
2007/0229383 A1* 10/2007 Koyanagi et al. ............ 343/793

FOREIGN PATENT DOCUMENTS

CA 2483357 A1 4/2005
CA 2525859 A1 2/2006
CA 2480581 A1 3/2006
CN 2224466 4/1996
DE 3337941 A1 5/1985
DE 19929689 A1 1/2001
DE 10142965 9/2001
DE 10206426 A1 11/2002
DE 10138265 A1 3/2003
DE 10108859 A1 5/2003
EP 0096847 A2 6/1983
EP 0253608 A2 1/1988
EP 0297813 A2 1/1989
EP 0358090 A1 3/1990
EP 0396033 4/1990
EP 0543645 A1 5/1993
EP 0590671 9/1993
EP 0571124 A1 11/1993
EP 0620677 4/1994
EP 0688040 A2 12/1995
EP 0736926 4/1996
EP 0753897 A2 1/1997
EP 0765001 A1 3/1997
EP 0823748 7/1997
EP 0825672 8/1997
EP 0814536 A2 12/1997
EP 0856907 A1 8/1998
EP 1016158 9/1998
EP 0871238 A2 10/1998
EP 0892459 A2 10/1998
EP 0902472 3/1999
EP 0929121 A1 7/1999
EP 0932219 A2 7/1999
EP 1071161 A1 7/1999
EP 0938158 8/1999
EP 0942488 A2 9/1999
EP 0986130 A2 9/1999
EP 0993070 A1 9/1999
EP 0997974 A1 9/1999
EP 1018777 A2 12/1999
EP 0969375 A2 1/2000
EP 1018779 A2 1/2000
EP 1024552 A2 1/2000
EP 0997972 A1 5/2000
EP 1011167 6/2000
EP 1026774 A2 8/2000
EP 1096602 A1 10/2000
EP 1063721 A1 12/2000
EP 1067627 A1 1/2001
EP 1079462 A2 2/2001
EP 1083623 A1 3/2001
EP 1083624 A2 3/2001
EP 1091446 A1 4/2001
EP 1094545 A2 4/2001
EP 1111921 A2 6/2001
EP 2156832 B1 7/2001
EP 1126522 A1 8/2001
EP 1148581 A1 10/2001
EP 1198027 A1 4/2002
EP 0749176 B1 9/2002
EP 1237224 A1 9/2002
EP 1267438 A1 12/2002
EP 1280230 1/2003
EP 0924793 3/2003
EP 1617564 A1 4/2003
EP 1324423 A1 7/2003
EP 1333596 A1 8/2003
EP 1353471 A1 10/2003
EP 1501221 A2 10/2003
EP 1326302 A3 11/2003
EP 0843905 1/2004
EP 1396906 A1 3/2004
EP 1401050 A1 3/2004
EP 1317018 A3 4/2004
EP 1414106 A1 4/2004
EP 1424747 A1 6/2004
EP 1501202 A2 7/2004
EP 1617671 A1 7/2004
EP 1443595 A1 8/2004
EP 1453140 A1 9/2004
EP 1534010 A2 11/2004
EP 1542375 A1 12/2004
EP 1610411 A1 1/2005
EP 1223637 3/2005
EP 1515392 3/2005
EP 1528822 A1 5/2005
EP 1542375 A1 6/2005
EP 1258054 8/2005
EP 1569300 A1 8/2005
EP 1569425 A1 8/2005
EP 1569450 A1 8/2005
EP 1587323 A1 10/2005
EP 1589608 A1 10/2005
EP 1650938 A1 10/2005
EP 1592083 11/2005
EP 1603311 A2 12/2005
EP 1770824 4/2007
EP 1592083 4/2013

(56) References Cited

FOREIGN PATENT DOCUMENTS

| | | | |
|---|---|---|---|
| ES | 2112163 | A1 | 3/1998 |
| ES | 2142280 | A1 | 5/2000 |
| ES | 2174707 | B1 | 8/2004 |
| FI | 972897 | | 9/1999 |
| FR | 2543744 | A1 | 10/1984 |
| FR | 2704359 | A1 | 10/1994 |
| FR | 2837339 | A1 | 9/2003 |
| GB | 1313020 | | 4/1973 |
| GB | 2161026 | A2 | 2/1986 |
| GB | 2215136 | A | 9/1989 |
| GB | 2293275 | A | 3/1996 |
| GB | 2317994 | | 4/1998 |
| GB | 2330951 | A | 5/1999 |
| GB | 2355116 | A | 4/2001 |
| GB | 2361584 | A | 10/2001 |
| GB | 2376568 | A | 12/2002 |
| GB | 2387486 | A | 10/2003 |
| GB | 2417863 | A | 3/2006 |
| JP | 55147806 | | 11/1980 |
| JP | 5007109 | | 1/1993 |
| JP | 5129816 | | 5/1993 |
| JP | 05-283928 | | 10/1993 |
| JP | 5267916 | | 10/1993 |
| JP | 1993-308223 | | 11/1993 |
| JP | 5347507 | | 12/1993 |
| JP | 6204908 | | 7/1994 |
| JP | 6252629 | | 9/1994 |
| JP | 773310 | | 3/1995 |
| JP | 08-052968 | | 2/1996 |
| JP | 09/069718 | | 3/1997 |
| JP | 9199939 | | 7/1997 |
| JP | 1997-246852 | | 9/1997 |
| JP | 10-163748 | | 6/1998 |
| JP | 10/303637 | | 11/1998 |
| JP | 11-004113 | | 1/1999 |
| JP | 11-027042 | | 1/1999 |
| JP | 06-085530 | | 3/1999 |
| JP | 11-136015 | | 5/1999 |
| JP | 11-220319 | | 8/1999 |
| JP | 10209744 | | 5/2007 |
| MX | 04009319 | A | 6/2005 |
| MX | 05005670 | A | 7/2005 |
| MX | 05002647 | A | 9/2005 |
| SE | 518988 | | 12/2002 |
| TW | 554571 | | 9/2003 |
| WO | 88/09065 | | 11/1988 |
| WO | 93/12559 | | 6/1993 |
| WO | 95/11530 | | 4/1995 |
| WO | 96/04691 | A1 | 2/1996 |
| WO | 96/27219 | | 9/1996 |
| WO | 96/29755 | | 9/1996 |
| WO | 96/38881 | | 12/1996 |
| WO | 97/06578 | | 2/1997 |
| WO | 97/07557 | | 2/1997 |
| WO | 97/11507 | | 3/1997 |
| WO | 97/32355 | | 9/1997 |
| WO | 97/33338 | | 9/1997 |
| WO | 97/35360 | | 9/1997 |
| WO | 97/47054 | | 12/1997 |
| WO | 98/05088 | | 2/1998 |
| WO | 98/12771 | | 3/1998 |
| WO | 98/20578 | | 5/1998 |
| WO | 98/36469 | | 8/1998 |
| WO | 99/03166 | | 1/1999 |
| WO | 99/03167 | | 1/1999 |
| WO | 99/03168 | A1 | 1/1999 |
| WO | 99/25042 | | 5/1999 |
| WO | 99/25044 | | 5/1999 |
| WO | 99/27607 | A2 | 6/1999 |
| WO | 99/27608 | | 6/1999 |
| WO | 9943039 | A1 | 8/1999 |
| WO | 99/56345 | | 11/1999 |
| WO | 99/57785 | A1 | 11/1999 |
| WO | 99/65102 | | 12/1999 |
| WO | 00/01028 | A1 | 1/2000 |
| WO | 00/03167 | A1 | 1/2000 |
| WO | 00/03453 | A1 | 1/2000 |
| WO | 0003451 | A1 | 1/2000 |
| WO | 0008712 | A1 | 2/2000 |
| WO | 00/22695 | A1 | 4/2000 |
| WO | 00/25266 | | 5/2000 |
| WO | 00/34916 | | 6/2000 |
| WO | 00/36700 | A1 | 6/2000 |
| WO | 00/49680 | A1 | 8/2000 |
| WO | 00/52784 | A1 | 9/2000 |
| WO | 00/52787 | A1 | 9/2000 |
| WO | 0057511 | A1 | 9/2000 |
| WO | 00/65686 | A1 | 11/2000 |
| WO | 00/67342 | | 11/2000 |
| WO | 00/77728 | | 12/2000 |
| WO | 00/77884 | A1 | 12/2000 |
| WO | 0074172 | A1 | 12/2000 |
| WO | 01/03238 | A1 | 1/2001 |
| WO | 01/05048 | A1 | 1/2001 |
| WO | 01/08093 | | 2/2001 |
| WO | 01/08257 | A1 | 2/2001 |
| WO | 01/08260 | A1 | 2/2001 |
| WO | 01/11721 | A1 | 2/2001 |
| WO | 01/13464 | A1 | 2/2001 |
| WO | 0108254 | | 2/2001 |
| WO | 0109976 | A1 | 2/2001 |
| WO | 0111716 | | 2/2001 |
| WO | 01/15271 | A1 | 3/2001 |
| WO | 01/17064 | A1 | 3/2001 |
| WO | 01/18909 | A1 | 3/2001 |
| WO | 01/20714 | A1 | 3/2001 |
| WO | 01/20927 | A1 | 3/2001 |
| WO | 01/22528 | A1 | 3/2001 |
| WO | 0117061 | A1 | 3/2001 |
| WO | 01/24314 | A1 | 4/2001 |
| WO | 01/26182 | A1 | 4/2001 |
| WO | 01/28035 | A1 | 4/2001 |
| WO | 0124316 | A1 | 4/2001 |
| WO | 0129927 | A1 | 4/2001 |
| WO | 01/31739 | A1 | 5/2001 |
| WO | 01/31747 | | 5/2001 |
| WO | 01/33663 | A1 | 5/2001 |
| WO | 01/33664 | A1 | 5/2001 |
| WO | 01/33665 | A1 | 5/2001 |
| WO | 01/35491 | A1 | 5/2001 |
| WO | 01/35492 | A1 | 5/2001 |
| WO | 01/37369 | A1 | 5/2001 |
| WO | 01/37370 | A1 | 5/2001 |
| WO | 01/41252 | A1 | 6/2001 |
| WO | 01/47056 | A2 | 6/2001 |
| WO | 01/48860 | | 7/2001 |
| WO | 01/48861 | A1 | 7/2001 |
| WO | 01/54225 | A1 | 7/2001 |
| WO | 01/65636 | A1 | 9/2001 |
| WO | 0169805 | A1 | 9/2001 |
| WO | 01/73890 | A1 | 10/2001 |
| WO | 01/78192 | | 10/2001 |
| WO | 01/82410 | | 11/2001 |
| WO | 01/89031 | | 11/2001 |
| WO | 0117063 | | 11/2001 |
| WO | 0186753 | | 11/2001 |
| WO | 02/01668 | A2 | 1/2002 |
| WO | 0203092 | A1 | 1/2002 |
| WO | 0223667 | A1 | 3/2002 |
| WO | 02/35646 | | 5/2002 |
| WO | 02/35652 | | 5/2002 |
| WO | 02/96166 | | 5/2002 |
| WO | 02063715 | A1 | 8/2002 |
| WO | 02065583 | A1 | 8/2002 |
| WO | 02071535 | A1 | 9/2002 |
| WO | 02/078121 | | 10/2002 |
| WO | 02/078123 | | 10/2002 |
| WO | 02/078124 | | 10/2002 |
| WO | 02/080306 | | 10/2002 |
| WO | 02084790 | | 10/2002 |
| WO | 02087014 | A1 | 10/2002 |
| WO | 02/091518 | | 11/2002 |
| WO | 02/095874 | | 11/2002 |
| WO | 03003503 | A2 | 1/2003 |

(56) References Cited

FOREIGN PATENT DOCUMENTS

| | | | |
|---|---|---|---|
| WO | 03017421 | | 2/2003 |
| WO | 03/023900 | | 3/2003 |
| WO | 03026064 | A1 | 5/2003 |
| WO | 03043326 | A1 | 5/2003 |
| WO | 03047035 | A1 | 6/2003 |
| WO | 03075398 | A1 | 9/2003 |
| WO | 03083989 | A1 | 10/2003 |
| WO | 04001578 | A1 | 12/2003 |
| WO | 2004027922 | A2 | 4/2004 |
| WO | 2004062032 | | 7/2004 |
| WO | 2004062032 | A1 | 7/2004 |
| WO | 2004066437 | A1 | 8/2004 |
| WO | 2004070874 | A1 | 8/2004 |
| WO | 2004077829 | A1 | 9/2004 |
| WO | 2004079861 | A1 | 9/2004 |
| WO | 2004084345 | | 9/2004 |
| WO | 2004097976 | | 11/2004 |
| WO | 2004114464 | A1 | 12/2004 |
| WO | 2005004283 | A1 | 1/2005 |
| WO | 2005006743 | A1 | 1/2005 |
| WO | 2005013515 | A1 | 2/2005 |
| WO | 2005050780 | A1 | 6/2005 |
| WO | 2005055594 | A1 | 6/2005 |
| WO | 2005057923 | A1 | 6/2005 |
| WO | 2005062550 | A1 | 7/2005 |
| WO | 2005067458 | A2 | 7/2005 |
| WO | 2005069439 | A1 | 7/2005 |
| WO | 2005/076933 | | 8/2005 |
| WO | 2005/081358 | | 9/2005 |
| WO | 2005081549 | A2 | 9/2005 |
| WO | 2005083991 | A1 | 9/2005 |
| WO | 2005093605 | A1 | 10/2005 |
| WO | 2005104445 | A1 | 11/2005 |
| WO | 2005107103 | A1 | 11/2005 |
| WO | 2005114965 | A1 | 12/2005 |
| WO | 2006003681 | A1 | 1/2006 |
| WO | 2006008180 | A1 | 1/2006 |
| WO | 2006010583 | A1 | 2/2006 |
| WO | 2006011323 | A1 | 2/2006 |
| WO | 2006011776 | A1 | 2/2006 |
| WO | 2006027646 | A1 | 3/2006 |
| WO | 2006036117 | A1 | 4/2006 |
| WO | 2006043756 | A1 | 4/2006 |
| WO | 2006051113 | A1 | 5/2006 |
| WO | 2006070017 | A1 | 7/2006 |
| WO | 2007028448 | A1 | 3/2007 |
| WO | 2007/128340 | | 11/2007 |
| WO | 2007128340 | | 11/2007 |

OTHER PUBLICATIONS

Guo, Yong-Xin, et al, "Miniature built-in multiband antennas for mobile handsets", IEEE Transactions on antennas and propagation, vol. 52, No. 8, Aug. 2004.
Guterman, J. et al. Two-element multi-band fractal PIFA for MIMO applications in small size terminals. Antennas and Propagation Society International Symposium, 2004.
Foroutan-Pour, K et al. Advances in the implementation of the box-counting method of fractal dimension estimation. Applied Mathematics and Computation. vol. 105, 1999.
Li , J. et al. A new box-counting method for estimation of image fractal dimension. Pattern Recognition, vol. 42, Issue 11, pp. 2460-2469, Nov. 2009.
Liu, S. An improved differential box-counting approach to compute fractal dimension of gray-level image. International Symposium on Information Science and Engineering. Dec. 2008.
Huang, Q. et al. Can the fractal dimension of images be measured? Pattern Recognition, vol. 27, 1994.
Sarkar, N. An efficient differential box-counting approach to compute fractal dimension of image. IEEE Transactions on Systems, man, cybernetics, vol. 24. Jan. 1994.
Walsh, J. J. et al. Fractal analysis of fracture patterns using standard box-counting technique: valid and invalid methodologies. Journal of Structure Geology, vol. 15, 1993.
Gagnepain, J.J. Fractal approach to two-dimensional and three-fimensional surface roughness. Wear, 109. 1986.
Feng, J. et al. Fractional box-counting approach to fractal dimension estimation. Proceedings of ICPR, 1996.
Li, J. et al. an improved box-counting method for image fractal dimension estimation. Pattern Recognition. vol. 42, 2009.
Buczkowski, S. Measurements of fractal dimension by box-counting: a critical analysis of data scatter. Physica A. 1998.
Buczkowski, S. The modified box-counting method: analysis of some characteristics paramenters. Pattern Recognition.
Bisoi , A. K. On calculation of fractal dimension of images. Pattern Recognition Letters, vol. 22, 2001.
Wei, G. et al. Study of minimum box-counting method for image fractal dimension estimation. CICED, 2008.
Buczkowski, S. The modified box-counting method: analysis of some characteristic parameters, Patterb Recognition, vol. 31, No. 4, 1998.
Buczkowski, S. Measurements of fractal dimension by box-counting: a critical analysis of data scatter. Physica A, 252. 1998.
Feng, J. Fractional box-counting approach to fractal dimension estimation. Proceedings of ICPR, 1996.
Foroutan, K. Advances in the implementation of the box-counting method of fractal dimension estimation, Applied Mathematics and Computation, 105. 1999.
Gagnepain, J. Fractal approach to two-fimensional and three-dimensional surgace roughness. Wear, 109, 1986.
Huang, Q. Can the fractal dimension of images be measured?Pattern Recognition, vol. 27 No. 3 . 1994.
Kumar, A. On calculation of fractal dimension of images. Pattern Recognition Letters, 22. 2001.
Li, J. An improved box-counting method for image fractal dimension estimation, Pattern Recognition, 42, 2009.
Li, J. A new box-counting method for estimation of image fractal dimension, Pattern Recognition. vol. 42 , Issue 11.Nov. 2009.
Liu, S. An improved differential box-counting approach to compute fractal dimension of gray-level image. International Symposium on Information science and engieering. 2008.
Sarkar, N. An efficient differential box-counting approach to compute fractal dimension of image. IEEE Transactions on Systems, Man and Cybernetics, vol. 24, No. 1, Jan. 1994.
Walsh, J. Fractal analysis of fracture patterns using the standsard box-counting technique: valid and invalid methodologies. Journal of Structural Geology, vol. 15, No. 12, 1993.
Wei, G. Study of minimum box-counting method for image fractal dimension estimation. CICED 2008.
Ali, A triple band internal antenna for mobile handheld terminals, IEEE, 2002.
Anguera, Miniature wideband stacked microstrip patch antenna based on the sierpinski fractal geometry, IEEE, 2000.
Anguera, Antenas microstrip apiladas con geometria de anillo—Stacked microstrip patch antennas,Proceedings of the XIII National Symposium of the Scientific International Union of Radio. Ursi '00.
Bockhari, A small microstrip patch antenna with a convenient tuning opt, IEEE Transactiona on antennas and propagation, Nov. 1996, vol. 44 No. 11.
Borja, High directivity fractal boundary microstrip patch antenna, Electronic letters, Apr. 27, 2000, vol. 36 No. 9.
Borja, Antenas fractales microstrip, Universitat Politècnica de Catalunya, Enginyeria de Telecomunicacions, 1997.
Borja, Fractal microstrip antennas, Universitat Politècnica de Catalunya, Eniginyeria de Telecomunicacions, 1997.
Braun, Antenna diversity for mobile telephones, IEEE, 1998.
Campos, Estudi d'antenes fractal multibanda i en miniatura—Multiband and miniature fractal antennas study, Universitat Politècnica de Catalunya, Jan. 1998.
Chan, Hybrid fractal cross antenna, Microwaves and optical technology letters, Jun. 2000, vol. 25 No. 6.
Chen, On the circular polarization operation of annular-ring microstrip antennas, IEEE Transaction on antennas and propagation, Aug. 1999, vol. 47, No. 8.

(56) References Cited

OTHER PUBLICATIONS

Chen, Small circularly polarized microstrip antennas, IEEE, 1999.
Chen,Dual frequency microstrip antenna with embedded reactive loading, Microwaves and optical technology letters, Nov. 1999, vol. 23 ,No. 3.
Chow, An innovative monopole antenna for mobile phone handsets, Microwaves and optical technology letters, Apr. 2000, vol. 25, Nol. 2.
Cohen, Fractal antennas—Part 1—Introduction and the fractal quad, The journal of communications Technology, summer 1995.
Cohen, Fractal and shaped dipoles—Some simple fractal dipoles, their benefits and limitations, spring 1996.
Cohen, Fractal antennas—Part 2—A discussion of relevant, but disparate, qualities, summer 1996.
Cohen, Fractal antenna applications in wireless telecommunications, IEEE, 1997.
George, Analysis of a new compact microstrip antenna, IEEE, Transactions on antennas and propagation, Nov. 1998, vol. 46 No. 11.
Gianvittorio, Fractal element antennas—a compilation of configurations with novel characteristics, IEEE, 2000.
Gough, High Tc coplanar resonators for microwave applications and scientific studies, Physica, Aug. 1997.
Hansen, Fundamental limitations in antennas, IEEE, Feb. 1981, vol. 69, No. 2.
Hara Prasad, Microstrip fractal patch antenna, Electronic letters, Jul. 2000, vol. 36, No. 14.
Hohlfeld, Self-similarity and the geometric requirements for frequency independence in antennae, World Scientific publishing company, 1999, vol. 7, No. 1.
Huang, Cross slot coupled microstrip antenna and dielectric resonator antenna for circular polarizatio, IEEE Transaction on antennas and propagation, Apr. 1999, vol. 47, No. 4.
Jaggard, Fractal electrodynamics and modeling ,Directions in electromagnetic wave modeling, Jan. 1981.
Kokotoff, Rigorous analysis of probe fed printed annular ring antennas, IEEE Transactions on antennas and propagation, Feb. 1999, vol. 47 No. 2.
Lam, A novel leaky wave antenna for the base station in an innovative indoors cellular mobile communication system, IEEE, 1999.
Lee, Planar circularly polarized microstrip antenna with a single feed, IEEE Transaction on antennas and propagation, Jun. 1999, vol. 47 No. 6.
Lee, Electrically small microstrip antennas, Antennas and propagation society international symposium, Jul. 2000.
Lo, Bandwidth enhancement of PIFA loaded with a very high permittivity material using FDTD, IEEE Antennas and propagation society, Apr. 2006.
Lu, Slot coupled compact triangular microstrip antenna with lumped load, Microwaves and optical technology letters, Dec. 1997.
Lu, Slot-coupled small triangular microstrip antenna, Microwaves and optical technology letters, Dec. 1997, vol. 16, No. 6.
Meinke, Radio engineering reference book—vol. 1—Radio components. Circuits with lumped parameters . . . ,State energy publishing house, Jan. 1961.
Fang, A dual frequency equilateral-triangular microstrip antenna with a pair of narrow slots, Microwaves and optical technology letters, Oct. 1999, vol. 28 No. 2.
Palit, Design of a wideband dual-frequency notched microstrip antenna, IEEE, Jun. 1998.
Parker, Convoluted dipole array elements, Electronic letters, Feb. 1991 vol. 27 No. 4.
Parker, Convoluted array elements and reduced size unit cells for frequency selective s IEEE, Feb. 1991 vol. 138, No. 1.
Pribetich, Quasifractal planar microstrip resonators for microwave circuits, Microwaves and optical technology letters, Jun. 1999, vol. 21, No. 6.
Xu Jing, Compact plannar monopole antennas, Microwave conference proceeding, 2005.
Pictures of Mobile handset telephones (16 pag.).
Chu, Physical limitations of omni-directional antennas, Journal of applied physics, 1948.
Wheeler, Fundamental limitations of small antennas, Proceedings of the I.R.E., 1947.
Zhengwei et al, A novel compact wide-band planar antenna for mobile handsets, IEEE Transaction antennas and propagation,, Feb. 2006, vol. 54 No. 2.
Mobile Handset Analyst, The International Business Newsletter of Devices, components software and smart cards,Telecoms & Media, Sep. 2006.
Lettieri et al , Advances in wireless terminals, IEEE, Feb. 1999.
Morishita et al , Design concept of antennas for small mobile terminals and the future perspective, IEEE Antenna's and propagation magazine, Oct. 2002, vol. 44, No. 5.
Antwerpen et al, Energy-aware system design for wireless multimedia, IEEE 2004.
Markopoulou et al, Energy-efficient communication in battery-constrained portable devices, IEEE 2005.
Dayley et al, Lower power chips for high powered handhelds, Industry trends, Jan. 2003.
Hartwig et al. Mobile multimedia—challenges and oportunities invented paper, IEEE 2000.
Shim et al. Power saving in hand-held multimedia systems using MPEG-21 digital items adaptation, IEEE 2004.
Efland et al. The earth is mobile power, IEEE 2003.
Neuvo et al. Wireless meets multimedia—new products and services, Nokia, IEEE 2002.
Virga et al. Low profile enhanced-bandwidth PIFA antennas for wireless communications packaging, IEEE Transactions on microwaves theory and techniques, Oct. 1997, vol. 45, No. 10.
Aberle et al. Reconfigurable antennas and RF front ends for portable wireless devices, Antenna and propagation magazine, IEEE Dec. 2003, vol. 45 No. 6.
Chien et al. Planar inverted-F antenna with a Hollow shorting cylinder for internal mobile phone antenna, IEEE 2004.
Guterman et al. Dual-band miniaturized microstrip fractal antenna for a small GSM1800+UMTS mobile handset, IEEE Melecon, May 2004.
Jang et al. Internal antenna design for a triple band using an overlap of return loss, Machine copy for Proofreading, 2006, vol. x,y-z.
Buchholz, et al. Analysis, realisation and mesurement of broadband miniature antennas for digital tv receivers in Handheld Terminals, University of applied sciences—Saarbrücken, Germany. International Symposium on broadband multimedia systems and bradcasting, IEEE, 2006.
Anguera et al , Multiband handset antenna behaviour by combining pifa and a slot radiators, IEEE International Symposium, 2007.
Antenas multibanda para aplicaiones "G2,•" G3, Wifi,wlan y bluetooh en terminales móviles de nueva generaciön, Fractus & salle, Jan. 2001.
Tanidokoro, Wavelengh Looop type dielectric chip antennas, IEEE 1998.
Puente, The Koch monopole—a small fractal antenna, IEEE Transactions on antennas and propagation, Nov. 2000, vol. 48, No. 11.
Puente, La antena de Koch—un monopolo largo pero pequeño, UPC SPC, Jun. 2005.
Puente, Diseño fractal de agrupaciones de antenas—Fractal design of antenna arrays, IX Simposium Nacional URSI Sep. 1994.
Puente, Fractal design of multiband and low side-lobe arrays, IEEE Transaction on antennas and propagation, May 1996, vol. 44 No. 5.
Puente, Multiband properties of a fractal tree antenna generated by electrochemical deposition, Electronic letters, Dec. 1996, vol. 32 No. 25.
Puente, Multiband fractal antennas and arrays,Fractals engineering—from theory to industrial applications, Sep. 1994.
Puente, Fractal antennas, Universitat Politecnica de Catalunya, May 1997.
Puente, Small but long Koch fractal monopole, Electronic letters, Jan. 1998, vol. 34 , No. 1.
Romeu, A three dimensional hilbert antenna, IEEE 2002.
Romeu, Small fractal antennas, Fractals in engineering conference, India, Jun. 1999.
Samavati, Fractal capacitors, IEEE Journal of solid-states circuits, Dec. 1998, vol. 33 ,No. 12.

(56) References Cited

OTHER PUBLICATIONS

Sanad, A compact dual broadband microstrip antenna having both stacked and planar parasitic elements, IEEE Antennas and Propagation, Jul. 1996.
Tang, Small circular microstrip antenna with dual-frequency operation, Electronic letters, Jun. 1997, vol. 33, No. 13.
Verdura, Antena fractal miniatura—Miniature fractal antenna, Universitat Politecnica de Catalunya, Sep. 1997.
Volgov, Parts and units of radio electronic equipment, Energiya, Jan. 1967.
Wang, Compact microstrip meander antenna, Microwaves and optical technology letters, Sep. 1999, vol. 22 ,No. 6.
Wang, Aperture-coupled thin-film superconducting meander antennas, IEEE Transaction on antennas and propagation, May 1999, vol. 47 , No. 5.
Waterhouse, Investigation of small printed antennas suitable for mobile communication handsets, Antennas and propagation society international symposium, Jun. 1998.
Waterhouse, Design and performance of small printed antennas,IEEE Transactions on antennas and propagation, Nov. 1998.
Waterhouse, Small printed antenna easily integrated into a mobile handset terminal, Electronic Letters, Aug. 1998.
Williams, Dual band meander antenna for wireless telephones, Microwaves and optical technology letters, Jan. 2000, vol. 24, No. 2.
Wong, Modified planar inverted F antenna, Electronic letters, Jan. 1998, vol. 34, No. 1.
Zhang, Narrowband lumped element microstrip filters using capacitively loaded inductors, IEEE Mit-S microwave symposium digest, May 1995.
Zhang, Adaptive content delivery on mobile internet across multiple form factors, Proceedings of the 10th International Multimedia Conference, 2004.
Martinez-Vazquez, Integrated planar multiband antennas for personal communications handsets, IEEE Transactions on Antennas and Propagation, Feb. 2006, vol. 54, No. 2.
Cho et al., A wideband internal antenna with dual monopole radiation elements, IEEE Antennas and Wireless Propagation Letters, 2005, vol. 4.
Jing, Compact planar monopole antenna for multi-band mobile phones, Microwave Conference Proceedings, 2005, vol. 4.
Jones et al. Wi-Fi hotspot networks sprout like mushrooms, IEEE Spectrum, 2002.
Fleischmann, Prototyping networked embedded systems, Computer, Feb. 1999.
Collander, Mobile multimedia communication, Electronic Manufacturing Technology Symposium, 1995, Proceedings of 1995 Japan International, 18th IEEE/CPMT International, Dec. 1995.
Ladebusch, Terrestrial DVB (DVB-T): a broadcast technology for stationary portable and mobile use, Proceedings of the IEEE, 2006, vol. 91, No. 1.
Noguchi, Broadbanding of a plate antenna with slits, Antennas and propagation society international symposium, 2000.
Mahmoud, Building wireless intemet services—state of the art, IEEE Computer Systems and Applications, 2003. Book of Abstracts. ACS/ IEEE International Conference, 2003.
Perez Costa, Analysis of the integration of IEEE 802.11e capabilities in battery limited mobile devices, IEEE Wireless Communications, 2005.
Moon, A framework design for the next generation radio access system, IEEE Journal on selected areas in communications, 2006.
Cimini et al. Advanced cellular internet services (ACIS), IEEE Communication Magazine, Oct. 1998.
Aazhanng, Wireless communication: a power efficiency perspective, IEEE Seventh International Symposium on Spread Spectrum Techniques and Applications, Sep. 2002.
Ophir, Wi-Fi (IEEE802.11) and Bluetooth coexistence: issues and solutions, 15th IEEE International Symposium Personal, Indoor and Mobile Radio Communication, 2004.
Pahlavan, Trands in local wireless data networks, Vehicular Technology Conference, 1996. 'Mobile Technology for the Human Race'., IEEE 46th, Apr. 1996, vol. 1.
Clawson, The impacts of limited visual feedback on mobile text entry for the twiddler and mini-QWERTY keyboards, 9th International Symposium on Wereable Computers. Proceedings of the 2005, 2005.
Agrawal, An experimental indoor wireless network: SWAN, a mobile multimedia wireless network, IEEE Personal Communications, Apr. 1996.
Wong et al. Surface-mountable EMC monopole chip antenna for WLAN operation, IEEE Transactions on Antennas and Propagation, Apr. 2006.
Bellfiore, Smart-antenna systems for mobile communication networks. Part 1: Overview and antenna design, , IEEE Antenna's and Propagation Magazine, 2002, vol. 44, No. 2.
Bellfiore, Smart antenna system analysis, integration and performance for mobile ad-hoc networks (MANETs), IEEE, Transactions on Antenna and Propagatio, 2002, vol. 50, No. 5.
Larson, Radio frequency integrated circuit technology for low-power wireless communications, IEEE Personal Communications, 1998.
Acquaviva, Power-aware network swapping for wireless palmtop PCs, IEEE Transactions on Mobile Computing, 2006, vol. 5, No. 5.
Gandara, Planar inverted-F antennas for small multi-standard handsets, 18th International Conference on Applied Electromagnetics and Communications, 2005.
Wu et al. Personal mobile multimedia communications in a wireless WAN environment, IEEE First Workshop on Multimedia Signal Processing, 1997.
Foss et al., On migrating a legacy application to the palm platform, Proceedings of the 12th IEEE International Workshop on Program Comprehesion, 2004.
Ardizzoni, Know your trade-offs in portable designs, Mobile Handset Design Line, 2005.
Re, Multiple antenna systems: frontier of wireless access, 15th IEEE International Symposium on Personal, Indoor and Mobile Radio Communications, 2004, vol. 2.
Weinstein, Multi-user wireless access to a digital cable system, IEEE Wireless Communications and Networking Conference, 2004.
Simpson, Mobile communications worldwide: glossary, methodology and definitions, Gartner, 2006.
Krikolis, Mobile multimedia considerations, IEEE Concurrency, 1999.
Yoon, Internal antenna for multiband mobile handset applications, IEEE Antennas and Propagation Society International Symposium, 2005.
Bennani, Integrating a digital camera in the home environment: architecture and prototype, IEEE Proceedings. International Symposium on Multimedia Software Engineering, 2000.
Nicol, Integrated circuits for 3GPP mobile wireless systems, IEEE Custom Itegrated Circuits Conference, 2002.
Heikkili, Increasing HSDPA throughput by employing space-time equalization, 15th IEEE International Symposium on Personal, Indoor and Mobile Radio Communications, 2004, vol. 4.
Behmann, Impact of wireless (Wi.Fi, WiMAX) on 3G and Next Generation—An initial assessment, IEEE International Conference on Electro Information Technology, 2005.
Tanaka, Fundamental features of perpendicular magnetic recording and the design consideration for future portable HDD integration, IEEE Transactions on Magnetics, 2005, vol. 41, No. 10.
Su, EMC internal patch antenna for UMTS operation in a mobile device, IEEE Transactions on Antennas and Propagation, 2005, vol. 53, No. 11.
Kawitkar, Design of smart antenna testbed prototype, 6th International SYmposium on Antennas, Propagation and EM Theory, 2003.
Krikelis, Considerations for a new generation of mobile multimedia communication systems, IEEE Concurrency, 2000, vol. 8, No. 2.
Cherry, A match made in packets, IEEE Spectrum, Jul. 2005.
Murch et al. Antenna systems for broadband wireless access, IEEE Communications Magazine, 2002.
Tsachtsiris et al.Analysis of a modified sierpinski gasket monopole antenna printed on dual band wireless devices, IEEE Transactions on Antennas and Propagation, Oct. 2004, vol. 52, No. 10.

(56) References Cited

OTHER PUBLICATIONS

Stabernack et al., An MPEG-4 video codec soc for mobile multimedia applications, IEEE International Conference on Consumer Electronics, 2003.
Guo, A VSLI implementation of MIMO detection for future wireless communications, The 14th IEEE International Symposium on Personal Indoor and Mobile Radio Communication Proceedings, 2003.
BenQ-Siemens EF81, S88 and S68, GSM Arena, Jan. 17, 2006.
In Focus—Making TV mobile ; Making mobiles accessible ; Wi-Fi sidles up to cellular etc., Nokia Newsletter, Nov. 2005.
Cozza, R. et al, Nokia's E-Series brings PC management strategies to smartphones, Gartner-Dataquest, Jan. 2006.
Kim , W. et al., Internal dual-band low profile antenna for T-DMB/UHF mobile handset applications, IEEE Antennas and Propagation Society International Symposium, Jul. 9, 2006.
Kim, S. M., et al, Design and implementation of dual wideband sleeve dipole type antenna for the reception of S-DMB and 2.4/5GHz WLAN signals, IEEE Antennas and Propagation Society International Symposium, Jul. 9, 2006.
Samsung at 3GSM 2006, GSM Arena, Feb. 13, 2006.
De La Vergne , H. J. et al, Market focus—Smartphones, Worldwide, 2005, Dec. 5, 2005.
Nokia 6233 and 6282 announced, GSM Arena, Dec. 1, 2005.
Nokia N-Series—second wave, GSM Arena, Nov. 2, 2005.
Nokia N-Series—N91, N90 and N70, GSM Arena, Apr. 27, 2005.
Besthorn 1.0 to 21.0 GHz Log-periodic dipole antenna. Symposium on the USAF Antenna Research and Development Program, 18th Oct. 15, 1968.
Ishikawa , Y. ; Hattori , J. ; Andoh , M. et al. 800 MHz High Power Bandpass Filter Using TM Dual Mode Dielectric Resonators. European Microwave Conference , 21th Sep. 9, 1991.
Greiser , J. W. and Brown , G. S. A 500:1 scale model of warla : A wide aperture radio location array. Symposium on the USAF Antenna Research and Development Program, 13th Oct. 14, 1963.
Larson , J. A BAW Antenna Duplexer for the 1900 MHz PCS Band. IEEE Ultrasonics Symposium Oct. 17, 1999.
Rowell , C. R. ; Murch , R.D. A capacitively loaded PIFA for compact mobile telephone handsets. IEEE Transactions on Antennas and Propagation, May 1, 1997.
Iwasaki , Hisao A circularly polarized small size microstrip antenna with a cross slot. IEEE Transactions on Antennas and Propagation, Oct. 1, 1996.
Chen , M.H. A compact EHF/SHF dual frequency antenna. IEEE International Symposium on Antennas and Propagation May 7, 1990.
Hofer , D. A. ; Kesler , Dr. O. B. ; Loyet , L. L. A compact multi-polarized broadband antenna. Proceedings of the 1989 antenna applications symposium Sep. 20, 1989.
Rowell , Corbett R. ; Murch , R. D. A compact PIFA suitable for dual-frequency 900-1800-MHz operation. IEEE Transactions on Antennas and Propagation, Apr. 1, 1998.
Kuhlman , E. A. A directional flush mounted UHF communications antenna for high performance jet aircraft for the 225-400 MC frequency range. Symposium on the USAF Antenna Research and Development Program, 5th Oct. 1, 1955.
Halloran , T. W. A dual channel VHF telemetry antenna system for re-entry vehicle applications. Symposium on the USAF Antenna Research and Development Program, 11th Oct. 16, 1961.
Holtum , A. G. A dual frequency dual polarized microwave antenna. Symposium on the USAF Antenna Research and Development Program, 16 Oct. 11, 1966.
Fang , S. T. A dual-frequency equilateral-triangular microstip antenna with a pair of narrow slots. Microwave and Optical Technology Letters Oct. 20, 1999.
Boshoff , H. A fast box counting algorithm for determining the fractal dimension of sampled continuous functions. IEEE Jan. 1, 1992.
Sandlin , B. ; Terzouli , A. J. A genetic antenna desig for improved radiation over earth Antenna Applications Symposium , Program for 1997—Allerton Conference Proceedings Sep. 17, 1997.
Barrick , W. A helical resonator antenna diplexer. Symposium on the USAF antenna research and development program, 10th Jan. 3, 1960.
Brown, A. A high-performance integrated K-band diplexer. Transactions on Microwave Theory and Techniques Aug. 8, 1990.
Nagai , K. ; Mikuni , Y. ; Iwasaki , H. A mobile radio antenna system having a self-diplexing function. IEEE Transactions on Vehicular Technology Nov. 1, 1979.
Liu , D. A multi-branch monopole antenna for dual-band cellular applications. IEEE Antennas and Propagation Society International Symposium Sep. 3, 1999.
Omar, Amjad A. ; Antar , Y. M. M. A new broad band dual frequency coplanar waveguide fed slot antenna. Antennas and Propagation Society International Symposium, 1999. IEEE Jul. 11, 1999.
Fenwick , R. C. A new class of electrically small antennas. IEEE Transactions on Antennas and Propagation, May 1, 1965.
Anguera , J. ; Puente , C. ; Borja , C. A procedure to design stacked microstrip patch antennas on a simple network model. Microwave and Optical Technology Letters Aug. 1, 2001.
Anguera , J. ; Puente , C. ; Borja , C. A procedure to design wide-band electromagnetically-coupled stacked microstrip antennas based on a simple network model. Antennas and Propagation Society International Symposium, 1999. IEEE Jul. 11, 1999.
McLean , J. S. A re-examination of the fundamental limits on the radiation q of electrically small antennas. IEEE Transactions on Antennas and Propagation, May 1, 1996.
Ferris , J. E. A status report of an Azimuth and elevation direction finder. Symposium on the USAF Antenna Research and Development Program Oct. 15, 1968.
Ohmine , H. et al. A TM mode annular-ring microstrip antenna for personal satellite communication use. IEICE Trans. Commun. Sep. 1, 1996.
Deng , Sheng-Ming A t-strip loaded rectangular microstrip patch antenna for dual-frequency operation. Antennas and Propagation Society International Symposium, 1999. IEEE Jul. 1, 1999.
Shimoda , R. Y. A variable impedence ratio printed circuit balun. Antenna Applications Symposium Sep. 26, 1979.
Teeter , W. L. ; Bushore , K. R. A variable-ratio microwave power divider and multiplexer. IRE Transactions on microwave theory and techniques Oct. 1, 1957.
Rosa , J. ; Case E. W. A wide angle circularly polarized omnidertional array antenna. Symposium on the USAF antenna Research and Development Program, 18th Oct. 15, 1968.
Phelan , R. A wide-band parallel-connected balun. IEEE Transactions on Microwave Theory and Techniques, May 1, 1970.
Poilasne , G. Active metallic photonic band-gap materials (MPBG): experimental resultors on beam shaper. IEEE Transactions on Antennas and Propagation, Jan. 1, 2000.
Wimer , Michael C. Advisory Action before the filing of an Appeal Brief for U.S. Appl. No. 10/422,578 USPTO Jun. 23, 2005.
May , M. Aerial magic. New Scientist Jan. 31, 1998.
Ellis , A. R. Airborne UHF antenna pattern improvements. Symposium on the USAF antenna research and Development Program , 3rd Oct. 18, 1953.
Walker , B. Amendment and response to office action dated Apr. 15, 2008 of U.S. Appl. No. 11/686,804. Howison and Arnott.
Walker , B. Amendment and response to office action dated Aug. 2, 2006 of U.S. Appl. No. 11/154,843. Howison and Arnott.
Sauer , J. Amendment and response to office action dated Dec. 13, 2004 of U.S. Appl. No. 10/182,635. Jones Day.
Sauer , J. Amendment and response to office action dated Oct. 4, 2004 of U.S. Appl. No. 10/182,635. Jones Day.
Walker , B. Amendment and response to office action dated Oct. 28, 2009 of U.S. Appl. No. 12/347,462. Howison and Arnott.
Ou , J. D. An analysis of annular, annular sector, and circular sector microstrip antennas. Antenna Applications Symposium, 1981.
Sarkar , N. An efficient differential box-counting approach to compute fractal dimension of image. IEEEn Transactions on System, Man and Cybernetics, 1994.
Wong , S. An improved microstrip Sierpinski carpet antenna. Proceedings of APMC, 2000.
Hill , J. E. ; Bass , J. F. An integrated strip-transmission-line antenna system for J-band. Symposium on the USAF Antenna Research and Development Program, 23th, 1973.

(56) References Cited

OTHER PUBLICATIONS

Desclos , L. et al. An interdigitated printed antenna for PC Card Applications. IEEE Transactions on Antennas and Propagation, 1998.
Martin , R. W. ; Stangel, J. J. An unfurlable, high-gain log-periodic antenna for space use. Symposium on the USAF Antenna Research and Development Program, 1967.
Sanchez Hernandez , David et al Analysis and design of a dual-band circularly polarized microstrip patch antenna. IEEE Transactions on Antennas and Propagation, 1995.
Lee, J. C. Analysis of differential line lenght diplexers and long-stub filters. Symposium on the USAF Antenna Research and Development, 23th, 1971.
Shnitkin , H. Analysis of log-periodic folded dipole array, 1992.
Locus , Stanley S. Antenna design for high performance missile environment. Symposium on the USAF Antenna Research and Development Program, 5th, 1955.
Weeks , W. L. Antenna engineering. McGraw-Hill Book Company Oct. 1, 1968.
Volakis , J. L. Antenna engineering handbook. McGraw-Hill; 4th edition Oct. 1, 2007.
Johnson , R. C. Antenna engineering handbook—Table of contents. McGraw-Hill Jan. 1, 1993.
Burnett , G. F. Antenna installations on super constellation airbone early warning and control aircraft. Symposium on the USAF antenna research and development program, 4th Oct. 17, 1954.
Watanabe , T. ; Furutani , K. ; Nakajima , N. et al Antenna switch duplexer for dualband phone (GSM / DCS) using LTCC multilayer technology. IEEE MTT-S International Microwave Symposium Digest Jun. 19, 1999.
Dickstein , Harold D. Antenna system for a ground passive electronic reconnaissance facility. Symposium on the USAF Antenna Research and Development Program Oct. 20, 1958.
Balanis , Constantine A. Antenna Theory—Analysis and design—Chapter 10. Hamilton Printing Jan. 1, 1982.
Balanis , Constantine A. Antenna theory—Analysis and Design—Chapter 9 and Chapter 14. Hamilton Printing Jan. 1, 1982.
Stutzman , W. L. ; Thiele , G. A. Antenna theory and design—Chapter 5—Resonant Antennas: Wires and Patches. Wiley Jan. 1, 1998.
Kraus , John D. Antennas. McGraw-Hill Book Company Jan. 1, 1988.
Saunders , S. R. Antennas and Propagation for Wireless Communication Systems—Chapter 4. John Wiley & Sons Jan. 1, 1999.
The Glenn L. Martin Company Antennas for USAF B-57 series bombers. Symposium on the USAF antenna research and development program, 2nd Oct. 19, 1952.
Navarro , M. Aplicació de diverses modificacions sobre l'antena Sierpinski, antena fractal multibanda. Universitat Politécnica de Catalunya Oct. 1, 1997.
Ingerson , P. G. ; Mayes , P. E. Asymmetrical feeders for log-periodic antennas. Symposium on the USAF antenna research and development program, 17th Nov. 14, 1967.
Wegner , D. E. B-70 antenna system. Symposium on the USAF antenna research and development program, 13th Oct. 14, 1963.
Stang , P. F. Balanced flush mounted log-periodic antenna for aerospace vehicles—in Abstracts of the Twelfth Annual Symposium USAF antenna research. Symposium on USAF antenna Research and Development, 12th Oct. 16, 1962.
Prokhorov , A. M. Bolshaya Sovetskaya Entsiklopediya. Sovetskaya Entsiklopediya Jan. 1, 1976.
So , P. et al Box-counting dimension without boxes—Computing D0 from average expansion rates Physical Review E Jul. 1, 1999.
DuHamel , R. H. Broadband logarithmically periodic antenna structures. IRE International Convention Record Mar. 14, 1957.
Rensh , Y. A. Broadband microstrip antenna. Proceedings of the Moscow International Conference on Antenna Theory and Tech Sep. 22, 1998.
Wong , K. L ; Kuo , J. S. ; Fang , S. T. et al Broadband microstrip antennas with integrated reactive loading. Asia Pacific Microwave Conference Dec. 3, 1999.
Paschen , D. A. Broadband microstrip matching techniques. Antenna Applications Symposium Sep. 21, 1983.
Turner , E. M. Broadband passive electrically small antennas for TV application. Proceedings of the 1977 Antenna Applications Symposium Apr. 27, 1977.
Gupta , K.C. Broadband techniques for microstrip patch antennas—a review. Antenna Applications Sysmposium Sep. 21, 1988.
Debicki , P. S. et al. Calculating input impedance of electrically small insulated antennas for microwave hyperthermia. Microwave Theory and Techniques, IEEE Transactions on Feb. 1, 1993.
Seavey , John C-band paste-on and floating ring reflector antennas Symposium on the USAF Antenna Research and Development Program, 23th Oct. 10, 1973.
Peitgen, Heinz-Otto; Jürgens, Hartmut; Saupe, Dietmar Chaos and fractals. New frontiers of science Springer-Verlag Feb. 12, 1993.
Muramoto , M. et al Characteristics of a small planar loop antenna. IEEE Transactions on Antennas and Propagation, Dec. 1, 1997.
Garg , R. et al. Characteristics of coupled microstriplines. IEEE Transactions on Microwave Theory and Techniques, Jul. 1, 1979.
Blackband , W. T.- Rudge , A. W. ; Milne , K. ; Olver , A. D. et al. Coaxial transmisison lines and components dins The handbook of antenna design—Peter Peregrinus Jan. 1, 1986.
Arutaki , A. ; Chiba , J. Communication in a three-layered conducting media with a vertical magnetic dipole. IEEE Transactions on Antennas and Propagation, Jul. 1, 1980.
Wall , H. ; Davies , H. W. Communications antennas for mercury space capsule. Symposium on the USAF antenna research and development program, 11th Oct. 16, 1961.
Hong , J. S. ; Lancaster , M. J. Compact microwave elliptic function filter using novel microstrip meander open-loop resonators. Electronic Letters Mar. 14, 1996.
Pozar , David M. Comparison of three methods for the measurement of printed antenna efficiency. IEEE Transactions on Antennas and Propagation, Jan. 1, 1988.
Jones , H. S. Conformal and Small antenna designs. Proceedings of the Antennas Applications Symposium Aug. 1, 1981.
Munson , R. Conformal microstrip array for a parabolic dish. Symposium on the USAF Antenna Research and Development Program Oct. 1, 1973.
Munson , R. E. Conformal microstrip communication antenna. Symposium on USAF antenna Research and Development, 23th Oct. 10, 1973.
NA Defendant HTC Corporation's First amended answer and counterclaim to plaintiff's amended complaint. Defendants Oct. 2, 2009.
Moheb , H. Design and development of co-polarized ku-band ground terminal system for very small aperture terminal (VSAT) application. IEEE International Symposium on Antennas and Propagation Digest Jul. 11, 1999.
McSpadden , J. O. Design and experiments of a high-conversion-efficiency 5.8-GHz rectenna. IEEE Transactions on Microwave Theory and Techniques Dec. 1, 1998.
Esteban , J. ; Rebollar , J. M. Design and optimization of a compact Ka-Band antenna diplexer AP-S. Digest. Antennas and Propagation Society International Symposium Jun. 18, 1995.
Campi , M. Design of microstrip linear array antennas. Antenna Applications Symposium Aug. 8, 1981.
VVAA Detailed rejection of U.S. Appl. No. 12/347,462 Baker Boats Jul. 7, 2010.
Turner , E. M. ; Richard , D. J. Development of an electrically small broadband antenna. Symposium on the USAF antenna research and development program, 18th Oct. 15, 1968.
Ikata , O. ; Satoh , Y. ; Uchishiba , H. et al Development of small antenna duplexer using saw filters for handheld phones. IEEE Ultrasonics Symposium Oct. 31, 1993.
Ng , V. Diagnosis of melanoma withn fractal dimesions. IEEE Tencon Jan. 1, 1993.
Nishikawa , T., Ishikawa , Y., Hattori , J. and Wakino , K. Dielectric receiving filter with Sharp stopband using an active feedback resonator method for cellular base stations. IEEE Transactions on Microwave Theory and Techniques Dec. 1, 1989.
NA Digital cellular telecommunications system (Phase 2) : Types of Mobile Stations (MX) (GSM 02.06) ETSI May 9, 1996.

(56) References Cited

OTHER PUBLICATIONS

NA Digital cellular telecommunications system (Phase 2+) ; Radio transmission and reception (GSM 05.05) ETSI Jul. 1, 1996.
NA Digital cellular telecommunications system (Phase2) : Abbreviations and acronyms (GSM01.04) GSM Technical Specification vs. 5.0.0 ETSI Mar. 1, 1996.
NA Digital cellular telecommunications system (Phase2). Mobile Station MS Conformance specifiaction Part 1 Conformance Specification GSM11.10-1 vs.4.21.1 ETSI Aug. 8, 1998.
NA Digital cellular telecommunications system (Phase2); Mobile Station (MS) conformance specification; Part 1: Conformance specification (GSM 11.10-1 version 4.21.1) ETSI Aug. 1, 1998.
Russell , D. A. et al. Dimension of strange attractors Physical Review Letters Oct. 6, 1980.
Yew-Siow , Roger Dipole configurations with strongly improved radiation efficiency for hand-held transceivers Antennas and Propagation, IEEE Transactions on Jul. 1, 1998.
Kumar , G. ; Gupta , K. Directly coupled multiple resonator wideband microstrip antennas IEEE Transactions on Antennas and Propagation Jun. 6, 1985.
Guo , Y. X. ; Luk , K. F. Lee ; Chow , Y. L. Double U-slot rectangular patch antenna Electronic Letters Sep. 17, 1998.
Chiba , N. et al Dual frequency planar antenna for handsets Electronic Letters Dec. 10, 1998.
Erätuuli , P. et al Dual frequency wire antennas Electronic letters Jun. 6, 1996.
Maci , S. et al. Dual-band Slot-loaded patch antenna IEE Proceedings Microwave Antennas Propagation Jun. 1, 1995.
Maci , S. et al. Dual-frequency patch antennas Antennas and Propagation Magazine, IEEE Dec. 1, 1997.
Liu , Zi Dong ; Hall , Peter S. ; Wake , David Dual-frequency planar inverted-f antenna Antennas and Propagation, IEEE Transactions on Oct. 1, 1997.
Lu , J. H. ; Wong , K. L. Dual-frequency rectangular microstrip antenna with embedded spur lines and integrated reactive loading. Microwave and Optical Technology Letters May 20, 1999.
Wong , K. L. ; Sze , J. Y. Dual-frequency slotted rectangular microstrip antenna. Electronic Letters Jul. 9, 1998.
Nakano ; Vichien Dual-frequency square patch antenna with rectangular notch. Electronic Letters Aug. 3, 1989.
Smith , G. S. Efficiency of electrically small antennas combined with matching networks. IEEE Transactions on antennas and propagations May 1, 1977.
Matsushima et al Electromagnetically coupled dielectric chip antenna. IEEE Transactions on Antennas and Propagation, Jun. 1, 1998.
Tanner , R. L. ; O'Reilly , G. A. Electronic counter measure antennas for a modern electronic reconnaissance aircraft. Symposium on the USAF antenna research and development program, 4th Oct. 17, 1954.
Gray , D. ; Lu , J. W. ; Thiel , D. V. Electronically steerable Yagi-Uda microstrip patch antenna array. IEEE Transactions on antennas and propagation May 1, 1998.
Weeks , W. L. Eletromagnetic theory for engineering applications. John Wiley & Sons Jan. 1, 1964.
Simpson , T. L. et al Equivalent circuits for electrically small antennas using LS-decomposition with the method of moments. IEEE Transactions on Antennas and Propagation, Dec. 1, 1989.
Kobayashi , K. Estimation of 3D fractal dimension of real electrical tree patterns. Proceedings of the 4th International Conference on Properties and Applications of Dielectric Materials Jul. 1, 1994.
Misra , S. Experimental investigations on the impedance and radiation properties of a three-element concentric microstrip square-ring antenna. Microwave and Optical TEchnology Letters Feb. 5, 1996.
Model , A. M. Fil• try SVCh v radioreleĭnykh sistemakh—Microwave filters in radiorelay systems Svyaz, Moscow Jan. 1, 1967.
Cohn , S. B. Flush airborne radar antennas. Symposium on the USAF antenna research and development program, 3rd Oct. 18, 1953.
Counter , V. A. ; Margerum , D. L. Flush dielectric disc antenna for radar. Symposium on the USAF antenna research and development program, 2nd Oct. 19, 1952.
McDowell , E. P. Flush mounted X-band beacon antennas for aircraft. Symposium on USAF antenna Research and Development, 3th Oct. 18, 1953.
Martin, W. R. Flush vor antenna for c-121 aircraft. Symposium on the USAF Antenna Research and Development Program, 2nd Oct. 19, 1952.
Counter , V. A. Flush, re-entrant, impedance phased, circularly polarized cavity antenna for missiles. Symposium on the USAF antenna research and development program, 2nd Oct. 19, 1952.
Rouvier , R. et al. Fractal analysis of bidimensional profiles and application to electromagnetic scattering from soils. IEEE Jan. 1, 1996.
Berizzi , F. Fractal analysis of the signal scattered from the sea surface. IEEE Transactions on Antennas and Propagation, Feb. 1, 1999.
Addison , P. S. Fractal and Chaos an illustrated course—Full Institute of Physics Publising Bristol and Philadelphia Jan. 1, 1997.
Kutter , R. E. Fractal antenna design. University of Dayton Jan. 1, 1996.
Penn , A. Fractal dimension of low-resolution medical images Engineering in Medicine and Biology Society, 1996. Proceedings of the 18th Annual International Conference of the IEEE Jan. 1, 1996.
Cohen , N. Fractal element antennas. Journal of Electronic Defense Jul. 1, 1997.
Hart , N. ; Chalmers , A. Fractal element antennas. Digital Image Computing and Applications 97 in New Zealand Jun. 2, 1997.
Falconer , K. Fractal geometry _Full. Jonh Wiley Sons—2nd ed. Jan. 1, 2003.
Falconer , K. Fractal geometry. Mathematical foundations and applications. Wiley Jan. 1, 2003.
Cohen , N. ; Hohlfeld , R. G. Fractal loops and the small loop approximation—Exploring fractal resonances Communications quarterly Dec. 1, 1996.
Neary , D. Fractal methods in image analysis and coding. Dublin City University Jan. 22, 2001.
Song, C. T. P. Fractal stacked monopole with very wide bandwidth. Electronic Letters Jun. 1, 1999.
Walker , G. J. et al Fractal volume antennas. Electronic Letters Aug. 6, 1998.
Addison , P. S. Fractals and chaos. Institute of Physics Publishing Jan. 1, 1997.
Lauwerier , H. Fractals. Endlessly repeated geometrical figures. Princeton University Press Jan. 1, 1991.
Feng , J. Fractional box-counting approach to fractal dimension estimation Pattern Recognition, 1996., Proceedings of the 13th International Conference on Jan. 1, 1996.
*Bhavsar , Samir A. Fractus S.A.* v. *Samsung Electronics Co., Ltd. et al.*, 6:09-cv-00203 and *Fractus S.A.* v. *LG Electronics Mobilecomm U.S.A., Inc. et al.*, 6-09-cv-00205 disclosure of material information to the USPTO Baker Botts LLP Oct. 28, 2009.
Rumsey , V. Frequency independent antennas. Academic Press Jan. 1, 1996.
Kuo , Sam Frequency-independent log-periodic antenna arrays with increased directivity and gain. Symposium on USAF Antenna Research and Development, 21th Annual Oct. 12, 1971.
Gillespie , E. S. Glide slope antenna in the nose radome of the F-104 A and B. Symposium on the USAF antenna research and development program, 7th Oct. 21, 1957.
NA GSM Technical specification and related materials. ETSI Mar. 1, 1996.
NA Hagenuk mobile phone—Antenna photo—Technical specs—User manual. Hagenuk Telecom GmbH Jan. 1, 1996.
James , J. R. Handbook of microstrip antennas—Chapter 7. Institution of Electrical Engineers Jan. 2, 1989.
James , J. R. ; Hall , P. S. Handbook of microstrip antennas—vol. 1—Chapter 7. Peter Peregrinus Ltd. Jan. 1, 1989.
Holzschuh , D. L. Hardened antennas for atlas and titan missile site communications. Symposium on the USAF Antenna Research and Development Program, 13th Oct. 14, 1963.

(56) References Cited

OTHER PUBLICATIONS

Mayes , P. E. High gain log-periodic antennas. Symposium on the USAF antenna research and development program, 10th Oct. 3, 1960.
McDowell , E. P. High speed aircraft antenna problems and some specific solutions for MX-1554. Symposium on the USAF Antenna Research and Development Program, 2nd Oct. 19, 1952.
Hyneman , R. F. ; Mayes , P. E. ; Becker , R. C. Homing antennas for aircraft ( 450-2500 MC ). Symposium on the USAF antenna research and development program, 5th Oct. 16, 1955.
NA IEEE Standard definitions of terms for antennas. Antenna Standards Committee of the IEEE Antennas and Propagation Group, USA; Jun. 22, 1983.
Nadan , T. ; coupez , J. P. Integration of an antenna filter divice, using a multi-layer, multi-technology process European Microwave Conference, 28th Oct. 1, 1988.
Gobien , A. T. Investigation of low profile antenna designs for use in hand-held radios—Master of Science Virginia Polytechnic Institute and State University Aug. 1, 2007.
Snow , W. L. Ku-band planar spiral antenna. Symposium on the USAF Antenna Research and Development Program, 19th Oct. 14, 1969.
Schaubert , D. H. ; Chang , W. C. ; Wunsch , G. J. Measurement of phased array performance at arbitrary scan angles. Antenna Applications Symposium Sep. 21, 1994.
Gupta , K. C. ; Benalla , A. Microstrip antenna design. Artech House Jan. 1, 1988.
Garg , R. et al. Microstrip antenna design handbook. Artech House Jan. 1, 2001.
Carver , K. R. et al. Microstrip antenna technology in "Microstrip antennas" to D.M. Pozar; IEEE Antennas and Propagation Society Jan. 1, 1995.
Carver , K. R. et al. Microstrip antenna technology. IEEE Transactions on Antennas and Propagation, Jan. 1, 1981.
Pozar , David M. Microstrip antennas. Proceedings of the IEEE Jan. 1, 1992.
Pozar , David M. ; Schaubert , Daniel H. Microstrip antennas. The analysis and design of microstrip antennas and arrays. IEEE Press; Pozar, Schaubert Jan. 1, 1995.
Deschamps , G. Microstrip Microwave Antenna. Symposium on the USAF Antenna Research and Development Program Oct. 18, 1953.
Munson , R. Microstrip phased array antennas. Symposium on the USAF Antenna Research and Development Program, 22th Oct. 11, 1972.
Pozar , David M. Microwave Engineering. Addison-Wesley Jan. 1, 1990.
Davidson , B. et al. MID wide band helix antenna for PDC diversity. MID Feb. 2, 1998.
Leisten , O. et al. Miniature dielectric-loaded personal telephone antennas with low user exposure. Electronic Letters Aug. 20, 1998.
Hikita , M. et al Miniature SAW antenna duplexer for 800-Mhz portable telephone used in cellular radio systems. IEEE Transactions on Microwave Theory and Techniques, Jun. 1, 1988.
Shibagaki , N. ; Sakiyama , K. ; Hikita , M. Miniature saw antenna duplexer module for 1.9GHz PCN systems using saw-resonator-coupled filters IEEE Ultrasonics Symposium Oct. 5, 1998.
Lancaster , M. J. et al. Miniature superconducting filters. IEEE Transactions on Microwave Theory and Techniques, Jul. 1, 1996.
Weman , E. Minutes from Oral Proceedings in accordance with rule 76(4) EPC for EP Application 00909089.5 EPO Jan. 28, 2005.
NA Motorola 2000x pager. Motorola Jun. 13, 1997.
NA Motorola Advisor Elite mobile phone—Antenna photos—User manual. Motorola Jan. 1, 1997.
NA Motorola Advisor Gold FLX pager. Motorola , Inc Aug. 1, 1996.
NA Motorola Bravo Plus pager. Motorola Mar. 3, 1995.
NA Motorola P935. Motorola Aug. 13, 1997.
Borja , C. MSPK product Fractus—Telefonica Jan. 1, 1998.
Mayes , P.E. Multi-arm logarithmic spiral antennas. Symposium on the USAF Antenna Research and Development Program, 10th Oct. 3, 1960.
Breden , R. et al. Multiband printed antenna for vehicles. University of Kent Jan. 3, 2000.
Strugatsky , A. et al Multimode multiband antenna Tactical communications: Technology in transition. Proceedings of the tactical communications conference Apr. 28, 1992.
Isbell , D. E. Multiple terminal log-periodic antennas. Symposium on the USAF antenna research and development program, 8th Oct. 20, 1958.
Cohen, N. NEC4 analysis of a fractalized monofiliar helix in an axial mode. ACES Conference Procedings Apr. 1, 1998.
Hikita , M. ; Shibagaki , N. ; Asal , K. et al New miniature saw antenna duplexer used in GHz-band digital mobile cellular radios. IEEE Ultrasonics Symposium Nov. 7, 1995.
Adcock , M. D New type feed for high speed conical scanning. Symposium on the USAF Antenna Research and Development Program, 2nd Aug. 11, 1952.
NA Nokia 3210. Nokia Jan. 1, 1999.
NA Nokia 3360. Nokia May 3, 2001.
NA Nokia 8210. Nokia Jan. 1, 1999.
NA Nokia 8260. Nokia Sep. 8, 2000.
NA Nokia 8260—FCC ID GMLNSW-4DX. Nokia Apr. 1, 1999.
NA Nokia 8265. Nokia Mar. 4, 2002.
NA Nokia 8810. Nokia Jan. 1, 1998.
NA Nokia 8850. Nokia Jan. 1, 1999.
NA Nokia 8860. Nokia and Federal Communications Commission ( FCC ) Jun. 24, 1999.
Isbell , D. E. Non-planar logarithmically periodic antenna structures. Symposium on the USAF antenna research and development program, 7th Oct. 21, 1957.
Kumar , G. ; Gupta , K. Nonradiating edges and four edges gap-coupled multiple resonator broadband microstrip antennas. IEEE Transactions on Antennas and Propagation, Feb. 1, 1985.
Shenoy , A. et al. Notebook satcom terminal technology development. International Conference on Digital Satellite Communications, 10th May 15, 1995.
Nguyen , H. Notice of Allowance of U.S. Appl. No. 10/182,635 dated on Apr. 11, 2005.
Nguyen , H. Notice of Allowance of U.S. Appl. No. 11/110,052 dated on Mar. 31, 2006.
Nguyen , H. Notice of Allowance of U.S. Appl. No. 11/154,843 dated on Oct. 24, 2006.
Nguyen , H. Notice of Allowance of U.S. Appl. No. 11/179,250 dated on Jan. 26, 2007.
Nguyen , H. Notice of Allowance of U.S. Appl. No. 11/686,804 dated on Sep. 9, 2008.
Nguyen , H. Notice of Allowance of U.S. Appl. No. 12/347,462 dated on Apr. 19, 2010.
Nguyen , H. Notice of Allowance of U.S. Appl. No. 12/347,462 dated on Jun. 29, 2010.
Nguyen , H. Notice of Allowance of U.S. Appl. No. 12/347,462 dated on May 18, 2009.
Hagström , P. Novel ceramic antenna filters for GSM / DECT and GSM / PCN network terminals the 8th IEEE International Symposium on Personal, Indoor and Mobile Radio Communications, 1997. 'Waves of the Year 2000'. PIMRC '97 Sep. 1, 1997.
Lu , J.H. ; Tang , C. L. ; Wong , K. L. Novel dual-frequency and broad-band designs of slot-loaded equilateral triangular microstrip antennas. IEEE Transactions on Antennas and Propagation Jul. 1, 2000.
Felgel , F. W. Office Action for European patent application 00909089 dated on Feb. 7, 2003.
Wimer , Michael Office Action for U.S. Appl. No. 10/422,578 dated on Apr. 7, 2005.
Wimer , M. C. Office Action for U.S. Appl. No. 10/822,933 dated on Oct. 5, 2006.
Nguyen , H. Office action for U.S. Appl. No. 10/182,635 dated on Oct. 4, 2004.
Wimer , Michael C. Office Action for U.S. Appl. No. 10/422,578 dated on Oct. 4, 2004.
Nguyen , H. Office Action for U.S. Appl. No. 11/154,843 dated on Aug. 2, 2006.
Nguyen , H. Office action for U.S. Appl. No. 11/154,843 dated on May 9, 2006.

(56) References Cited

OTHER PUBLICATIONS

Nguyen , H. Office action of U.S. Appl. No. 11/686,804 dated on Apr. 15, 2008.
Nguyen , H. Office Action of U.S. Appl. No. 12/347,462 dated on Oct. 28, 2009.
Nguyen , H. Office Action of U.S. Appl. No. 12/498,090 dated on Aug. 18, 2010.
Nguyen , H. Office Action of U.S. Appl. No. 10/182,635 dated Dec. 13, 2004.
Bach Andersen , J. et al. On closely coupled dipoles in a random field. Antennas and Wireless Propagation Letters, IEEE Dec. 1, 2006.
Ancona , C. On small antenna impedance in weakly dissipative media. IEEE Transactions on Antennas and Propagation, Mar. 1, 1978.
Puente , C. ; Romeu , J. ; Cardama , A. ; Pous , R. On the behavior of the Sierpinski multiband fractal antenna. IEEE Transactions on Antennas and Propagation, Apr. 1, 1998.
Chen , S. et al. On the calculation of Fractal features from images. IEEE Transactions on Pattern Analysis and Machine Intelligence Oct. 1, 1993.
Navarro , M. Original and translation in English of Final Degree Project—Diverse modifications applied to the Sierpinski antenna, a multi-band fractal antenna. Universitat Politecnica de Catalunya Oct. 1, 1997.
VVAA P.R. 4-3 joint claim construction statement. Fractus Jun. 14, 2010.
Borja , C. Panel 01 Fractus—Telefonica Jan. 1, 1998.
Taga , T. Performance analysis of a built-in planar inverted F antenna for 800 MHz band portable radio units. IEEE Journal on Selected Areas in Communications Jan. 1, 1987.
Puente , C. ; Romeu , J. ; Bartolome , R. ; Pous , R. Perturbation of the Sierpinski antenna to allocate operating bands. Electronic Letters Nov. 21, 1996.
Musser , G. Practical fractals. Scientific American Jul. 1, 1999.
Breden , R. et al. Printed fractal antennas National conference on antennas and propagation Apr. 1, 1999.
Rotman , W. Problems encountered in the design of flush-mounted antennas for high speed aircraft. Symposium on the USAF Antenna Research and Development Program, 2nd Oct. 19, 1952.
Werner , D. H. Radiation characteristics of thin-wire ternary fractal trees. Electronic Letters Apr. 15, 1999.
Terman , F. E. Radio engineering. McGraw-Hill Book Company, Inc. Jan. 1, 1947.
Hong , J. S. ; Lancaster , J. Recent advances in microstrip filters for communications and other applications. IEEE Colloquium on Advances in Passive Microwave Components (Digest No. 1997/154) May 22, 1997.
Daniel , A. E. ; Kumar , G. Rectangular microstrip antennas with stub along the non-radiating edge for dual band operation. IEEE Antennas and Propagation Society International Symposium Digest Jun. 18, 1995.
Sauer , Joseph M. Request for Continued Examination for U.S. Appl. No. 10/422,578 with response to the office action dated on Apr. 7, 2005 and the advisory action dated on Jun. 23, 2005. Jones Day Aug. 8, 2005.
NA Request for inter partes reexamination for US patent No. 7148850. CC-A: Claim Chart Comparing Claims 1, 4, 6, 17, 19, 21, 22, 24-26, 29, 35, 38, 40, 45-48, 51, 53, 58, 61, 65, 66, 69, and 70 to US patent 6140975 Cohen Defendants Aug. 1, 2010.
NA Request for inter partes reexamination for US patent No. 7148850. CC-B: Claim Chart Comparing Claims 1, 4, 6, 16, 17, 19, 21, 22, 24-26, 29, 35, 38, 40, 45-48, 51, 53, 57, 58, 61, 65, 66, 69 and 70 to US patent 6140975 Cohen Defentands Aug. 1, 2010.
NA Request for inter partes reexamination for US patent No. 7148850. CC-C: Claim Chart Comparing Claims 1, 4, 6, 17, 19, 21, 22, 24-26, 29, 35, 38, 40, 45-48, 53, 58, 61, 65, 66, and 69 to US patent 6140975 Cohen Defendants Aug. 1, 2010.
NA Request for inter partes reexamination for US patent No. 7148850. CC-D: Claim Chart Comparing Claims 1, 4, 6, 16, 17, 19, 21, 22, 24-26, 29, 35, 38, 40, 45-48, 51, 53, 57, 58, 61, 65, 66, and 69 to US patent 6140975 Cohen Defendants Aug. 1, 2010.
NA Request for inter partes reexamination for US patent No. 7148850. CC-E: Claim Chart Comparing Claims 1, 4, 6, 16-17, 19, 21, 22, 24-26, 29, 35, 38, 40, 45-48, 51, 53, 57, 58, 61, 65, 66, 69 and 70 to patent EP0590671B1 Sekine Defendants Aug. 1, 2010.
NA Request for inter partes reexamination for US patent No. 7148850. CC-F: Claim Chart Comparing Claims 1, 4, 6, 16, 17, 19, 21, 22, 24-26, 29, 35, 38, 40, 45-48, 51, 53, 57, 58, 61, 65, 66, 69, and 70 to US patent 5363114 Shoemaker Defendants Aug. 1, 2010.
NA Request for inter partes reexamination for US patent No. 7202822—CC-A-1—Claim chart comparing claims 1, 4-5, 7-9, 20-21, 25 and 31 of US patent 7202822 to US patent 6140975 Defendants Aug. 9, 2010.
NA Request for inter partes reexamination for US patent No. 7202822—CC-D—Claim Chart Comparing claims 1, 4-5, 7-9, 12, 13, 15, 18, 21, 25, 29-31, 35, 44, 46, 48 and 52 of US patent No. 7202822 to U.S. Patent 5363114 to Shoemaker Defendants Aug. 4, 2010.
NA Request for inter partes reexamination for US patent No. 7202822 issued Apr. 10, 2007—CC-C—Claim Chart Comparing claims 1, 4, 5, 7-9, 12, 13, 15, 18, 21, 25, 29-31, 35, 44, 46, 48 and 52 of US patent No. 7202822 to Sanad. Defendants Aug. 4, 2010.
NA Request for inter partes reexamination for US patent No. 7202822. Exhibit CC-A-2. Claim chart comparing claims 1, 4-5, 7-9, 12-13, 15, 18, 20-22, and 31 of US patent 7202822 to US patent 6140975 Defendants Aug. 9, 2010.
NA Request for inter partes reexamination for US patent No. 7202822. Exhibit CC-A-3. Claim Chart Comparing claims 1, 4, 5, 7-9, 12, 13, 15, 18, 20-25, 29-31, 35, 44, 46, 48, 52 and 53 of US patent 7202822 to US patent 6140975 Defendants Aug. 9, 2010.
NA Request for inter partes reexamination for US patent No. 7202822. Exhibit CC-A-4 Claim Chart Comparing claims 1, 4, 5, 7-9, 12, 13, 15, 18, 20-25, 29-31, 35, 44, 46, 48, 52 and 53 of US patent 7202822 to US patent 6140975 Defendants Aug. 9, 2010.
NA Request for inter partes reexamination for US patent No. 7202822. Exhibit CC-B Claim Chart Comparing claims 1, 4, 5, 7-9, 13, 15, 18, 20-25, 29-31, 35, 44, 46, 48, 52, and 53 of US 7202822 to Sekine Defendants Aug. 9, 2010.
NA Request for inter partes reexamination of US patent No. 7202822 issued Apr. 10, 2007—OTH-B—Samsung SCH U340 Defendants Aug. 10, 2010.
NA Request for inter partes reexamination of US patent No. 7202822 issued Apr. 10, 2007—OTH-C—Samsung SCH-R500 Defendants Aug. 10, 2010.
NA Request for inter partes reexamination of US patent No. 7202822 issued Apr. 10, 2007—OTH-D—Civil Action No. 6:09-cv-00203 Defendants May 28, 2010.
Fractus Response to Office Action for CN patent application 00818542 dated on Nov. 5, 2004 China Council for the Promotion of International Trade Patent and Trademark Office Mar. 31, 2005.
Robinson, R. T. Response to Office Action for U.S. Appl. No. 10/822,933 dated on Oct. 5, 2006 Jenkens & Gilchrist Jan. 4, 2007.
Sauer , Joseph M. Response to the Office Action dated Apr. 7, 2005 for the U.S. Appl. No. 10/422,578 Jones Day May 31, 2005.
Sauer , Joseph M. Response to the Office Action dated Oct. 4, 2004 for the U.S. Appl. No. 10/422,578 Jones Day Jan. 6, 2005.
NA RIM 857 pager. RIM Oct. 1, 2000.
NA RIM 950 product—Photos of RIM Jun. 30, 1998.
NA RIM 957 page maker. RIM Nov. 15, 2000.
NA Rockwell B-1B Lancer <http://home.att.net/~jbaugher2/newb1_2.html> Oct. 12, 2001.
Shibagaki , N. Saw antennas duplexer module using saw-resonator-coupled filter for PCN system. IEEE Ultrasonics symposium Oct. 5, 1998.
Mushiake, Yasuto Self-Complementary Antennas : Principle of Self Complementarity for Constant Impedance. Springer-Verlag Jan. 1, 1996.
Lu , J. H. ; Wong , K. L. Single-feed dual-frequency equilateral-triangular microstrip antenna with pair of spur lines. Electronic Letters Jun. 11, 1998.

(56) References Cited

OTHER PUBLICATIONS

Pan, S. et al. Single-feed dual-frequency microstrip antenna with two patches. Antennas and Propagation Society International Symposium, 1999. IEEE Aug. 1, 1999.
Lu , Jui-Han ; Tang , Chia-Luan ; Wong , Kin-Lu Single-feed slotted equilateral triangular microstrip antenna for circular polarization. IEEE Transactions on Antennas and Propagation, Jul. 1, 1999.
Huynh , T. ; Lee , K. F. Single-layer single-patch wideband microstrip antenna. Electronic Letters Aug. 3, 1995.
Lu , Jui-Han et al. Slot-loaded, Meandered Rectangular Microstrip Antenna With Compact Dualfrequency Operation. IEEE Electronics Letters May 28, 1998.
Chen , X. ; Ying , Z. Small Antenna Design for Mobile Handsets (part I). Sony Ericsson Mar. 25, 2009.
Wheeler , H. A. Small antennas. Symposium on the USAF antenna research and development program, 23rd Oct. 10, 1973.
Waterhouse , R. B. Small microstrip patch antenna. Electronic letters Apr. 13, 1995.
Waterhouse , R. B. Small printed antennas with low cross-polarised fields. Electronic letters Jul. 17, 1997.
NA Software—Box counting dimension [electronic] http://www.sewanee.edu/Physics/PHYSICS123/BOX%20COUNTING%20DIMENSION.html Apr. 1, 2002.
Mayes , P. Some broadband , low-profile antennas. Antenna Applications Symposium Sep. 18, 1985.
Chen , Wen-Shyang Square-ring microstrip antenna with a cross strip for compact circular polarization operation. IEEE Transactions on Antennas and Propagation, Oct. 1, 1999.
Paschen , D. A. Structural stopband elimination with the monopole-slot antenna. Antenna Applications Symposium Sep. 22, 1982.
Gilbert , R. ; Pirrung , A. ; Kopf , D. et al. Structurally-integrated optically-reconfigurable antenna array. Antenna Applications Symposium Sep. 20, 1995.
Misra , S. ; Chowdhury , S. K. Study of impedance and radiation properties of a concentric microstrip triangular-ring antenna and Its modeling techniques using FDTD method. IEEE Transactions on Antennas and Propagation Apr. 1, 1998.
NA Summons to attend oral proceedings pursant to rule 71 (1) EPC for EP application 00909089. EPO Oct. 28, 2004.
Force , R. et al. Synthesis of multilayer walls for radomes of aerospace vehicles. Symposium on the USAF Antenna Research and Development Program Nov. 14, 1967.
Scharfman , W. Telemetry antennas for high altitude missiles. Symposium on the USAF antenna research and development program, 8th Oct. 20, 1958.
Tang , Y. The application of fractal analysis to feature extraction. IEEE Jan. 1, 1999.
Bushman , F.W tThe boeing B-52 all flush antenna system. Symposium on the USAF Antenna Reseach and Development Program, 5th Oct. 16, 1955.
Hoffmeister , M. The dual-frequency-inverted-F monopole antenna for mobile communications. N/A Jan. 6, 1999.
Dyson , J. D. The equiangular spiral antenna. IRE Transactions on Antennas and Propagation, Apr. 1, 1959.
Rudge, A. W. The handbook of antenna design. Peter Peregrinus Jan. 1, 1986.
Rudge , A. W. et al The handbook of antenna design IEE Eletromagnetic Waves Series; Peter Peregrinus Ltd.; 2nd ed. Jan. 1, 1986.
Collier , D. ; Shnitkin , H. The monopole as a wideband array antenna element. Antenna Applications Symposium Sep. 22, 1993.
Kurpis , G. P. The New IEEE standard dictionary of electrical and electronics terms. IEEE Standards Jan. 1, 1993.
Dyson , J. D. The non-planar equiangular spiral antenna. Symposium on the USAF Antenna Research and Development Program Oct. 20, 1958.
Wheeler , H. A. The radiansphere around a small antenna. Proceedings of the IRE Aug. 1, 1959.
Lo , Y. T. ; Solomon , D. ; Richards , W. F. Theory and experiment on microstrip antennas. Antenna Applications Symposium Sep. 20, 1978.
Sinclair, G. Theory of models of electromagnetic systems. Proceedings of the IRE Nov. 1, 1948.
Heberling , D. ; Geisser , M. Trends on handset antennas. Microwave Conference, 1999. 29th European Mar. 3, 1999.
Du Plessis , M. ; Cloete , J. H. Tuning stubs for microstrip patch antennas AP-S. Digest Antennas and Propagation Society International Symposium Jun. 28, 1993.
Snow , W. L. UHF crossed-slot antenna and applications. Symsposium on the USAF Antenna Research and Development program, 19th Sep. 1, 1963.
Batson , D. D. et al VHF unfurlable turnstile antennas. Symposium USAF antenna research and development program, 19th Oct. 14, 1969.
Carpintero , F. Written submissions for EP application 00909089. Herrero y Asociados Dec. 15, 2004.
Borja, C.; Puente, C. Iterative network models to predict the performance of Sierpinski fractal antennas. IEEE. Jan. 1, 1999.
American Century Dictionary, Oxford University Press, Oxford University Press, 1995. pp. 376, 448 dated Jan. 1, 1995.
American Heritage College Dictionary, pp. 340 and 1016, Mifflin Company dated Jan. 1, 1997.
American Heritage Dictionary of the English Language (2000). 1306-1361.
Balanis , C. “Fundamental parameters of antennas—Chapter 2 in Antenna Theory: Analysis & Design”, dated 1997. pp. 28-100.
Borowski, E. , Dictionary of Mathematics (Collins: 1989) pp. 456-45, Getting Acquainted with Fractals, pp. 50-53 dated Jan. 1, 1989.
Buczowski , S. The Modified Box-Counting Method: Analysis of Some Characteristic Parameters, dated 1998.
Caswell , W.E., Invisible errors in dimension calculations: geometric and systematic effects by W.E. Caswell and J.A. York, dated 1986 , J. Opt. Soc. Am. A 7, 1055-1073 (1990), J. Opt. Soc. Am. dated Jan. 1, 1986.
Claims for the EP Patent No. 00909089, Herrero y Asociados dated on Jun. 14, 2005.
Collier, C. P. , Geometry for Teachers. Waveland Press (2d ed. 1984) pp. 49-57 dated on Jan. 1, 1984.
Collins Dictionary, Collins, 1979. pp. 608, dated Jan. 1, 1979.
Court Order, Provisional Claim Construction Ruling and Order, Magistrate Judge John D. Love in the case of *Fractus SA* v. *Samsung Electornics Co. Ltd. et al.* Case No. 6:09-cv-00203 (E.D. Tex.) dated Nov. 9, 2010.
Crystal, E. et al. Hairpin.lin and hybridhairpin.line . Half-wave parallel.coupled line filters. IEEE Transaction on Microwave dated on Nov. 11, 1972.
Defendant, Defendant’s Invalidity Contentions Case No. 6:09-cv-00203 (E.D. Tex.), including apendix B and exhibits 6, 7, 10, 11 referenced in Space Filling Antenna, dated on Feb. 24, 2010.
Defendant, HTC America Inc’s Answer and Counterclaim to Plaintiff’s Amended Complaint in the case of *Fractus SA* v. *Samsung Electornics Co. Ltd. et al.* Case No. 6:09-cv-00203 (E.D. Tex.) dated Sep. 25, 2009.
Defendant, HTC America, Inc.’s Amended Answer and Counterclaim to Plaintiff’s Second Amended Complaint in the case *Fratcus SA* v. *Samsung Electornics Co. Ltd. et al.* Case No. 6:09-cv-00203 (E.D. Tex.) dated Feb. 24, 2010.
Defendant, HTC America, Inc.’s Amended Answer and Counterclaim to Plaintiff’s Second Amended Complaint in the case of *Fractus SA* v. *Samsung Electornics Co. Ltd. et al.* Case No. 6:09-cv-00203 (E.D. Tex.) dated Feb. 25, 2010.
Defendant, HTC America, Inc’s Answer and Counterclaims to Plaintiff’s Second Amended Complaint in the case of *Fractus SA* v. *Samsung Electornics Co. Ltd. et al.* Case No. 6:09-cv-00203 (E.D. Tex.) dated Dec. 21, 2009.
Defendant, HTC Corporation’s Amended Answer and Counterclaim to Plaintiff’s Second Amended Complaint in the case of *Fractus SA* v. *Samsung Electornics Co. Ltd. et al.* Case No. 6:09-cv-00203 (E.D. Tex.) dated Feb. 24, 2010.

(56) References Cited

OTHER PUBLICATIONS

Defendant, HTC Corporation's Amended Answer and Counterclaim to Plaintiff's Second Amended Complaint in the case of *Fractus SA* v. *Samsung Electornics Co. Ltd. et al.* (E.D. Tex.) dated Feb. 25, 2010.
Defendant, HTC Corporation's Answer and Counterclaim to Plaintiff's Amended Complaint in the case of *Fractus SA* v. *Samsung Electornics Co. Ltd et al.* Case No. 6:09-cv-00203 (E.D. Tex.) dated Sep. 25, 2009.
Defendant, HTC Corporation's Answer and Counterclaims to Plaintiff's Second Amended Complaint in the case of *Fractus SA* v. *Samsung Electornics Co. Ltd. et al.* Case No. 6:09-cv-00203 (E.D. Tex.) Dec. 21, 2009.
Defendant, Kyocera Communications Inc's Answer, Affirmative Defenses and Counterclaims to Plantiff's Amended Complaint in the case of *Fractus SA* v. *Samsung Electornics Co. Ltd. et al.* Case No. 6:09-cv-00203 (E.D. Tex.) dated Jul. 21, 2009.
Defendant, Kyocera Communications Inc's Answer, Affirmative Defenses and Counterclaims to Second Amended Complaint in the case of *Fractus SA* v. *Samsung Electornics Co. Ltd. et al.* Case No. 6:09-cv-00203 (E.D. Tex.) dated Dec. 22, 2009.
Defendant, Kyocera Wireless Corp's Answer, Affirmative Defenses and Counterclaims to Paintiff's Second Amended Complaint in the case of *Fractus SA* v. *Samsung Electornics Co. Ltd. et al.* Case No. 6:09-cv-00203 (E.D. Tex.) dated Dec. 22, 2009.
Defendant, Kyocera Wireless Corp's Answer, Affirmative Defenses and Counterclaims to Plantiff's Amended Complaint Complaint in the case of *Fractus SA* v. *Samsung Electornics Co. Ltd. et al.* Case No. 6:09-cv-00203 (E.D. Tex.) dated Jul. 21, 2009.
Defendant, LG Electronics Mobilecomm USA., Inc.'s Answer and Counterclaim to Fractus'Complaint in the case of *Fractus SA* v. *Samsung Electornics Co. Ltd. et al.* Case No. 6:09-cv-00203 (E.D. Tex.) dated Oct. 1, 2009.
Defendant, Palm Inc.'s Answer, Affirmative Defenses and Counterclaims to Plaintiff's Amended complaint in the case of *Fractus SA* v. *Samsung Electornics Co. Ltd. et al.* Case No. 6:09-cv-00203 (E.D. Tex.) dated Jul. 21, 2009.
Defendant, Palm, Inc's Answer, Affirmative Defenses and Counterclaims to Second Amended Complaint in the case of *Fractus SA* v. *Samsung Electornics Co. Ltd. et al.* Case No. 6:09-cv-00203 (E.D. Tex.) dated Dec. 22, 2009.
Defendant, Pantech Wireless, Inc.'s Answer, Affirmative Defenses and Counterclaims to Fractus' Amended Complaint *Fractus SA* v. *Samsung Electornics Co. Ltd. et al.* Case No. 6:09-cv-00203 (E.D. Tex.) dated Jun. 4, 2009.
Defendant, Pantech Wireless, Inc's Answer, Affirmative Defenses and Counterclaims to Plaintiff's Second Amended in the case of *Fractus SA* v. *Samsung Electornics Co. Ltd. et al.* Case No. 6:09-cv-00203 (E.D. Tex.) dated Dec. 21, 2009.
Defendant, Personal Communications Devices Holdings, LLC's Answer, Affirmative Defenses and Counterclaims to Second Amended Complaint in the case of *Fractus SA* v. *Samsung Electornics Co. Ltd. et al.* Case No. 6:09-cv-00203 (E.D. Tex.) dated Dec. 17, 2009.
Defendant, Personal Communications Device Holdings, LLC's Answer, Affirmative Defenses and Counterclaims to Fractus' Amended Complaint in the case of *Fractus SA* v. *Samsung Electornics Co. Ltd. et al.* Case No. 6:09-cv-00203 (E.D. Tex.) dated Jul. 20, 2009.
Defendant, Research in Motion LTD and Research in Motion Corporation's Second Answer, Defenses and Counterclaims to Plaintiff's Second Amended Complaint in the case of *Fractus SA* v. *Samsung Electornics Co. Ltd. et al.* Case No. 6:09-cv-00203 (E.D. Tex.) dated Dec. 21, 2009.
Defendant, Sanyo Electric Co. LTD's Answer to Second Amended Complaint for Patent Infringement in the case of *Fractus SA* v. *Samsung Electornics Co. Ltd. et al.* Case No. 6:09-cv-00203 (E.D. Tex.) dated Dec. 22, 2009.
Defendant, Sanyo North America Corporation's Answer to Second Amended Complaint in the case of *Fractus SA* v. *Samsung Electornics Co. Ltd. et al.* Case No. 6:09-cv-00203 (E.D. Tex.) dated Dec. 22, 2009.
Defendant, Sanyo North America Corporation's Partial Answer to Amended Complaint for Patent Infringement in the case of *Fractus SA* v. *Samsung Electornics Co. Ltd. et al.* Case No. 6:09-cv-00203 (E.D. Tex.) dated Jul. 20, 2009.
Defendant, Sharp's Amended Answer to Second Amended Complaint in the case of *Fractus SA* v. *Samsung Electornics Co. Ltd. et al.* Case No. 6:09-cv-00203 (E.D. Tex.) dated Feb. 24, 2010.
Defendant, Sharp's Answer to Second Amended Complaint in the case of *Fractus SA* v. *Samsung Electornics Co. Ltd. et al.* Case No. 6:09-cv-00203 (E.D. Tex.) dated Dec. 29, 2009.
Defendant, UTStarcom, Inc.'s Answer, Affirmative Defenses, and Counterclaims to Fractus' Amended Complaint in the case of *Fractus SA* v. *Samsung Electornics Co. Ltd. et al.* Case No. 6:09-cv-00203 (E.D. Tex.) dated Jun. 8, 2009.
Defendant, UTStarcom, Inc's Answer, Affirmative Defenses and Counterclaims to Second Amended Complaint in the case of *Fractus SA* v. *Samsung Electornics Co. Ltd. et al.* Case No. 6:09-cv-00203 (E.D. Tex.) dated Dec. 22, 2009.
Defendants, Baxter , J., Declaration of Jeffrey Baxter—Including exhibits: J, K, L, M, N, O, P, Q, R, S, T, U, Z, AA, KK, LL, WW, BBB, EEE, GGG, HHH, III, KKK, MMM, NNN, OOO, PPP, QQQ, TTT, UUU, VVV, WWW, YYY, ZZZ, AAAA, BBBB—in the case of *Fractus SA* v. *Samsung Electornics Co. Ltd. et al.* Case No. 6:09-cv-00203 (E.D. Tex.) dated Jul. 29, 2010.
Defendants, Claim Construction and Motion for Summary Judgment, Markman Hearing in the case of *Fractus SA* v. *Samsung Electornics Co. Ltd. et al.* Case No. 6:09-cv-00203 (E.D. Tex.) dated Jul. 9, 2010.
Defendants, HTC America, Inc's First Amended Answer and Counterclaims to Plaintiff's Amended Complaint in the case of *Fractus SA* v. *Samsung Electornics Co. Ltd. et al.* Case No. 6:09-cv-00203 (E.D. Tex.) dated Oct. 2, 2009.
Defendants, Kyocera Communications, Inc; Palm Inc. and UTStarcom, Inc. Response to Fractus SA's Opening Claim Construction Brief in the case of *Fractus SA* v. *Samsung Electornics Co. Ltd. et al.* dated Jul. 30, 2010.
Defendants, Letter from Baker Botts to Howison & Arnott LLP including Exhibits in the case of *Fractus SA* v. *Samsung Electornics Co. Ltd. et al.* Case No. 6:09-cv-00203 (E.D. Tex.) dated Aug. 5, 2010.
Defendants, Letters from Baker Botts to Kenyon & Kenyon LLP, Winstead PC and Howison & Arnott LLP including Exhibits in the case of *Fractus SA* v. *Samsung Electornics Co. Ltd. et al.* Case No. 6:09-cv-00203 (E.D. Tex.) dated Oct. 28, 2009.
Defendants, LG Electronics Inc., LG Electronics USA, Inc., and LG Electronics Mobilecomm USA Inc. Answer and Counterclaim to Amended Complaint in the case of *Fractus SA* v. *Samsung Electornics Co. Ltd. et al.* Case No. 6:09-cv-00203 (E.D. Tex.) dated Oct. 1, 2009.
Defendants, LG Electronics Inc., LG Electronics USA, Inc., and LG Electronics Mobilecomm USA Inc. Answer and Counterclaim to Second Amended Complaint in the case of *Fractus SA* v. *Samsung Electornics Co. Ltd. et al.* Case No. 6:09-cv-00203 (E.D. Tex.) dated Dec. 28, 2009.
Defendants, LG Electronics Inc., LG Electronics USA, Inc., and LG Electronics Mobilecomm USA Inc. First Amended Answer and Counterclaim to Second Amended Complaint in the case of *Fractus SA* v. *Samsung Electornics Co. Ltd. et al.* Case No. 6:09-cv-00203 (E.D. Tex.) dated Jan. 24, 2010.
Defendants, Research in Motion LTD, and Research in Motion Corporation's Amended Answer, Defenses and Counterclaims to Plaintiff's Amended Complaint in the case of *Fractus SA* v. *Samsung Electornics Co. Ltd. et al.* Case No. 6:09-cv-00203 (E.D. Tex.) dated Nov. 24, 2009.
Defendants, Research in Motion LTD, and Research in Motion Corporation's Answers, Defenses and Counterclaims to Plaintiff's Amended Complaint in the case of *Fractus SA* v. *Samsung Electornics Co. Ltd. et al.* Case No. 6:09-cv-00203 (E.D. Tex.) dated Oct. 1, 2009.

(56) References Cited

OTHER PUBLICATIONS

Defendants, RIM, Samsung, HTC, LG and Pantech's Response to Fractus SA's Opening Claim Construction Brief and Chart of Agreed Terms and Disputed Terms in the case of *Fractus SA* v. *Samsung Electornics Co. Ltd. et al.* dated Jul. 30, 2010.
Defendants, Samsung Electronics Co., Ltd.'s; Samsung Electronics Research Institute's and Samsung Semiconductor Europe GMBH's Answer; and Samsung Telecommunications America LLC's Answer and Counterclaim to Second Amended Complaint in the case of *Fractus SA* v. *Samsung Electornics Co. Ltd. et al.* Case No. 6:09-cv-00203 (E.D. Tex.) dated Dec. 23, 2009.
Defendants, Samsung Electronics Co., Ltd.'s; Samsung Electronics Research Institute's and Samsung Semiconductor Europe GMBH's Answer; and Samsung Telecommunications America LLC's Answer and Counterclaim to the Amended Complaint of Plaintiff in the case of *Fractus SA* v. *Samsung Electornics Co. Ltd. et al.* Case No. 6:09-cv-00203 (E.D. Tex.) dated Oct. 1, 2009.
Defendants, Samsung Electronics Co., Ltd.'s; Samsung Electronics Research Institute's and Samsung Semiconductor Europe GMBH's First Amended Answer; and Samsung Telecommunications America LLC's First Amended Answer and Counterclaim to the Second Amended Complaint in the case of *Fractus SA* v. *Samsung Electornics Co. Ltd. et al.* Case No. 6:09-cv-00203 (E.D. Tex.) dated Feb. 24, 2010.
European Patent Convention—Article 123—Declaration of Jeffery D. Baxter—Exhibit JJJ.
Falconer, Kenneth , Fractal Geometry: Mathematical Foundations and Applications, pp. 38-41, Jonh Wiley & Sons 1st ed dated Jan. 1, 1990.
Feder, J. , Fractals , Plenum Press, pp. 10-11, 15-17, and 25, Plenum Press dated Jan. 1, 1988.
Felgel-Farnholz, W. D. International Preliminary Examination Report for the PCT patent application EP00/00411. European Patent Office dated on Aug. 29, 2002.
Felgel-Farnholz, W.D. Invitation to restrict or to pay additional fees for the PCT/EP00/00411. International Preliminary Examination Authority, EPO. Mar. 5, 2002.
Fleishmann , M. ; Tildesley , DJ ; Balls , RC, Fractals in the natural sciences, Royal Society of London dated Jan. 1, 1990.
Fractus, Amended Complaint for Patent Infringement in the case of *Fractus SA* v. *Samsung Electornics Co. Ltd. et al.* Case No. 6:09-cv-00203 (E.D. Tex.) dated May 6, 2009.
Fractus, Answer to Amended Counterclaims of Defendant HTC America, Inc. to Second Amended Complaint in the case of *Fractus SA* v. *Samsung Electornics Co. Ltd. et al.* Case No. 6:09-cv-00203 (E.D. Tex.) dated Apr. 1, 2010.
Fractus, Answer to Amended Counterclaims of Defendant HTC Corporation to Second Amended Complaint in the case of *Fractus SA* v. *Samsung Electornics Co. Ltd. et al.* Case No. 6:09-cv-00203 (E.D. Tex.) dated Apr. 1, 2010.
Fractus, Answer to Amended Counterclaims of Defendant LG Electronics Inc., LG Electronics USA, Inc., and LG Electronics Mobilecomm USA Inc's to Second Amended Complaint in the case of *Fractus SA* v. *Samsung Electornics Co. Ltd. et al.* Case No. 6:09-cv-00203 (E.D. Tex.) dated Apr. 1, 2010.
Fractus, Answer to Amended Counterclaims of Defendant Samsung Telecommunications america LLC's to Second Amended Complaint in the case of *Fractus SA* v. *Samsung Electornics Co. Ltd. et al.* Case No. 6:09-cv-00203 (E.D. Tex.) dated Apr. 1, 2010.
Fractus, Answer to Counterclaims of Defendant Kyocera Communications, Inc's Counterclaims to the Second Amended Complaint in the case of *Fractus SA* v. *SamsungElectornics Co. Ltd. et al.* Case No. 6:09-cv-00203 (E.D. Tex.) dated Jan. 4, 2010.
Fractus, Answer to Counterclaims of Defendant Pantech Wireless, Inc. to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Answer to Counterclaims of Defendant Samsung Telecommunications America LLC to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Answer to Counterclaims of Defendants HTC America, Inc to the Second Amended Complaint in the case of *Fractus SA* v. *Samsung Electornics Co. Ltd. et al.* Case No. 6:09-cv-00203 (E.D. Tex.) dated Jan. 14, 2010.
Fractus, Answer to Counterclaims of Defendants LG Electronics Inc., Electronics USA, Inc., and LG Electronics Mobilecomm USA, Inc. to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Answer to Defendant Kyocera Wireless Corp's Counterclaims to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Answer to Defendant Palm, Inc's Counterclaims to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Answer to Defendant Personal Communications Devices Holdings, LLC's Counterclaims to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Answer to Defendant UTStarcom, Inc's Counterclaims to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Answer to the Counterclaims of Defendants Research in Motion Ltd. and Research in Motion Corporation to the Second Amended Complaint in the case of *Fractus SA* v. *Samsung Electornics Co. Ltd. et al.* Case No. 6:09-cv-00203 (E.D. Tex.) dated Jan. 4, 2010.
Fractus, Civil Cover Sheet in the case of *Fractus SA* v. *Samsung Electornics Co. Ltd. et al.* Case No. 6:09-cv-00203 (E.D. Tex.) dated May 5, 2009.
Fractus, Claim Construction Presentation, Markman Hearing in the case of *Fractus SA* v. *Samsung Electornics Co. Ltd. et al.* Case No. 6:09-cv-00203 (E.D. Tex.) dated Sep. 2, 2010.
Fractus, Complaint for Patent Infringement in the case of *Fractus SA* v. *Samsung Electornics Co. Ltd. et al.* Case No. 6:09-cv-00203 (E.D. Tex.) dated May 5, 2009.
Fractus, Fractus SA's Opening Claim Construction Brief with Parties' Proposed and Agreed Constructions in the case of *Fractus SA* v. *Samsung Electornics Co. Ltd. et al.* Case No. 6:09-cv-00203 (E.D. Tex.) dated Jul. 16, 2010.
Fractus, Jaggard, Expert declaration by Dr. Jaggard including exhibits in the case of *Fractus SA* v. *Samsung Electornics Co. Ltd. et al.* Case No. 6:09-cv-00203 (E.D. Tex.) dated Aug. 16, 2010.
Fractus, Opposition to Defendants Motion for Summary Judment of Invalidity based on indefiniteness and lack of written description for certain terms in the case of *Fractus SA* v. *Samsung Electornics Co. Ltd. et al.* Case No. 6:09-cv-00203 (E.D. Tex.) dated Aug. 16, 2010.
Fractus, Second Amended Complaint for Patent Infringement in the case of *Fractus SA* v. *Samsung Electornics Co. Ltd. et al.* Case No. 6:09-cv-00203 (E.D. Tex.) dated Dec. 2, 2009.
Fractus, Second Amended Complaint for Patent Infringement in the case of *Fractus SA* v. *Samsung Electornics Co. Ltd. et al.* Case No. 6:09-cv-00203 (E.D. Tex.) dated Dec. 8, 2009.
Fractus's answer to defendant Pantech Wireless Inc. in the case of *Fractus SA* vs. *Samsung Electronics* cp. 24, Jun. 2009.
Fractus's answer to defendant UT Starcom, Inc. counterclaims. in the case of *Fractus SA* vs. *Samsung Electronics* cp. 29, Jun. 2009.
Frequency-independent features of self-similar fractal antennas Radio Science, vol. 31, No. 6 (Nov.-Dec. 1996).
Frontiers in electromagnetics, IEEE Press, 2000. pp. 5-7 of Fractal Electrodynamics, IEEE Press, 2000.
Graf, R , Modern dictionary of electronics (6th Ed.), Butterworth-Heinemann, pp. 209, 644 dated Jan. 1, 1984.
Henderson , B. , The Prentice-Hall Encyclopedia of Mathematics, Prentice-Hall dated on Jan. 1, 1982.
http://www.fractus.com/main/fractus/corporate/ [Aug. 2010] Fractus.

(56) References Cited

OTHER PUBLICATIONS

IEEE Standard dictionary of electrical and electronics terms (6th ed.) IEEE Standard. 1996 pp. 229, 431, 595, 857.
Jaggard , D. , Diffraction by Bandlimited Fractal Screens, Optical Soc'y Am. A 1055 dated Jan. 1, 1987.
Johnson, R. C. , Antenna Engineering Handbook (3d ed. 1993) pp. 14-1, 14-5 dated Jan. 1, 1993.
Johnson, R. , Antenna Engineering Handbook, Mc Graw Hill (3rd Ed.) pp. 4-26, 4-33 dated Jan. 1, 1993.
Kraus, Antennas, John Wiley and Sons dated Jan. 1, 1988.
Lancaster et al. Superconducting filters using slow wave transmission lines, Advances in superconductivity. New materials, critical current and devices. Proceedings of the international symposium. New age int, New Delhi, India, dated on Jan. 1, 1996.
Le, H. Office action for the U.S. Appl. No. 10/797,732. USPTO. Aug. 9, 2007.
Lee, B. Office Action for the U.S. Appl. No. 10/181,790. USPTO dated on Aug. 27, 2004.
Lee, B. Office action for the U.S. Appl. No. 10/181,790. USPTO dated on Mar. 2, 2005.
Lee, B. Office action for the U.S. Appl. No. 10/181,790. USPTO dated on Aug. 4, 2005.
Lee, B. Office action for the U.S. Appl. No. 10/181,790. USPTO. dated on Jun. 2, 2005.
Love , J. D., Memorandum order and opinion. Court. Dec. 17, 2010.
Lyon , J. ; Rassweiler , G. ; Chen , C., Ferrite-loading effects on helical and spiral antennas, 15th Annual Symposium on the USAF antenna reserach and development program dated Oct. 12, 1965.
Maiorana , D. Response to the office action dated on Jan. 23, 2004 for the U.S. Appl. No. 10/102,568. Jones Day dated on May 26, 2004.
Mandelbrot , B. B. , Opinions, World Scientific Publishing Company. "Fractals" 1(1), 117-123 (1993), dated on Jan. 1, 1993.
Mandelbrot, The fractal geometry of nature, Freeman and Co. dated on Jan. 1, 1982.
Matthaei, G. et al. Microwave filters, impedance-matching networks and coupling structures. Artech House. dated on Jan. 1, 1980.
Matthaei, G. et al.. Hairpin-comb filters for HTS and other narrow-band applications IEEE Transaction on Microwave, vol. 45 dated on Aug. 8, 1997.
McCormick , J., A Low-profile electrically small VHF antenna, 15th Annual Symposium on the USAF antenna reserach and development program dated Oct. 12, 1965.
Mehaute, A. , Fractal Geometrics, CRC Press, pp. 3-35 dated on Jan. 1, 1990.
Meier , K. ; Burkhard , M. ; Schmid , T. et al, Broadband calibration of E-field probes in Lossy Media, IEEE Transactions on Microwave Theory and Techniques dated Oct. 1, 1996.
Menefee , J. Office action for the U.S. Appl. No. 95/001,414. USPTO dated on Aug. 10, 2010.
Merriam-Webster's Collegiate Dictionary (1996), Merriam-Webster's dated Jan. 1, 1996.
Mithani , S. A. Response to the office action dated on Mar. 12, 2007 for the U.S. Appl. No. 11/021,597. Winstead dated on Aug. 9, 2007.
Mithani, S., Response to Office Action dated on Aug. 23, 2006 for the U.S. Appl. No. 11/124,768, Winstead, dated on Nov. 13, 2006.
Moore, S., Response to the Office Action dated on Feb. 7, 2006 for the U.S. Appl. No. 11/033,788, Jenkens, dated Jun. 1, 2006.
NA, IEEE Standard Dictionary of Electrical and Electronics Terms., IEEE Press, 6th ed. , pp. 359, 688, and 878 dated Jan. 1, 1993.
NA, Int'l Electro-Technical Commission IEV No. 712-01-04, dated Apr. 1, 1998.
NA, Letter to FCC—Application form 731 and Engineering Test Report by Nokia Mobile Phones for FCC ID: LJPNSW-6NX, M. Flom Associates dated Apr. 1, 1999.
NA, OET Exhibits list for FCC ID: LJPNSW-6NX, Federal Communications Commission—FCC dated Jul. 8, 1999.
NA, Webster's New Collegiate Dictionary, G & C Merriam Co., 1981. pp. 60, 237, 746, dated Jan. 1, 1981.
Naik , A. ; Bathnagar , P. S., Experimental study on stacked ring coupled triangular microstrip antenna, Antenna Applications Symposium, 1994 dated Sep. 21, 1994.
Nelson , Thomas R. ; Jaggard , Dwight L. , Fractals in the Imaging Sciences, 7, J. Optical Soc'y Am. A 1052 dated Jan. 1, 1990.
Nguyen, H.V., Notice of Allowance for U.S. Appl. No. 11/110,052, USPTO, dated on May 30, 2006.
Office action for the Chinese patent application 01823716. CCPIT Patent and Trademark Law Office dated on Feb. 16, 2007.
Office Action for the U.S. Appl. No. 95/001,389, dated Aug. 12, 2010.
Office Action for the U.S. Appl. No. 95/001,390, dated Aug. 12, 2010.
Office Action for the U.S. Appl. No. 10/102,568, dated Jan. 23, 2004.
On Fractal Electrodynamics in Recent Advances in Electromagnetic Theory. Springer Verlag, Oct. 1990. Chapter 6.
Parker (ed.), McGraw-Hill Dictionary of Scientific and Technical Terms (5th ed. 1994). Mc Graw-Hill, pp. 1542 dated on Jan. 1, 1994.
Paschen , A ; Olson , S., A crossed-slot antenna with an infinite balun feed, Antenna Applications Symposium, 1995. dated Sep. 20, 1995.
Patent Cooperation Treaty Application PCT/ES99/00296 Reply dated Nov. 26, 2001.
Peitgen & D. Saupe, H, The science of fractal images, Springer-Verlag (1988) pp. 1-3, 24-27, 58-61 dated Jan. 1, 1988.
Peitgen et al, H O, Chaos and fractals : new frontiers of science, Springer-Verlag, 1992. pp. 22-26, 62-66, 94-105, 212-219, 229-243 dated Jan. 1, 1992.
Phan, T. Notice of allowance for the U.S. Appl. No. 10/963,080 dated on Sep. 1, 2005.
Phan, T. Notice of allowance for the U.S. Appl. No. 11/102,390. USPTO, dated on Jul. 6, 2006.
Phan, T. Notice of allowance for the U.S. Appl. No. 11/179,257. USPTO, dated on Oct. 19, 2006.
Phan, T. Office Action for the U.S. Appl. No. 11/550,256. USPTO, dated on Jan. 15, 2008.
Pozar , D. & E. Newman, Analysis of a Monopole Mounted near or at the Edge of a Half-Plane, IEEE Transactions on Antennas & Propagation, vol. AP-29, No. 3 (May 1981) dated May 1, 1981.
Preliminary Amendment with Originally Filed Claims for U.S. Appl. No. 10/102,568 dated Mar. 18, 2002.
Pressley, A. Elementary Differential Geometry, Springer (2000). pp. 252-257.
Rademacher , H & O. Toeplitz, The Enjoyment of Math, Princeton Science Library,1957. pp. 164-169, dated Jan. 1, 1957.
Request for inter partes reexamination for US patent 7148850 (95/000598), including exhibits from C1 to F3—HTC. Dec. 3, 2010.
Request for inter partes reexamination for US patent 7202822 (95/000592), including exhibits from CC1 to CC6—Kyocera. Nov. 16, 2010.
Request for inter panes reexamination for US patent 7148850 (95/000593), including exhibits from CC1 to CC7—Kyocera. Nov. 16, 2010.
Request for inter partes reexamination for US patent 7148850 (95/001413) including claim charts from CC-A to CC-F—Samsung. Aug. 4, 2010.
Defendant's reply in support of their motion for summary judgment of invalidity based on indefiniteness and lack of written description for certain terms in the case of *Fractus SA* v. *Samsung Electronics Co. Ltd. et al* Case No. 60:09cv203.
Response to the office action dated on Feb. 16, 2007 for the Chinese patent application 01823716. Fractus dated on Aug. 21, 2007.
Response to the office action dated on Nov. 5, 2004 for the Chinese patent application 00818542 CCPIT Patent and Trademark Law Office Mar. dated on Mar. 31, 2005.
Response to the office action dated on Sep. 21, 2007 for the Chinese patent application 01823716. Fractus dated on Dec. 3, 2007.
Rich , B., Review of Elementary Mathematics, 2nd ed. McGraw-Hill dated Jan. 1, 1997.
Sauer , J. M. Response to the office action dated on Apr. 7, 2005 for the U.S. Appl. No. 10/422,578. Jones Day dated on Aug. 8, 2005.
Sauer , J. M. Response to the office action dated on Aug. 27, 2004 for the U.S. Appl. No. 10/181,790. Jones Day dated on Dec. 10, 2004.
Sauer , J. M. Response to the office action dated on Jan. 26, 2006 for the U.S. Appl. No. 10/422,579. Jones Day dated on May 1, 2006.

(56) References Cited

OTHER PUBLICATIONS

Sauer , J. M. Response to the office action dated on Jun. 2, 2005. Jones Day dated on Jul. 20, 2005.
Sauer , J. M. Response to the office action dated on Mar. 2, 2005 for the U.S. Appl. No. 11/181,790. Jones Day dated on Mar. 14, 2005.
Sauer, J. M., Amendment in File History of U.S. Patent No. 7,015,868, Jones Day dated Dec. 10, 2004.
Sawaya, K, A simplified Expression of Dyadic Green's Function for a Conduction Half Sheet, IEEE Transactions on Antennas & Propagation, vol. AP-29, No. 5 (Sep. 1981) dated Sep. 1, 1981.
Sclater , N. , McFraw-Hill Electroncs Dictionary, Mc Graw-Hill dated on Jan. 1, 1997.
Stutzman , W. ; Thiele , G., Antenna theory and design, John Wiley and Sons, pp. 18, 36 dated Jan. 1, 1981.
Stutzman , W. , Antenna theory and design, 2nd ed. John Wiley and Sons, pp. 8-9, 43-48, 210-219 dated Jan. 1, 1998.
The American Heritage College Dictionary (3d ed. 1997), Houghton Mifflin Comp.; pp. 684 and 1060 dated Jan. 1, 1997.
The American Heritage Dictionary (2d College ed.). Morris William, pp. 960 dated Jan. 1, 1982.
The American Heritage Dictionary, New College ed. (2nd ed. 1982). pp. 311, 1208, dated Jan. 1, 1982.
The Random House Dictionary, Random House, 1984. pp. 1029, 1034, dated Jan. 1, 1984.
Theiler, J, Estimating Fractal Dimension, Journal Optical Society Am. A, 7(6), pp. 1055-1073 dated on Jun. 1, 1990.
Tinker , J. A. Response to the office action dated on Oct. 30, 2007 for the U.S. Appl. No. 11/021,597. Winstead dated on Dec. 28, 2007.
Walker, B.D., Preliminary Amendment for U.S. Appl. No. 11/110,052. Howison & Arnott, dated on Apr. 20, 2005.
Walker, B.D., Preliminary Amendment for U.S. Appl. No. 11/780,932. Howison & Arnott, dated Jul. 20, 2007.
Walker, B.D., Response to Office Action for U.S. Appl. No. 11/179,250, Howison & Arnott, dated on Jul. 12, 2005.
Watson , T. ; Friesser , J., A phase shift direction finding technique, Annual Symposium on the USAF antenna research and development program dated Oct. 21, 1957.
West , B.H. et al., The Prentice-Hall Encyclopedia of Mathematics. Prentice-Hall, pp. 404-405 dated on Jan. 1, 1982.
Wikka , K., Letter to FCC that will authorize the appointment of Morton Flom Eng and/or FlomAssociates Inc to act as their Agent in all FCC matters, Nokia Mobile Phones dated Aug. 5, 1999.
Wimer, M. Office Action for the U.S. Appl. No. 10/422,578. USPTO dated on Aug. 23, 2007.
Wimer, M. Office Action for the U.S. Appl. No. 10/422,578. USPTO dated on Jan. 26, 2006.
Wimer, M. Office Action for the U.S. Appl. No. 10/422,578. USPTO dated on Mar. 12, 2007.
Wimer, M. Office Action for the U.S. Appl. No. 10/422,578. USPTO dated on Mar. 26, 2008.
Wimer, M. C. Office action for the U.S. Appl. No. 11/021,597. USPTO dated on Mar. 12, 2007.
Wimer, M. C. Office action for the U.S. Appl. No. 11/021,597. USPTO dated on Oct. 30, 2007.
Wimer, M. Office Action for the U.S. Appl. No. 10/422,578. USPTO dated on Aug. 24, 2005.
Wimer, M., Notice of Allowance of U.S. Appl. No. 10/822,933. USPTO, dated on Oct. 18, 2007.
www.tsc.upc.es/fractalcoms/ [Aug. 2010]. UPC.
Request for inter partes reexamination for US patent 7202822 (95/001414) including claim charts from CC-A-1 to CCD—Samsung. Aug. 4, 2010.
Defendants RIM, Samsung, HTC, LG and Pantech's response to plantiff Fractus SA's opening claim construction brief in Case 6:09-cv-00203-LED-JDL—Exhibit 33—Excerpt from Plaintiff's '868 pat. inf. cont. for Samsung SPH M540.
Defendants RIM, Samsung, HTC, LG and Pantech's response to plantiff Fractus SA's opening claim construction brief in Case 6:09-cv-00203-LED-JDL—Exhibit 34—Excerpts from Plaintiff's '431 patent Infringement Contentions of HTC Diamond.
Defendants RIM, Samsung, HTC, LG and Pantech's response to plantiff Fractus SA's opening claim construction brief in Case 6:09-cv-00203-LED-JDL—Exhibit 4—Demonstrative re: counting segments.
Defendants RIM, Samsung, HTC, LG and Pantech's response to plantiff Fractus SA's opening claim construction brief in Case 6:09-cv-00203-LED-JDL—Exhibit 42—Demonstrative showing how straight segments can be fitted over a curved surface.
Defendants RIM, Samsung, HTC, LG and Pantech's response to plantiff Fractus SA's opening claim construction brief in Case 6:09-cv-00203-LED-JDL—Exhibit 57—Excerpts from Plaintiff's '868 and '762 Pat. Intr. cont. for RIM 8310.
Defendants RIM, Samsung, HTC, LG and Pantech's response to plantiff Fractus SA's opening claim construction brief in "Case 6:09-cv-00203-LED-JDL"—Exhibit 1—Chart of Agreed Terms and Disputed Terms.
Defendants RIM, Samsung, HTC, LG and Pantech's response to plantiff Fractus SA's opening claim construction brief in "Case 6:09-cv-00203-LED-JDL"—Exhibit 2—Family Tree of Asserted Patents.
Fontenay , P. Communication of the board of appeal. Rules of procedure of the boards of appeal. EPO. Dec. 30, 2010.
Menefee , J. Office action for the U.S. Appl. No. 95/001,413. USPTO dated on Aug. 10, 2010.
Fractus's Objections to Claim Construction Memorandum and Order. Jan. 14, 2011.
Jan. 14, 2011 Fractus Docket 575-5 Exhibit 35—Addison , P. S. Fractals and chaos—An illustrated course. Institute of Physics Publishing, 1997.
Infringement Chart—Blackberry 8100. Patent: 7148850. Fractus, 2009.
Infringement Chart—Blackberry 8100. Patent: 7202822. Fractus, 2009.
Infringement Chart—Blackberry 8110. Patent: 7148850. Fractus, 2009.
Infringement Chart—Blackberry 8110. Patent: 7202822. Fractus, 2009.
Infringement Chart—Blackberry 8120. Patent: 7148850. Fractus, 2009.
Infringement Chart—Blackberry 8120. Patent: 7202822. Fractus, 2009.
Infringement Chart—Blackberry 8130. Patent: 7148850. Fractus, 2009.
Infringement Chart—Blackberry 8130. Patent: 7202822. Fractus, 2009.
Infringement Chart—Blackberry 8220. Patent: 7148850. Fractus, 2009.
Infringement Chart—Blackberry 8220. Patent: 7202822. Fractus, 2009.
Infringement Chart—Blackberry 8310. Patent: 7148850. Fractus, 2009.
Infringement Chart—Blackberry 8310. Patent: 7202822. Fractus, 2009.
Infringement Chart—Blackberry 8320. Patent: 7148850. Fractus, 2009.
Infringement Chart—Blackberry 8320. Patent: 7202822. Fractus, 2009.
Infringement Chart—Blackberry 8330. Patent: 7148850. Fractus, 2009.
Infringement Chart—Blackberry 8330. Patent: 7202822. Fractus, 2009.
Infringement Chart—Blackberry 8820. Patent: 7148850. Fractus, 2009.
Infringement Chart—Blackberry 8820. Patent: 7202822. Fractus, 2009.
Infringement Chart—Blackberry 8830. Patent: 7148850. Fractus, 2009.
Infringement Chart—Blackberry 8830. Patent: 7202822. Fractus, 2009.
Infringement Chart—Blackberry 8900. Patent: 7148850. Fractus, 2009.
Infringement Chart—Blackberry 8900. Patent: 7202822. Fractus, 2009.

(56) References Cited

OTHER PUBLICATIONS

Infringement Chart—Blackberry 9630. Patent: 7148850. Fractus, 2009.
Infringement Chart—Blackberry 9630. Patent: 7202822. Fractus, 2009.
Infringement Chart—Blackberry Bold 9000. Patent: 7148850. Fractus, 2009.
Infringement Chart—Blackberry Bold 9000. Patent: 7202822. Fractus, 2009.
Infringement Chart—Blackberry Storm 9530. Patent: 7148850. Fractus, 2009.
Infringement Chart—Blackberry Storm 9530. Patent: 7202822. Fractus, 2009.
Infringement Chart—HTC Dash. Fractus, 2009.
Infringement Chart—HTC Dash. Patent: 7148850. Fractus, 2009.
Infringement Chart—HTC Dash. Patent: 7202822. Fractus, 2009.
Infringement Chart—HTC Diamond. Fractus, 2009.
Infringement Chart—HTC Diamond. Patent: 7148850. Fractus, 2009.
Infringement Chart—HTC Diamond. Patent: 7202822. Fractus, 2009.
Infringement Chart—HTC G1 Google. Fractus, 2009.
Infringement Chart—HTC G1 Google. Patent: 7148850. Fractus, 2009.
Infringement Chart—HTC G1 Google. Patent: 7202822. Fractus, 2009.
Infringement Chart—HTC My Touch. Fractus, 2009.
Infringement Chart—HTC MyTouch. Patent: 7148850. Fractus, 2009.
Infringement Chart —HTC MyTouch. Patent: 7202822. Fractus, 2009.
Infringement Chart—HTC Ozone. Fractus, 2009.
Infringement Chart —HTC Ozone. Patent: 7148850. Fractus, 2009.
Infringement Chart —HTC Ozone. Patent: 7202822. Fractus, 2009.
Infringement Chart—HTC Pure. Fractus, 2009.
Infringement Chart—HTC Pure. Patent: 7148850. Fractus, 2009.
Infringement Chart—HTC Pure. Patent: 7202822. Fractus, 2009.
Infringement Chart—HTC Snap. Fractus, 2009.
Infringement Chart—HTC Snap. Patent: 7148850. Fractus, 2009.
Infringement Chart—HTC Snap. Patent: 7202822. Fractus, 2009.
Infringement Chart—HTC TILT 8925. Fractus, 2009.
Infringement Chart—HTC TILT 8925. Patent: 7148850. Fractus, 2009.
Infringement Chart—HTC TILT 8925. Patent: 7202822. Fractus, 2009.
Infringement Chart—HTC Touch Pro 2. Fractus, 2009.
Infringement Chart—HTC Touch Pro 2 CDMA. Patent: 7148850. Fractus, 2009.
Infringement Chart—HTC Touch Pro 2. Patent: 7202822. Fractus, 2009.
Infringement Chart—HTC Touch Pro Fuze. Fractus, 2009.
Infringement Chart—HTC Touch Pro Fuze. Patent: 7148850. Fractus, 2009.
Infringement Chart—HTC Touch Pro Fuze. Patent: 7202822. Fractus, 2009.
Infringement Chart—HTC Touch Pro. Fractus, 2009.
Infringement Chart—HTC Touch Pro. Patent: 7148850. Fractus, 2009.
Infringement Chart —HTC Touch Pro. Patent: 7202822. Fractus, 2009.
Infringement Chart—HTC Wing. Fractus, 2009.
Infringement Chart—HTC Wing. Patent: 7148850. Fractus, 2009.
Infringement Chart—HTC Wing. Patent: 7202822. Fractus, 2009.
Infringement Chart—Kyocera Jax. Fractus, 2009.
Infringement Chart—Kyocera Jax. Patent: 7148850. Fractus, 2009.
Infringement Chart—Kyocera Jax. Patent: 7202822. Fractus, 2009.
Infringement Chart—Kyocera MARBL. Fractus, 2009.
Infringement Chart—Kyocera MARBL. Patent: 7148850. Fractus, 2009.
Infringement Chart—Kyocera MARBL. Patent: 7202822. Fractus, 2009.
Infringement Chart—Kyocera NEO E1100. Fractus, 2009.
Infringement Chart—Kyocera NEO E1100. Patent: 7148850. Fractus, 2009.
Infringement Chart—Kyocera NEO E1100. Patent: 7202822. Fractus, 2009.
Infringement Chart—Kyocera S2400. Fractus, 2009.
Infringement Chart—Kyocera S2400. Patent: 7148850. Fractus, 2009.
Infringement Chart—Kyocera S2400. Patent: 7202822. Fractus, 2009.
Infringement Chart—Kyocera Wildcard M1000. Fractus, 2009.
Infringement Chart—Kyocera Wildcard M1000. Patent: 7148850. Fractus, 2009.
Infringement Chart—Kyocera Wildcard M1000. Patent: 7202822. Fractus, 2009.
Infringement Chart—LG 300G. Fractus, 2009.
Infringement Chart—LG 300G. Patent: 7148850. Fractus, 2009.
Infringement Chart—LG 300G. Patent: 7202822. Fractus, 2009.
Infringement Chart—LG Aloha LX140. Fractus, 2009.
Infringement Chart—LG Aloha LX140. Patent: 7148850. Fractus, 2009.
Infringement Chart—LG Aloha LX140. Patent: 7202822. Fractus, 2009.
Infringement Chart—LG AX155. Fractus, 2009.
Infringement Chart—LG AX155. Patent: 7148850. Fractus, 2009.
Infringement Chart—LG AX155. Patent: 7202822. Fractus, 2009.
Infringement Chart—LG AX300. Fractus, 2009.
Infringement Chart—LG AX300. Patent: 7148850. Fractus, 2009.
Infringement Chart—LG AX300. Patent: 7202822. Fractus, 2009.
Infringement Chart—LG AX380. Fractus, 2009.
Infringement Chart—LG AX380. Patent: 7148850. Fractus, 2009.
Infringement Chart—LG AX380. Patent: 7202822. Fractus, 2009.
Infringement Chart—LG AX585. Fractus, 2009.
Infringement Chart—LG AX585. Patent: 7148850. Fractus, 2009.
Infringement Chart—LG AX585. Patent: 7202822. Fractus, 2009.
Infringement Chart—LG AX8600. Fractus, 2009.
Infringement Chart—LG AX8600. Patent: 7148850. Fractus, 2009.
Infringement Chart—LG AX8600. Patent: 7202822. Fractus, 2009.
Infringement Chart—LG CF360. Fractus, 2009.
Infringement Chart—LG CF360. Patent: 7148850. Fractus, 2009.
Infringement Chart—LG CF360. Patent: 7202822. Fractus, 2009.
Infringement Chart—LG Chocolate VX8550. Fractus, 2009.
Infringement Chart—LG Chocolate VX8550. Patent: 7148850. Fractus, 2009.
Infringement Chart—LG Chocolate VX8550. Patent: 7202822. Fractus, 2009.
Infringement Chart—LG CU515. Fractus, 2009.
Infringement Chart—LG CU515. Patent: 7148850. Fractus, 2009.
Infringement Chart—LG CU515. Patent: 7202822 Fractus, 2009.
Infringement Chart—LG Dare VX9700. Fractus, 2009.
Infringement Chart—LG Dare VX9700. Patent: 7148850. Fractus, 2009.
Infringement Chart—LG Dare VX9700. Patent: 7202822. Fractus, 2009.
Infringement Chart—LG enV Touch VX1100. Fractus, 2009.
Infringement Chart—LG enV Touch VX1100. Patent: 7148850. Fractus, 2009.
Infringement Chart—LG enV Touch VX1100. Patent: 7202822. Fractus, 2009.
Infringement Chart—LG enV VX9900. Fractus, 2009.
Infringement Chart—LG enV VX-9900. Patent: 7148850. Fractus, 2009.
Infringement Chart—LG enV VX-9900. Patent: 7202822. Fractus, 2009.
Infringement Chart—LG EnV2 VX9100. Fractus, 2009.
Infringement Chart—LG EnV2 VX9100. Patent: 7148850. Fractus, 2009.
Infringement Chart—LG EnV2 VX9100. Patent: 7202822. Fractus, 2009.
Infringement Chart—LG EnV3 VX9200. Fractus, 2009.

(56) References Cited

OTHER PUBLICATIONS

Infringement Chart—LG EnV3 VX9200. Patent: 7148850. Fractus, 2009.
Infringement Chart—LG EnV3 VX9200. Patent: 7202822. Fractus, 2009.
Infringement Chart—LG Flare LX165. Fractus, 2009.
Infringement Chart—LG Flare LX165. Patent: 7148850. Fractus, 2009.
Infringement Chart—LG Flare LX165. Patent: 7202822. Fractus, 2009.
Infringement Chart—LG GT365 NEON. Fractus, 2009.
Infringement Chart—LG GT365 NEON. Patent: 7148850. Fractus, 2009.
Infringement Chart—LG GT365 NEON. Patent: 7202822. Fractus, 2009.
Infringement Chart—LG Lotus. Fractus, 2009.
Infringement Chart—LG Lotus. Patent: 7148850. Fractus, 2009.
Infringement Chart—LG Lotus. Patent: 7202822. Fractus, 2009.
Infringement Chart—LG MUZIQ LX570. Fractus, 2009.
Infringement Chart—LG Muziq LX570. Patent: 7148850. Fractus, 2009.
Infringement Chart—LG Muziq LX570. Patent: 7202822. Fractus, 2009.
Infringement Chart—LG Rumor. Fractus, 2009.
Infringement Chart—LG Rumor 2. Fractus, 2009.
Infringement Chart—LG Rumor 2. Patent: 7148850. Fractus, 2009.
Infringement Chart—LG Rumor 2. Patent: 7202822. Fractus, 2009.
Infringement Chart—LG Rumor. Patent: 7148850. Fractus, 2009.
Infringement Chart—LG Rumor. Patent: 7202822. Fractus, 2009.
Infringement Chart—LG Shine CU720. Fractus, 2009.
Infringement Chart—LG Shine CU720. Patent: 7148850. Fractus, 2009.
Infringement Chart—LG Shine CU720. Patent: 7202822. Fractus, 2009.
Infringement Chart—LG UX200. Fractus, 2009.
Infringement Chart—LG UX280. Patent: 7148850. Fractus, 2009.
Infringement Chart —LG UX280. Patent: 7202822. Fractus, 2009.
Infringement Chart—LG Versa VX9600. Fractus, 2009.
Infringement Chart—LG Versa VX9600. Patent: 7148850. Fractus, 2009.
Infringement Chart—LG Versa VX9600. Patent: 7202822. Fractus, 2009.
Infringement Chart—LG Voyager VX10000. Fractus, 2009.
Infringement Chart—LG Voyager VX10000. Patent: 7148850. Fractus, 2009.
Infringement Chart—LG Voyager VX10000. Patent: 7202822. Fractus, 2009.
Infringement Chart—LG VU CU920. Fractus, 2009.
Infringement Chart—LG Vu CU920. Patent: 7148850. Fractus, 2009.
Infringement Chart—LG Vu CU920. Patent: 7202822. Fractus, 2009.
Infringement Chart—LG VX5400. Fractus, 2009.
Infringement Chart—LG VX5400. Patent: 7148850. Fractus, 2009.
Infringement Chart—LG VX5400. Patent: 7202822. Fractus, 2009.
Infringement Chart—LG VX5500. Fractus, 2009.
Infringement Chart—LG VX5500. Patent: 7148850. Fractus, 2009.
Infringement Chart—LG VX5500. Patent: 7202822. Fractus, 2009.
Infringement Chart—LG VX8350. Fractus, 2009.
Infringement Chart—LG VX8350. Patent: 7148850. Fractus, 2009.
Infringement Chart—LG VX8350. Patent: 7202822. Fractus, 2009.
Infringement Chart—LG VX8360. Fractus, 2009.
Infringement Chart—LG VX8360. Patent: 7148850. Fractus, 2009.
Infringement Chart—LG VX8360. Patent: 7202822. Fractus, 2009.
Infringement Chart—LG VX8500. Fractus, 2009.
Infringement Chart—LG VX8500. Patent: 7148850. Fractus, 2009.
Infringement Chart—LG VX8500. Patent: 7202822. Fractus, 2009.
Infringement Chart—LG VX8560 Chocolate 3. Fractus, 2009.
Infringement Chart—LG VX8560 Chocolate 3. Patent: 7148850. Fractus, 2009.
Infringement Chart—LG VX8560 Chocolate 3. Patent: 7202822. Fractus, 2009.
Infringement Chart—LG VX8610. Fractus, 2009.
Infringement Chart—LG VX8610. Patent: 7148850. Fractus, 2009.
Infringement Chart—LG VX8610. Patent: 7202822. Fractus, 2009.
Infringement Chart—LG VX8800. Fractus, 2009.
Infringement Chart—LG VX8800. Patent: 7148850. Fractus, 2009.
Infringement Chart—LG VX8800. Patent: 7202822. Fractus, 2009.
Infringement Chart—LG VX9400. Fractus, 2009.
Infringement Chart—LG Xenon GR500. Fractus, 2009.
Infringement Chart—LG Xenon GR500. Patent: 7148850. Fractus, 2009.
Infringement Chart—LG Xenon GR500. Patent: 7202822. Fractus, 2009.
Infringement Chart—Palm Centro 685. Fractus, 2009.
Infringement Chart—Palm Centro 685. Patent: 7148850. Fractus, 2009.
Infringement Chart—Palm Centro 685. Patent: 7202822. Fractus, 2009.
Infringement Chart—Palm Centro 690. Fractus, 2009.
Infringement Chart—Palm Centro 690. Patent: 7148850. Fractus, 2009.
Infringement Chart—Palm Centro 690. Patent: 7202822. Fractus, 2009.
Infringement Chart—Palm Pre. Fractus, 2009.
Infringement Chart—Palm Pre. Patent: 7148850. Fractus, 2009.
Infringement Chart—Palm Pre. Patent: 7202822. Fractus, 2009.
Infringement Chart—Pantech Breeze C520. Fractus, 2009.
Infringement Chart—Pantech Breeze C520. Patent: 7148850. Fractus, 2009.
Infringement Chart—Pantech Breeze C520. Patent: 7202822. Fractus, 2009.
Infringement Chart—Pantech C610. Fractus, 2009.
Infringement Chart—Pantech C610. Patent: 7148850. Fractus, 2009.
Infringement Chart—Pantech C610. Patent: 7202822. Fractus, 2009.
Infringement Chart—Pantech C740. Fractus, 2009.
Infringement Chart—Pantech C740. Patent: 7202822. Fractus, 2009.
Infringement Chart—Pantech DUO C810. Fractus, 2009.
Infringement Chart—Pantech DUO C810. Patent: 7148850. Fractus, 2009.
Infringement Chart—Pantech DUO C810. Patent: 7202822. Fractus, 2009.
Infringement Chart—Pantech Slate C530. Fractus, 2009.
Infringement Chart—Patench C740. Patent: 7148850. Fractus, 2009.
Infringement Chart—RIM Blackberry 8110. Fractus, 2009.
Infringement Chart—RIM Blackberry 8120. Fractus, 2009.
Infringement Chart—RIM Blackberry 8130. Fractus, 2009.
Infringement Chart—RIM Blackberry 8220. Fractus, 2009.
Infringement Chart—RIM Blackberry 8310. Fractus, 2009.
Infringement Chart—RIM Blackberry 8320. Fractus, 2009.
Infringement Chart—RIM Blackberry 8330. Fractus, 2009.
Infringement Chart—RIM Blackberry 8820. Fractus, 2009.
Infringement Chart—RIM Blackberry 8830. Fractus, 2009.
Infringement Chart—RIM Blackberry 8900. Fractus, 2009.
Infringement Chart—RIM Blackberry 9630. Fractus, 2009.
Infringement Chart—RIM Blackberry Bold 9000. Fractus, 2009.
Infringement Chart—RIM Blackberry Pearl 8100. Fractus, 2009.
Infringement Chart—RIM Blackberry Storm 9530. Fractus, 2009.
Infringement Chart—Samsung Blackjack II SCH-I617. Patent: 7148850. Fractus, 2009.
Infringement Chart—Samsung Blackjack II SCH-I617. Patent: 7202822. Fractus, 2009.
Infringement Chart—Samsung Blackjack II SGH-i617. Fractus, 2009.
Infringement Chart—Samsung Blast SGH T729. Fractus, 2009.
Infringement Chart—Samsung Blast SGH-T729. Patent: 7148850. Fractus, 2009.
Infringement Chart—Samsung Blast SGH-T729. Patent: 7202822. Fractus, 2009.
Infringement Chart—Samsung EPIX SGH-I907. Fractus, 2009.
Infringement Chart—Samsung FlipShot SCH-U900. Fractus, 2009.
Infringement Chart6—Samsung FlipShot SCH-U900. Patent: 7148850. Fractus, 2009.

(56) References Cited

OTHER PUBLICATIONS

Infringement Chart—Samsung FlipShot SCH-U900. Patent: 7202822. Fractus, 2009.
Infringement Chart—Samsung Instinct M800. Fractus, 2009.
Infringement Chart—Samsung Instinct M800. Patent: 7148850. Fractus, 2009.
Infringement Chart—Samsung Instinct M800. Patent: 7202822. Fractus, 2009.
Infringement Chart—Samsung M320. Fractus, 2009.
Infringement Chart—Samsung M320. Patent: 7148850. Fractus, 2009.
Infringement Chart—Samsung M320. Patent: 7202822. Fractus, 2009.
Infringement Chart—Samsung Messager. Fractus, 2009.
Infringement Chart—Samsung Messager. Patent: 7148850. Fractus, 2009.
Infringement Chart—Samsung Messager. Patent: 7202822. Fractus, 2009.
Infringement Chart—Samsung Omnia SGH-I900. Fractus, 2009.
Infringement Chart—Samsung Omnia SGH-I900. Patent: 7148850. Fractus, 2009.
Infringement Chart—Samsung Omnia SGH-I900. Patent: 7202822. Fractus, 2009.
Infringement Chart—Samsung SCH A127. Fractus, 2009.
Infringement Chart—Samsung SCH U340. Fractus, 2009.
Infringement Chart—Samsung SCH U340. Patent: 7148850. Fractus, 2009.
Infringement Chart—Samsung SCH U340. Patent: 7202822. Fractus, 2009.
Infringement Chart—Samsung SCH U410. Patent: 7148850. Fractus, 2009.
Infringement Chart—Samsung SCH U410. Patent: 7202822. Fractus, 2009.
Infringement Chart—Samsung SCH U700. Fractus, 2009.
Infringement Chart—Samsung SCH U700. Patent: 7202822. Fractus, 2009.
Infringement Chart—Samsung SCH U700. Patent:7148850. Fractus, 2009.
Infringement Chart—Samsung SCH UA10. Fractus, 2009.
Infringement Chart—Samsung SCH-A630. Fractus, 2009.
Infringement Chart—Samsung SCH-A630. Patent: 7148850. Fractus, 2009.
Infringement Chart—Samsung SCH-A630. Patent: 7202822. Fractus, 2009.
Infringement Chart—Samsung SCH-A645. Fractus, 2009.
Infringement Chart—Samsung SCH-A645. Patent: 7148850. Fractus, 2009.
Infringement Chart—Samsung SCH-A645. Patent: 7202822. Fractus, 2009.
Infringement Chart—Samsung SCH-A870. Fractus, 2009.
Infringement Chart—Samsung SCH-A887 Solstice. Patent: 7148850. Fractus, 2009.
Infringement Chart—Samsung SCH-A887 Solstice. Patent: 7202822. Fractus, 2009.
Infringement Chart—Samsung SCH-I910. Fractus, 2009.
Infringement Chart—Samsung SCH-I910. Patent: 7148850. Fractus, 2009.
Infringement Chart—Samsung SCH-I910. Patent: 7202822. Fractus, 2009.
Infringement Chart—Samsung SCH-R430. Fractus, 2009.
Infringement Chart—Samsung SCH-R430. Patent: 7148850. Fractus, 2009.
Infringement Chart—Samsung SCH-R430. Patent: 7202822. Fractus, 2009.
Infringement Chart—Samsung SCH-R500. Fractus, 2009.
Infringement Chart—Samsung SCH-R500. Patent: 7148850. Fractus, 2009.
Infringement Chart—Samsung SCH-R500. Patent: 7202822. Fractus, 2009.
Infringement Chart—Samsung SCH-R600. Fractus, 2009.
Infringement Chart—Samsung SCH-R600. Patent: 7148850. Fractus, 2009.
Infringement Chart—Samsung SCH-R600. Patent: 7202822. Fractus, 2009.
Infringement Chart—Samsung SCH-R800. Fractus, 2009.
Infringement Chart—Samsung SCH-R800. Patent: 7148850. Fractus, 2009.
Infringement Chart—Samsung SCH-R800. Patent: 7202822. Fractus, 2009.
Infringement Chart—Samsung SCH-U310. Fractus, 2009.
Infringement Chart—Samsung SCH-U310. Patent: 7148850. Fractus, 2009.
Infringement Chart—Samsung SCH-U310. Patent: 7202822. Fractus, 2009.
Infringement Chart—Samsung SCH-U430. Fractus, 2009.
Infringement Chart—Samsung SCH-U430. Patent: 7148850. Fractus, 2009.
Infringement Chart—Samsung SCH-U430. Patent: 7202822. Fractus, 2009.
Infringement Chart—Samsung SCH-U470. Fractus, 2009.
Infringement Chart—Samsung SCH-U470. Patent: 7148850. Fractus, 2009.
Infringement Chart—Samsung SCH-U470. Patent: 7202822. Fractus, 2009.
Infringement Chart—Samsung SCH-U520. Fractus, 2009.
Infringement Chart—Samsung SCH-U520. Patent: 7148850. Fractus, 2009.
Infringement Chart—Samsung SCH-U520. Patent: 7202822. Fractus, 2009.
Infringement Chart—Samsung SCH-U740. Fractus, 2009.
Infringement Chart—Samsung SCH-U740. Patent: 7148850. Fractus, 2009.
Infringement Chart—Samsung SCH-U740. Patent: 7202822. Fractus, 2009.
Infringement Chart—Samsung SCH-U750. Fractus, 2009.
Infringement Chart—Samsung SCH-U750. Patent: 7148850. Fractus, 2009.
Infringement Chart—Samsung SCH-U750. Patent: 7202822. Fractus, 2009.
Infringement Chart—Samsung SCH-U940. Fractus, 2009.
Infringement Chart—Samsung SCH-U940. Patent. 7202822. Fractus, 2009.
Infringement Chart—Samsung SCH-U940. Patent: 7148850. Fractus, 2009.
Infringement Chart—Samsung SGH A117. Fractus, 2009.
Infringement Chart—Samsung SGH A117. Patent: 7148850. Fractus, 2009.
Infringement Chart—Samsung SGH A117. Patent: 7202822. Fractus, 2009.
Infringement Chart—Samsung SGH A127. Patent: 7148850. Fractus, 2009.
Infringement Chart—Samsung SGH A127. Patent: 7202822. Fractus, 2009.
Infringement Chart—Samsung SGH A437. Fractus, 2009.
Infringement Chart—Samsung SGH A437. Patent: 7148850. Fractus, 2009.
Infringement Chart—Samsung SGH A437. Patent: 7202822. Fractus, 2009.
Infringement Chart—Samsung SGH A737. Fractus, 2009.
Infringement Chart—Samsung SGH A737. Patent: 7148850. Fractus, 2009.
Infringement Chart—Samsung SGH A737. Patent: 7202822. Fractus, 2009.
Infringement Chart—Samsung SGH A867. Fractus, 2009.
Infringement Chart—Samsung SGH A867. Patent: 7148850. Fractus, 2009.
Infringement Chart—Samsung SGH A867. Patent: 7202822. Fractus, 2009.
Infringement Chart—Samsung SGH T229. Fractus, 2009.
Infringement Chart—Samsung SGH T229. Patent: 7148850. Fractus, 2009.
Infringement Chart—Samsung SGH T229. Patent: 7202822. Fractus, 2009.

(56) References Cited

OTHER PUBLICATIONS

Infringement Chart—Samsung SGH T439. Fractus, 2009.
Infringement Chart—Samsung SGH T439. Patent: 7148850. Fractus, 2009.
Infringement Chart—Samsung SGH T439. Patent: 7202822. Fractus, 2009.
Infringement Chart—Samsung SGH T459. Fractus, 2009.
Infringement Chart—Samsung SGH T459. Patent: 7148850. Fractus, 2009.
Infringement Chart—Samsung SGH T459. Patent: 7202822. Fractus, 2009.
Infringement Chart—Samsung SGH T919. Fractus, 2009.
Infringement Chart—Samsung SGH T919. Patent: 7148850. Fractus, 2009.
Infringement Chart—Samsung SGH T919. Patent: 7202822. Fractus, 2009.
Infringement Chart—Samsung SGH-A237. Fractus, 2009.
Infringement Chart—Samsung SGH-A237. Patent: 7148850. Fractus, 2009.
Infringement Chart—Samsung SGH-A237. Patent: 7202822. Fractus, 2009.
Infringement Chart—Samsung SGH-A257. Fractus, 2009.
Infringement Chart—Samsung SGH-A257 Magnet. Patent: 7148850. Fractus, 2009.
Infringement Chart—Samsung SGH-A257 Magnet. Patent: 7202822. Fractus, 2009.
Infringement Chart—Samsung SGH-A837. Fractus, 2009.
Infringement Chart—Samsung SGH-A837. Patent: 7148850. Fractus, 2009.
Infringement Chart—Samsung SGH-A837. Patent: 7202822. Fractus, 2009.
Infringement Chart—Samsung SGH-A887. Fractus, 2009.
Infringement Chart—Samsung SGH-I907. Patent: 7148850 Fractus, 2009.
Infringement Chart—Samsung SGH-I907. Patent: 7202822. Fractus, 2009.
Infringement Chart—Samsung SGH-T219. Fractus, 2009.
Infringement Chart—Samsung SGH-T219. Patent: 7148850. Fractus, 2009.
Infringement Chart—Samsung SGH-T219. Patent: 7202822. Fractus, 2009.
Infringement Chart—Samsung SGH-T239. Fractus, 2009.
Infringement Chart—Samsung SGH-T239. Patent: 7148850. Fractus, 2009.
Infringement Chart—Samsung SGH-T239. Patent: 7202822. Fractus, 2009.
Infringement Chart—Samsung SGH-T559. Fractus, 2009.
Infringement Chart—Samsung SGH-T559 Comeback. Patent: 7148850. Fractus, 2009.
Infringement Chart—Samsung SGH-T559 Comeback. Patent: 7202822. Fractus, 2009.
Infringement Chart—Samsung SGH-T639. Fractus, 2009.
Infringement Chart—Samsung SGH-T639. Patent: 7148850. Fractus, 2009.
Infringement Chart—Samsung SGH-T639. Patent: 7202822. Fractus, 2009.
Infringement Chart—Samsung SGH-T739. Fractus, 2009.
Infringement Chart—Samsung SGH-T739. Patent: 7148850. Fractus, 2009.
Infringement Chart—Samsung SGH-T739. Patent: 7202822. Fractus, 2009.
Infringement Chart—Samsung SGH-T819. Fractus, 2009.
Infringement Chart—Samsung SGH-T819. Patent: 7148850. Fractus, 2009.
Infringement Chart—Samsung SGH-T819. Patent: 7202822. Fractus, 2009.
Infringement Chart—Samsung SGH-T929. Fractus, 2009.
Infringement Chart—Samsung SGH-T929. Patent: 7148850. Fractus, 2009.
Infringement Chart—Samsung SGH-T929. Patent: 7202822. Fractus, 2009.
Infringement Chart—Samsung Spex R210a. Fractus, 2009.
Infringement Chart—Samsung Spex R210a. Patent: 7148850. Fractus, 2009.
Infringement Chart—Samsung Spex R210a. Patent: 7202822. Fractus, 2009.
Infringement Chart—Samsung SPH M520. Fractus, 2009.
Infringement Chart—Samsung SPH M520. Patent: 7148850. Fractus, 2009.
Infringement Chart—Samsung SPH M520. Patent: 7202822. Fractus, 2009.
Infringement Chart—Samsung SPH M540. Fractus, 2009.
Infringement Chart—Samsung SPH M540. Patent: 7148850. Fractus, 2009.
Infringement Chart—Samsung SPH M540. Patent: 7202822. Fractus, 2009.
Infringement Chart—Samsung SPH-A523. Fractus, 2009.
Infringement Chart—Samsung SPH-A523. Patent: 7148850. Fractus, 2009.
Infringement Chart—Samsung SPH-A523. Patent: 7202822. Fractus, 2009.
Infringement Chart—Samsung SPH-M550. Fractus, 2009.
Infringement Chart—Samsung SPH-M550. Patent: 7148850. Fractus, 2009.
Infringement Chart—Samsung SPH-M550. Patent: 7202822. Fractus, 2009.
Infringement Chart—Samsung Sway SCH-U650. Fractus, 2009.
Infringement Chart—Samsung Sway SCH-U650. Patent: 7148850. Fractus, 2009.
Infringement Chart—Samsung Sway SCH-U650. Patent: 7202822. Fractus, 2009.
Infringement Chart—Sanyo Katana II. Fractus, 2009.
Infringement Chart—Sanyo Katana II. Patent: 7148850. Fractus, 2009.
Infringement Chart—Sanyo Katana II. Patent: 7202822. Fractus, 2009.
Infringement Chart—Sanyo Katana LX. Fractus, 2009.
Infringement Chart—Sanyo Katana LX. Patent: 7148850. Fractus, 2009.
Infringement Chart—Sanyo Katana LX. Patent: 7202822. Fractus, 2009.
Infringement Chart—Sanyo S1. Fractus, 2009.
Infringement Chart—Sanyo S1. Patent: 7148850. Fractus, 2009.
Infringement Chart—Sanyo S1. Patent: 7202822. Fractus, 2009.
Infringement Chart—Sanyo SCP 2700. Fractus, 2009.
Infringement Chart—Sanyo SCP 2700. Patent: 7148850. Fractus, 2009.
Infringement Chart—Sanyo SCP 2700. Patent: 7202822. Fractus, 2009.
Infringement Chart—Sharp Sidekick 2008. Fractus, 2009.
Infringement Chart—Sharp Sidekick 2008. Patent: 7148850. Fractus, 2009.
Infringement Chart—Sharp Sidekick 2008. Patent: 7202822. Fractus, 2009.
Infringement Chart—Sharp Sidekick 3. Fractus, 2009.
Infringement Chart—Sharp Sidekick 3. Patent: 7148850. Fractus, 2009.
Infringement Chart—Sharp Sidekick 3. Patent: 7202822. Fractus, 2009.
Infringement Chart—Sharp Sidekick LX 2009. Fractus, 2009.
Infringement Chart—Sharp Sidekick LX 2009. Patent: 7148850. Fractus, 2009.
Infringement Chart—Sharp Sidekick LX 2009. Patent: 7202822. Fractus, 2009.
Infringement Chart—Sharp Sidekick LX. Patent: 7148850. Fractus, 2009.
Infringement Chart—Sharp Sidekick LX. Patent: 7202822. Fractus, 2009.
Infringement Chart—UTStarcom CDM7126. Fractus, 2009.
Infringement Chart—UTStarcom CDM7126. Patent: 7148850. Fractus, 2009.

(56) References Cited

OTHER PUBLICATIONS

Infringement Chart—UTStarcom CDM7126. Patent: 7202822. Fractus, 2009.
Infringement Chart—UTStarcom Quickfire GTX75. Fractus, 2009.
Infringement Chart—UTStarcom Quickfire GTX75. Patent: 7148850. Fractus, 2009.
Infringement Chart—UTStarcom Quickfire GTX75. Patent: 7202822. Fractus, 2009.
Puente , C. ; Romeu , J. ; Cardama , A. Fractal-shaped antennas. Frontiers in electromagnetics—Exhibit Z—IEEE Press, 2000.
Request for inter partes reexamination of US patent No. 7202822 including exhibits C1-C2-C3-C4-C5-D1-D2-D3-D4-E1-E2-E3-E4-E5-F1-F2-F3-G-H-I1-I2-I3-I4-I5.
Wheeler , H. A. Antenna engineering handbook—Chapter 6—Small antennas Johnson , R. C.—McGraw-Hill Jan. 1, 1993.
Wheeler , H. A. Small antennas. Antennas and Propagation , IEEE Transactions Jul. 1, 1975.
Carpintero , F. Response to Office Action for EP patent application 00909089 dated on Feb. 7, 2003. Herrero y Asociados Aug. 14, 2003.
NA Fractus SA's opening claim construction brief—Letter Fractus—Case 6:09-cv-00203-LED-JDL Jul. 16, 2010.
NA Infringement Chart—Blackberry 8310. Patent:7202822. Fractus Nov. 5, 2009.
NA Infringement Chart—Samsung SCH U700. Patent: 7148850. Fractus Nov. 5, 2009.
Moore , S. Response to Office Action dated Feb. 7, 2006 of U.S. Appl. No. 11/033,788. Jenkens & Gilchrist Jun. 1, 2006.
Mithani , S. Response to Office Action dated Aug. 9, 2007 of U.S. Appl. No. 10/797,732. Winstead Nov. 8, 2007.
Munson , R. Antenna Engineering Handbook—Chapter 7—Microstrip Antennas Johnson , R. C.—McGraw-Hill—Third Edition Jun. 1, 1993.
Kyriacos , S. ; Buczkowski , S. et al. A modified box-counting method Fractals—World Scientific Publishing Company Jan. 1, 1994.
Sterne , R. G. Response to the Office Action for the U.S. Appl. No. 95/001,390 dated on Aug. 19, 2010. Sterne, Kessler, Goldstein & Fox PLLC Nov. 19, 2010.
Walker , B. Response to office action dated Aug. 18, 2010 of U.S. Appl. No. 12/498,090. Howison & Arnott Jan. 17, 2011.
Love , J. D. Memorandum opinion and order—Document 582. Court Jan. 20, 2011.
NA Defendant's notice of compliance regarding second amended invalidity contentions. Defendants Jan. 21, 2011.
NA Fractus' reply to defendant's motion for reconsideration of, and objections to, magistrate Judge Love's markman order—Document 609. Fractus Feb. 4, 2011.
NA Declaration of Thomas E. Nelson—Exhibit A—Antenna photos. Defendants Feb. 3, 2011.
NA Report and recommendation of United States magistrate judge. Court Feb. 8, 2011.
NA Order adopting report and recommendation of magistrate judge—Document 622. Court Feb. 11, 2011.
NA United States Table of Frequency allocations—The Radio Spectrum. United States Department of Commerce Mar. 1, 1996.
NA FCC—United States table of frequency allocations. Federal Communications Commission Oct. 1, 1999.
Barnsley , M. Fractals Everywhere. Academic Press Professional Jan. 1, 1993.
NA Notice of compliance with motion practice orders. Fractus Feb. 14, 2011.
NA Defendants LG Electronics Inc, LG Electronics USA, and LG Electronics Mobilecomm USA Inc's second amended answer and counterclaim to second amended complaint. Defendants Feb. 28, 2011.
NA Reply brief in support of Defendant's motion for reconsideration of the court's ruling on the term "at least a portion" in the court's Dec. 17, 2010 claim construction order based on newly-available evidence—Document 645. Defendants Feb. 25, 2011.
NA Defendants Samsung Electronics Co LTD (et al) second amended answer and counterclaims to the second amended complaint of plaintiff Fractus SA. Defendants Feb. 28, 2011.
NA Request for inter partes reexamination of US patent 7202822—95/001414—Third party requester's comments to patent owner's reply dated on Jan. 10, 2011. Samsung Feb. 9, 2011.
NA Request for inter partes reexamination of US patent 7148850—95/001413—Third party requester's comments to patent owner's reply dated on Jan. 10, 2011. Samsung Feb. 9, 2011.
NA Defendant Pantech Wireless Inc amended answer, affirmative defenses, and counterclaims to Fractus' second amended complaint. Defendants Feb. 28, 2011.
Jaggard , D. L. Rebuttal expert report of Dr. Dwight L. Jaggard (redacted version). Fractus Feb. 16, 2011.
Stutzman , W. L. Rebuttal expert report of Dr. Warren L. Stutzman (redacted version). Fractus Feb. 16, 2011.
Long , S. A. Rebuttal expert report of Dr. Stuart A. Long (redacted version). Fractus Feb. 16, 2011.
Fujimoto , K. et al Small Antennas. Research Studies Press LTD Jan. 1, 1987.
NE Applications of IE3D in designing planar and 3D antennas—Release 15.0. Mentor Graphics Jan. 1, 2010.
NA IE3D User's Manual. Mentor Graphics Jan. 1, 2010.
Jaggard , D. L. Expert report of Dwight L. Jaggard (redacted)—expert witness retained by Fractus. Fractus Feb. 23, 2011.
Long , S. Expert report of Stuart Long (redacted)—expert witness retained by Fractus. Fractus Feb. 23, 2011.
Stutzman , W. L. Expert report of Dr. Warren L. Stutzman (redacted)—expert witness retained by Fractus. Fractus Feb. 23, 2011.
NA Fractus's sur-reply to defendants' motion for reconsideration of the court's Dec. 17, 2010 claim construction order based on newly-available evidence—Document 666. Fractus Mar. 8, 2011.
NA Plaintiff Fractus SA's answer to second amended counterclaims of defendant HTC Corporation to Fractus's second amended complaint—Document 678. Fractus Mar. 14, 2011.
NA Plaintiff Fractus SA's answer to second amended counterclaims of defendant HTC to Fractus's second amended complaint—Document 680. Fractus Mar. 14, 2011.
NA Plaintiff Fractus SA's answer to second amended counterclaims of defendant LG Electronics to Fractus's second amended complaint—Document 694. Fractus Mar. 15, 2011.
NA Plaintiff Fractus SA's answer to second amended counterclaims of defendant Samsung to Fractus's second amended complaint—Document 695. Fractus Mar. 15, 2011.
NA Plaintiff Fractus SA's answer to amended counterclaims of defendant Pantech Wireless Inc to Fractus's second amended complaint—Document 696. Fractus Mar. 15, 2011.
NA Order—Document 670. Court Mar. 9, 2011.
Davis, Leonard Order—Document 783. United States District Judge Apr. 1, 2011.
Rumsey , V. Frequency independent antennas—Full. Academic Press Jan. 1, 1966.
NA Fractal Antenna—Frequently asked questions. Fractal Antenna Systems Inc. Jan. 1, 2011.
Petigen , H. Chaos and fractals : New frontiers of science—p. 231-233 and 386-391. Springer Jan. 1, 1992.
NA Fractus SA's Opening Claim Construction Brief with Parties' Proposed and Agreed Constructions in the case of *Fractus SA* v. *Samsung Electornics Co. Ltd. et al.* Fractus—Case 6:09-cv-00203-LED-JDL Jul. 16, 2010.
Andersen , J. B. The handbook of antenna design—Low- and medium-gain microwave antennas Rudge , A. W. et al—IEE Eletromagnetic Waves Series; Peter Peregrinus Ltd. (2nd ed.) Jan. 1, 1986.
Offutt , W. ; DeSize , L. K. Antenna Egineering Handbook—Chapter 23—Methods of Polarization Synthesis Johnson R. C.—McGraw Hill Jan. 1, 1993.
U.S. Appl. No. 12/347,462—Amendment and response to office action dated on Dec. 7, 2011, date: Apr. 3, 2012.
U.S. Appl. No. 12/347,462—Notice of allowance, date: Apr. 13, 2012.

(56) References Cited

OTHER PUBLICATIONS

U.S. Appl. No. 13/020,034—Notice of allowance, date: Apr. 23, 2012.
U.S. Appl. No. 13/020,034—Amendment and response to office action dated on Nov. 8, 2011, date: Apr. 3, 2012.
U.S. Appl. No. 13/038,883—Amendment and response to office action dated Dec. 1, 2011, date: Apr. 3, 2012.
U.S. Appl. No. 13/038,883—Notice of allowance, date: Apr. 30, 2012.
U.S. Appl. No. 13/044,207—Amendment and response to office action dated on Dec. 5, 2011, date: Apr. 3, 2012.
U.S. Appl. No. 13/044,207—Notice of allowance, date: May 1, 2012.
US95/001413—US 95/000593—Action Closing Prosecution for US patent 7148850, date: Apr. 20, 2012.
US95/001413—US95/000593—Third party requester's comments to patent owner's response of Oct. 31, 2011 for US patent 7148850, date: Mar. 23, 2012.
US95/001414—US95/000592—US95/000610—Third party requester's comments to patent owner's response of Oct. 31, 2011 for US patent 7202822, date: Mar. 23, 2012.
US95/001414—95/000592—Action Closing Prosecution for US patent 7202822, date: Apr. 20, 2012.
U.S. Appl. No. 12/309,463—Office action, date: Mar. 28, 2012.
U.S. Appl. No. 12/309,463—Amendment after final action, date: May 23, 2012.
Katsibas , K. D. ; Balanis , C. A. ; Panayiotis , A. T. ; Birtcher , C. R., Folded loop antenna for mobile hand-held units, IEEE Transactions on antennas and propagation, vol. 46, No. 2, Feb. 1998.
Addison , P., Fractals and chaos. An illustrated course, Institute of Physics Publishing, 1997, pp. 14-15.
Peitgen , H. ; Saupe , D., The science of fractal images, Springer-Verlag, 1988, pp. 60-63.
U.S. Appl. No. 12/498,090—Amendment and response to office action dated Dec. 30, 2011.
U.S. Appl. No. 12/498,090—Notice of allowance dated on Apr. 13, 2012.
US95/001413 , US95/000593—Action closing prosecution for US patent 7148850 dated on Jul. 27, 2012.
95/001414—95/000592—Action closing prosecution for US patent 7202822 dated Aug. 9, 2012.
U.S. Appl. No. 13/020,034—Communication to examiner and preliminary amendment dated Jul. 24, 2012.
U.S. Appl. No. 13/038,883—Communication to examiner and preliminary amendment dated Aug. 10, 2012.
U.S. Appl. No. 13/044,207—Communication to examiner and preliminary amendment dated Aug. 14, 2012.
NA. Oral and videotaped deposition of Dr. Stuart Long—vol. 1. Mar. 11, 2011.
NA. Oral and videotaped deposition of Dr. Stuart Long—vol. 2. Mar. 13, 2011.
NA. Oral and videotaped deposition of Dr. Warren L. Stutzman—vol. 1. Mar. 3, 2011.
NA. Oral and videotaped deposition of Dr. Warren L. Stutzman—vol. 2. Mar. 4, 2011.
Baxter , J. Document 0429—Dedaration of Jeffery D. Baxter—Including Exhibits: J, K, L, M ,N ,O, P, Q, R, S, T, U, Z, AA, KK, LL. Defendants. Jul. 30, 2010.
NA. Document 0430—Defendants RIM, Samsung, HTC, LG and Pantech's response to plaintiff Fractus SA's opening daim construction brief. Defendants. Jul. 30, 2010.
NA. Document 0452—Defendant's reply in support of their motion for summary judgment of invalidity based on indefiniteness and lack of written description for certain terms with exhibits WW, BBB, EEE, GGG, HHH, III, KKK, MMM, NNN, OOO, PPP, Q. Defendants. Aug. 30, 2010.
Bhaysar , S. A. Document 0641—Defendant HTC America, Inc's second amended answer and counterclaim to plaintiff's second amended complaint. Defendants. Feb. 25, 2011.
Bhaysar , S. A. Document 0642—Defendant HTC Corporation's second amended answer and counterclaim to plaintiff's second amended complaint. Defendants. Feb. 25, 2011.
Tribble, M. L. Document 0715—Letter to John D. Love—Permission to file a summary judgment motion of no indefiniteness on the issues wher the Court's Report and Recommendation already has held that the claim term is not indefinite. Susman Godfrey. Mar. 18, 2011.
Tribble , M. L. Document 0716—Letter to John D. Love—Permission to file a partial summary judgement motion on infringement. Susman Godfrey , LLP. Mar. 18, 2011.
Sirota, N. Document 0721—Letter to John D. Love—Permission to file a motion for summary judgment of invalidity of the following 7 asserted claims from the MLV, patent family.. Defendants—Baker Botts, LLP. Mar. 18, 2011.
Howe , M. Document 0768—Fractus, S.A.'s objections to the Court's Mar. 9, 2011, Order. Susman Godfrey. Mar. 25, 2011.
Jones, Michael E. Document 0780—Defendants' opposition to Fractus SA objections to the Court's Mar. 9, 2011 Order. Defendants—Baker Botts, LLP. Mar. 31, 2011.
NA. Document 0841—Stipulation of Dismissal of all Claims and Counterclaims re '850 and '822. Defendants. Apr. 15, 2011.
NA. Document 0843—Joint Motion to Dismiss Claims and Counterclaims re '850 and '822. Defendants. Apr. 15, 2011.
NA. Document 0854—Defendants' Motion to Clarify Claim Construction. Defendants. Apr. 18, 2011.
Love , J. D. Document 0868—Order. Court. Apr. 19, 2011.
Howe , M. Document 0887—Fractus's Response to Defendants' Motion to Clarify Claim Construction. Susman Godfrey. Apr. 25, 2011.
NA. Document 0889—Reply in support of defendants' motion to clarify claim construction. Defendants. Apr. 27, 2011.
Howe , M. Document 0893—Fractus SA's surreply to defendant's motion to clarify claim construction. Susman Godfrey. Apr. 29, 2011.
Love , J. D. Document 0900—Order. Court. Apr. 29, 2011.
Love , J. D. Document 0901—Report and recommendation of United States Magistrate Judge. Court. May 2, 2011.
Howe , M. Document 0902—Fractus SA's objections to defendants' prior art notice. Susman Godfrey. May 2, 2011.
Sirota , N. Document 0915—Defendants' response to plaintiff's objections to defendants notice of prior art. Defendants. May 5, 2011.
NA. Document 0933—Defendants' motion for reconsideration of, and objections to, the May 2, 2011 report and recommendation clarifying claim construction. Defendants. May 9, 2011.
Howe , M. Document 0939—Fractus's response to defendants' motion for reconsideration of and objections to the May 2, 2011, report and recommendations clarifying claim construction. Susman Godfrey. May 10, 2011.
Davis , L. Document 0968—Order. Court. May 13, 2011.
Davis, L. Document 0971—Order. Court. May 13, 2011.
Lee , M. Corrected Patent Owner's Response to First Office Action of Oct. 8, 2010 of US patent No. 7148850—95/001413. Stene, Kessler, Goldstein & Fox P.L.L.C. Apr. 11, 2011.
Lee , M. Corrected Patent Owner's Response to First Office Action of Oct. 8, 2010 of US patent No. 7148850—95/001413—Exhibit 1. Sterne Kessler. Apr. 11, 2011.
NA. Request for inter partes reexamination of US patent 7148850—95/001413—Third party requester's comments to patent owner's reply dated on Apr. 11, 2011. Samsung. May 2, 2011.
NA. Oral and videotaped deposition of Dr. Stuart Long—vol. 3. . Mar. 14, 2011.
NA. Document 1082—Joint motion to dismiss HTC. Susman Godfrey LLP. Sep. 13, 2011.
NA. Document 1088—Samsung's motion to determine intervening rights in view of new Federal Circuit case law or, in the alternative, to stay the case pending the outcome of reexamination. Defendants. Oct. 19, 2011.
NA. Document 1092—Samsung's reply in support of its motion to determine intervening rights in view of new Federal Circuit case law or, in the alternative, to stay the case pending the outcome of reexamination. Defendants. Nov. 14, 2011.
NA. Document 1091—Fractus's response to Samsung's motion to determine intervening rights or to stay the case pending the outcome of reexamination. Susman Godfrey LLC. Nov. 2, 2011.
NA. Document 1083—Order—Final consent judgement HTC. Court. Sep. 15, 2011.

(56) References Cited

OTHER PUBLICATIONS

Laufer , P. M. Decision Sua Sponte to merge reexamination proceedings of US patent 7148850 and reexamination Nos. 95/000593—95/001413—95/000598. USPTO. Jun. 8, 2011.
Laufer P. M. Decision Sua Sponte to merge reexamination proceedings of US patent 7202822 and reexamination Nos. 95/000592—95/000610—95/001414. USPTO. Jun. 7, 2011.
Falconer , K. Fractal Geometry: Mathematical Foundations and Applications. John Wiley & Sons. Jan. 1, 1990.
Harrington , R.F. Effect of antenna size on gain, bandwidth, and efficiency. Journal of Research of the National Bureau of Standards—D. Radio Propagation. Jan. 1, 1960.
Borja , C. Fractal microstrip antennas : Antenas fractales microstrip. Universitat Politecnica de Catalunya. Jul. 1, 1997.
Teng , P. L. ; Wong , K. L. Planar monopole folded into a compact structure for very-low-profile multiband mobile-phone antenna. Microwave and optical technology letters. Apr. 5, 2002.
Nguyen , H. Notice of Allowance of U.S. Appl. No. 12/498,090 dated on Mar. 10, 2011. USPTO. Mar. 10, 2011.
Nguyen , H. Office action of U.S. Appl. No. 13/044,207 dated on Dec. 5, 2011. USPTO. Dec. 5, 2011.
Nguyen , H. Office action of U.S. Appl. No. 13/038,883 dated on Dec. 1, 2011. USPTO. Dec. 1, 2011.
Nguyen , H. Office Action of U.S. Appl. No. 12/347,462 dated on Dec. 7, 2011. USPTO. Dec. 7, 2011.
Nguyen , H. Office Action of U.S. Appl. No. 13/020,034 dated on Nov. 8, 2011. USPTO. Nov. 8, 2011.
Nguyen , L. Office Action of US pantent 7148850 and control No. 95/001413—95/000598—95/000593 dated Jul. 29, 2011. USPTO. Jul. 29, 2011.
Nguyen , L. Office Action of US patent 7202822 and control No. 95/000592—95/000610—95/001414 dated Jul. 29. UPSTO. Jul. 29, 2011.
The oral and videotaped deposition of Dwight Jaggard—vol. 1, dated on Mar. 8, 2011.
The oral and videotaped deposition of Dwight Jaggard—vol. 2, dated on Mar. 9, 2011.
The oral and videotaped deposition of Dwight Jaggard—vol. 3, dated on Mar. 10, 2011.
Transcript of pretrial hearing before the Honorable Leonard Davis, US District Judge—May 16, 2011—2:00 PM.
Transcript of jury trial before the Honorable Leonard Davis US District Judge—May 17, 2011—8:00 AM.
Transcript of jury trial before the Honorable Leonard Davis, US District Judge—May 17, 2011—1:10 PM.
Transcript of jury trial before the Honorable Leonard Davis—May 18, 2011—8:45 AM.
Transcript of jury trial before the Honorable Leonard Davis—May 18, 2011—1:00 PM.
Transcript of jury trial before the Honorable Leonard Davis—May 19, 2011—8:45 AM.
Transcript of jury trial before the Honorable Leonard Davis—May 19, 2011—1:00 PM.
Transcript of jury trial before the Honorable Leonard Davis—May 20, 2011—8:30 AM.
Transcript of jury trial before the Honorable Leonard Davis—May 20, 2011—12:30 PM.
Transcript of jury trial before the Honorable Leonard Davis—May 23, 2011—8:55 AM.
Demonstratives presented by Dr. Stuart Long during trial, dated on May 18, 2011.
Demonstratives presented by Dr. Steven Best during trial, dated on May 19, 2011.
Office action for U.S. Appl. No. 12/309,463 dated on Aug. 4, 2011.
Response to non-final office action dated on Aug. 4, 2011 for U.S. Appl. No. 12/309,463, dated on Jan. 23, 2012.
Office action for U.S. Appl. No. 12/498,090 dated on Dec. 30, 2011.
Patent owner's response to first office action of Jul. 29, 2011 of US patent 7202822—95/001414—95/000592—95/000610, dated on Oct. 31, 2011.
Patent owner's response to first office action of Jul. 29, 2011 of US patent 7148850—95/001413—95/000593—95/000598, dated on Oct. 31, 2011.
Amendment and response to final rejection dated Oct. 6, 2001 of U.S. Appl. No. 10/371,676, dated on Dec. 3, 2004.
Garg , R. et al, Microstrip antenna design handbook—Chapter 1—Microstrip Radiators, Artech House, 2001.
Peitgen , H. O. et al, Chaos and fractals, Springer-Verlag, 1992, pp. 880-895.
Handset & antenna analysis—Next-IP Project, Fractus, SA—IPR Department, May 2006.
Teng , P. L. ; Wong , K. L., Planar monopole folded into a compact structure for very-low-profile multi band mobile-phone antenna, Microwave and optical technology letters, Apr. 5, 2002.
Peitgen , H. O. et al, Chaos and fractals, Springer-Verlag, 1992, pp. 23-28, 94-95, 202-206, 225, 231-243, 283-292, 392-396, 441, 225, 372-373, 386-389, 390-391.
Durgun , A. C. ; Reese , M. S. ; Balanis , C. A. et al, Flexible bow-tie antennas with reduced metallization, IEEE Radio and Wireless Symposium (RWS), Jan. 16, 2011, pp. 50-53.
Puente , C., Fractal antennas, Universitat Politecnica de Catalunya, May 1997, pp. ix-xiv, 234-237.
Qiu , Jianming et al., A planar monopole antenna design with band-notched characteristic, IEEE Transactions on antennas and propagations, Jan. 2006, pp. 288-292.
Song , C. T. P. et al, Multi-circular loop monopole antenna, Electronic Letters, Mar. 2000.
Jaggard , D. L., Expert report of Dwight L. Jaggard (redacted)—expert witness retained by Fractus, Feb. 23, 2011, pp. ii-vi, 12-24.
Amendment and response to final rejection dated Oct. 6, 2001 of U.S. Appl. No. 10/371,676 on Dec. 3, 2004—Kyocera Wireless.
U.S. Appl. No. 13/038,883—Office action dated on Jul. 2, 2013.
U.S. Appl. No. 13/038,883—Notice of allowance dated Aug. 6, 2013.
U.S. Appl. No. 13/038,883—Amendment and response to office action dated on Jul. 2, 2013.
U.S. Appl. No. 13/044,207—Notice of allowance dated Aug. 5, 2013.
U.S. Appl. No. 13/044,207—Amendment and response to office action dated on Jul. 2, 2013.
U.S. Appl. No. 13/044,207—Office action dated on Jul. 2, 2013.
US95/001414—US95/000592—Patent owner amendment in response to Right of Appeal Notice mailed on Dec. 13, 2012 for US patent 7202822, dated on Mar. 13, 2013.
US95/001413—US95/000593—Patent owner amendment in response to the Right of Appeal Notice mailed Dec. 13, 2012 for US patent 7148850, dated on Mar. 13, 2013.
EP05012854—Decision of the Technical Board of Appeal of the European Patent Office dated Apr. 20, 2012.
U.S. Appl. No. 13/020,034—Notice of allowance dated on Apr. 3, 2013.
U.S. Appl. No. 13/038,883—Notice of Allowance dated on Apr. 2, 2013.
U.S. Appl. No. 13/044,207—Notice of Allowance dated on Apr. 2, 2013.
US95/001413—US95/000593—Inter partes reexamination certificate for US patent 7148850; dated on Jun. 6, 2013.
U.S. Appl. No. 13/038,883—Amendment to the claims and RCE, dated on Jun. 7, 2013.
U.S. Appl. No. 13/044,207—Amendment to the claims and RCE, dated on Jun. 7, 2013.
US95/001413—US95/000593—Right of appeal notice for the US7148850, dated on Dec. 13, 2012.
US95/001414—US95/000592—Right of appeal notice for the US7202822, dated on Dec. 17, 2013.
U.S. Appl. No. 13/020,034—Notice of allowance, dated Jan. 15, 2013.
James , J. R. ; Hall , P. S., Handbook of microstrip antennas, Peter Peregrinus Ltd., 1989, pp. 3-4 , 205-207.

* cited by examiner

FIG. 6c]

MULTIPLE-BODY-CONFIGURATION MULTIMEDIA AND SMARTPHONE MULTIFUNCTION WIRELESS DEVICES

CROSS-REFERENCE TO RELATED APPLICATIONS

This patent application claims priority from, and incorporates by reference the entire disclosure of U.S. Provisional Patent Application No. 60/831,544, filed Jul. 18, 2006, and U.S. Provisional Patent Application No. 60/856,410, filed Nov. 3, 2006. This patent application further claims priority from, and incorporates by reference the entire disclosure of European Patent Application No. EP 06117352.2, filed Jul. 18, 2006.

TECHNICAL FIELD

The present invention relates to a multifunction wireless device (MFWD), and, more particularly, but not by way of limitation, to a multifunction wireless device and antenna designs thereof combining into a single unit mobile data and voice services with at least one of multimedia capabilities (multimedia terminal (MMT) and personal computer capabilities, (i.e., smartphone) or with both MMT and smartphone (SMRT) capabilities (MMT+SMRT).

HISTORY OF RELATED ART

MFWDs are usually individually adapted to specific functions or needs of a certain type of users. In some cases, it may be desirable that the MFWD is either e.g. small while in other cases this is not of importance since e.g. a keyboard or screen is provided by the MFWD which already requires a certain size.

Many of the demands for modern MFWDs also translate to specific demands for the antennas thereof. For example, one design demand for antennas of multifunctional wireless devices is usually that the antenna be small in order to occupy as little space as possible within the MFWD which then allows for smaller MFWDs or for more specific equipment to provide certain function of the MFWD. At the same time, it is sometimes required for the antenna to be flat since this allows for slim MFWDs or in particular, for MFWDs which have two parts that can be shifted or twisted against each other.

In the context of the present application, a device is considered to be slim if it has a thickness of less than about 14 mm, 13 mm, 12 mm, 11 mm, 10 mm, 9 mm or 8 mm. A slim MFWD should be mechanically stable, mechanical stability being more difficult to achieve in slim devices.

Additionally, antennas in some embodiments are required to be multi-band antennas and to cover different frequency bands and/or different communication system bands. Beyond that, some of the bands have to be particularly broad like the UMTS band which has a bandwidth of 12.2%. For a good wireless connection, high gain and efficiency are further required. Other more common design demands for antennas are the voltage standing wave ratio (VSWR) and the impedance which is typically about 50 ohms.

Furthermore of particular importance, is omni-directional coverage which means that the antenna radiates with a substantially donut-shaped radiation pattern such that e.g. terrestrial base stations of mobile telephone communication systems can be contacted within any direction in the horizontal plane.

However, for satellite communication (for example, for receiving GPS-signals), other radiation patterns are preferred, in particular, those which radiate into the upper hemisphere. Here radiation into the horizontal plane is usually less desired. The polarization of the emitted or received radiation also has to be taken into consideration. Other demands for antennas for modern MFWDs are low cost and a low specific absorption rate (SAR).

Furthermore, an antenna has to be integrated into a device such as MFWD such that an appropriate antenna may be integrated therein which puts constraints upon the mechanical fit, the electrical fit and the assembly fit of the antenna within the device. Of further importance, usually, is the robustness of the antenna which means that the antenna does not change antenna properties in response to smaller shocks to the device.

As can be imagined, a simultaneous improvement of all features described above is a major challenge for persons skilled in the art. A typical exemplary design problem is the generally uniform line of thinking that due to the limits of diffraction, a substantial increase in gain and directivity can only be achieved through an increase in the antenna size.

On the other hand, a MFWD that has a high directivity and hence, a high gain, has to be properly oriented towards a transceiver-base station. This, however, is not always practical since portable device users need to have the freedom to move and change direction with respect to a base station without losing coverage and, therefore, losing the wireless connection. Therefore, less gain is usually accepted in order to obtain an omni-directional (donut-like) radiation pattern.

It has to be taken into account that a palmtop, laptop, or desktop portable device might require a radiation pattern that enhances radiation in the upper hemisphere, i.e., pointing to the ceiling and the walls rather than pointing to the floor, since transceiver stations such as a hotspot antenna or a base station are typically located above or on the side of the portable device. If, however, such a device is used for a voice phone call it will be held substantially upright close to the user's head in which case an omni-directional pattern is preferred which is oriented so that the donut-like shape of the radiation pattern lies in the horizontal.

While it might appear desirable to provide an antenna with a uniform radiation pattern (sphere-like) for voice calls such a pattern turns out to have substantial drawbacks in terms of a desired low specific absorption rate since it sometimes leads to an increased absorption of radiation within the hand and the head of the user during a voice phone call.

In every MFWD, the choice of the antenna, its placement in the device and its interaction with the surrounding elements of the device will have an impact on the overall wireless connection performance making its selection non-trivial and subject to constraints due to particular target use, user and market segments for every device.

As established by L. J. Chu in "Physical Limitations of Omni-Directional Antennas", *Journal of Applied Physics*, Vol. 19, December, 1948, pg. 1163-1175, and Harold A. Wheeler, in "Fundamental Limitations of Small Antennas", *Proceedings of the I.R.E.,* 1947, pgs. 1479-1488. small antennas may not exceed a certain bandwidth. The bandwidth of the antenna decreases in proportion to the volume of the antenna. The bandwidth, however, is proportional to the maximum data rate the wireless connection can achieve and, therefore, a reduction in the antenna size is additionally linked to a reduction in the speed of data transmission.

Furthermore, a reduction of the antenna size can be achieved, for example, by loading the antenna with high dielectric materials for instance by stuffing, backing, coating, filling, printing or over-molding a conductive antenna element with a high dielectric material. Such materials tend to concentrate a high dielectric and magnetic field intensity into a smaller volume. This concentration leads to a high quality factor which, however, leads to a smaller bandwidth. Further, such a high concentration of electromagnetic field in the material leads to inherent electrical losses. Those losses may be compensated by a higher energy input into the antenna which then leads to a portable wireless device with a reduced standby or talk/connectivity time. In the design of MFWDs, every micro Joule of energy available in the battery has to be used in the most efficient way.

Multi-band antennas require a certain space since for each band a resonating physical structure is usually required. Such additional resonating physical structures occupy additional space which then increases the size of the antenna. It is therefore particularly difficult to build antennas which are both small and multi-band at the same time.

As already mentioned above, there exists a fundamental limit established by Chu and Wheeler between the bandwidth and antenna size. Therefore, many small antennas have great difficulty in achieving a desired large bandwidth.

Broadband operation may be achieved by two closely neighboring bands which then require additional space for the resonating physical structure of each of the bands. Further, those two antenna portions may not be provided too close together since, due to electric coupling between the two elements, the merging of the two bands into a single band is not achieved, but rather splitting the resonant spectrum into independent sub-bands which is not acceptable for meeting the requirements of wireless communication standards.

Furthermore, for broadband operation the resonating physical structure needs a certain width. This width, however, requires additional space which further shows that small broadband antennas are difficult to achieve.

It is known to achieve a broadband operation with parasitic elements which, however, require additional space. Such parasitic elements may also not be placed too close to other antenna portions since this will also lead to splitting the resonant spectrum into multiple sub-bands.

An antenna type which may be particularly suitable for slim multifunctional devices or those composed of two parts which can be moved against each other (such as twist, clamshell or slide devices) is a patch antenna (and particularly a PIFA antenna). However patch antennas, are unfortunately known to have poor gain and narrow bandwidths, typically in the range of 1% to 5% which is unsuitable for coverage of certain bands such as the UMTS band.

Although it is known that the bandwidth may be increased by changing the separation between the patch and its ground plane, this then destroys the advantage of patch antennas being flat. This also leads to a distortion of the radiating pattern, for instance, due to surface wave effects.

For patch antennas it is known that by providing a high dielectric material between the patch and the ground plane, it is possible to reduce the antenna size. As mentioned above, such high dielectric materials tend to reduce the bandwidth which is then disadvantageous for patch antennas. Such materials also generally increase losses.

Further difficulties in antenna design occur when trying to build multi-band antennas. While it is possible to separate different antenna portions from each other with appropriate slots or the like, currents and charges in the respective parts always interact with one another by strong and far-reaching electromagnetic fields. Those different antenna branches are, therefore, never completely independent of one another. Trying to add a new branch to an existing antenna structure to produce a new antenna frequency of resonance therefore changes entirely the previous antenna frequencies. Therefore, it is difficult to simply take a working antenna and try to add one more band by just adding one more antenna portion. All previously achieved optimizations for already established frequency bands are lost by such an approach.

Trying to design an antenna with three or more bands gives rise to a linear or, in the worst case an exponential, rise in the number of parameters to consider or problems to resolve. For each band, resonant frequency, bandwidth, and other above-mentioned parameters such as impedance, polarization, gain, and directivity must all be controlled simultaneously. Furthermore, multi-band antennas may be coupled with two or more radio frequency devices. Such coupling raises the issue of isolation between the different radio frequency devices, which are both connected to the same antenna. Isolation of this type is a very difficult task.

Physical changes intended to optimize one parameter of one antenna band change other antenna parameters, most likely in a counter-productive way. It is usually not obvious how to control the counter-productive effects or how to compensate for them without creating still more problems.

Mechanical considerations must also be taken into account in antenna design. For example, the antenna needs to be firmly held in place within a device. However, the materials that are in very close proximity to the metal piece or the conductive portion which forms an antenna or antenna portion, have a great impact on the antenna characteristics. Sometimes extensions or small recesses in the metal piece are provided to firmly hold the antenna in place, however such means which are intended for giving mechanical robustness to the antenna also interact with and change the electric properties of the antenna.

All these different design problems of antennas may only be solved in the design of the geometry of the antenna. All parameters such as size, flatness, multi-band operation, broadband operation, gain, efficiency, impedance, radiation patterns, specific absorption rate, robustness and polarization are highly dependent on the geometry of the antenna. Nevertheless, it is practically impossible to identify at least one or two geometric features which affect only one or two of the above-mentioned antenna characteristics. Thus, there is no individual geometry feature which can be identified in order to optimize one or two antenna characteristics, without also influencing all other antenna characteristics.

Any change to the antenna geometry may harm more than it helps without knowing in advance how and why it happens or how it can be avoided.

Additionally, every platform of a wireless device is different in terms of form factor, market and technical requirements and functionality which requires different antennas for each device.

One problem is solved by providing the MFWD with an RF system and an antenna system with the capability of fully functioning in one, two, three or more communication standards (such as e.g. GSM 850, GSM 900, GSM 1800, GSM 1900, UMTS, CDMA, W-CDMA, etc.), and in particular mobile or cellular communication standards, each standard allocated in one or more frequency bands, each of said frequency bands being fully contained within one of the following regions of the electromagnetic spectrum:

the 810 MHz-960 MHz region, the 1710 MHz-1990 MHz region, and the 1900 MHz-2170 MHz region such that the MFWD is able to operate in three, four, five, six or more of said bands contained in at least said three regions.

One problem to be solved by the present invention is therefore to provide an enhanced wireless connectivity. Another effect of the invention is to provide antenna design parameters that tend to optimize the efficiency of an antenna for a MFWD device while observing the constraints of small device size and enhanced performance characteristics.

SUMMARY OF THE INVENTION

A multifunction wireless device having at least one of multimedia functionality and smartphone functionality, the multifunction wireless device including an upper body and a lower body, the upper body and the lower body being adapted to move relative to each other in at least one of a clamshell, a slide, and a twist manner. The multifunction wireless device further includes an antenna system disposed within at least one of the upper body and the lower body and having a shape with a level of complexity of an antenna contour defined by complexity factors $F_{21}$ having a value of at least 1.05 and not greater than 1.80 and $F_{32}$ having a value of at least 1.10 and not greater than 1.90.

A multifunction wireless device having at least one of multimedia and smartphone functionality, the multifunction wireless device including a microprocessor and operating system adapted to permit running of word-processing, spreadsheet, and slide software applications, and at least one memory interoperably coupled to the microprocessor, the at least one memory having a total capacity of at least 1 GB. The multifunction wireless device further includes an antenna system having a shape with a level of complexity of an antenna contour defined by complexity factor $F_{21}$ having a value of at least 1.05 and not greater than 1.80 and by complexity factor $F_{32}$ having a value of at least 1.10 and not greater than 1.90.

A multifunction wireless device having at least one of multimedia and smartphone functionality, the multifunction wireless device including a receiver of at least one of analog and digital sound signals, an image recording system comprising at least one of an image sensor having at least 2 Megapixels in size, a flash light, an optical zoom, and a digital zoom, and data storage means having a capacity of at least 1 GB. The multifunction wireless device further includes an antenna system having a shape with a level of complexity of an antenna contour defined by complexity factor $F_{21}$ having a value of at least 1.05 and not greater than 1.80 and by complexity factor $F_{32}$ having a value of at least 1.10 and not greater than 1.90.

The present invention is related to a portable multifunction wireless device (MFWD) and in particular to a handheld multifunction wireless device. In some embodiments, the MFWD will take the form of a handheld multimedia terminal (MMT) including wireless connectivity to mobile networks. In some embodiments, the MFWD will take the form of a handheld device combining personal computer capabilities, mobile data and voice services into a single unit (smartphone, SMRT), while in others the MFWD will combine both multimedia and smartphone capabilities (MMT+SMRT).

It is an object of the present invention to provide wireless connectivity to an MFWD that takes the form of a handheld multimedia terminal (MMT). In some embodiments, the MMT will include means to reproduce digital music and sound signals, preferably in a data compressed format such as for instance a MPEG standard such as MP3 (MPEG3) or MP4 (MPEG4). In some embodiments, the MMT will include a digital camera to record still (pictures, photos) and/or moving images (video), combined with a microphone or microphone system to record live sound and convert it to a digital compressed format. The present invention will be particularly suitable for those MMT embodiments combining both music and image capabilities, by providing means to efficiently integrate music, images, live video and sound recording and playing into a very small, compact and lightweight handheld device.

It is an object of the present invention as well, to provide wireless connectivity to an MFWD that takes the form of a smartphone (SMRT). In some embodiments, the smartphone will consist of a handheld electronic unit comprising a microprocessor and operating system (such as for instance but not limited to Pocket PC, Windows Mobile, Windows CE, Symbian, Palm OS, Brew, Linux) with the capability of downloading and installing multiple software applications and enhanced computing capabilities compared to a typical state of the art mobile phone. Typically, SMRT will comprise a small, compact (handheld) computer device with the capability of sharing, opening and editing typical word processing, spreadsheets and slide files that are handled by a personal computer (for instance a laptop or desktop). Although many current mobile phones feature some very basic electronic agenda functions (calendars, task lists and phonebooks) and are even able to install small Java or Brew games, they are not considered here to be smartphones (SMRT).

It is one purpose of the present invention to provide enhanced wireless capabilities to any of the MFWD devices described above. In some embodiments though, providing a wide geographical coverage will be a priority rather than enhanced multimedia or computing capabilities, while in others the priority will become to provide a high-speed connection and/or a seamless connection to multiple networks and standards.

BRIEF DESCRIPTION OF THE DRAWINGS

Further characteristics and advantages of the invention will become apparent in view of the detailed description which follows of some preferred embodiments of the invention given for purposes of illustration only and in no way meant as a definition of the limits of the invention, made with reference to the accompanying drawings:

FIG. 6C shows an example of a third grid to compute the complexity factors of an antenna contour;

DETAIL DESCRIPTION OF THE PREFERRED EMBODIMENTS

Figure 1A:
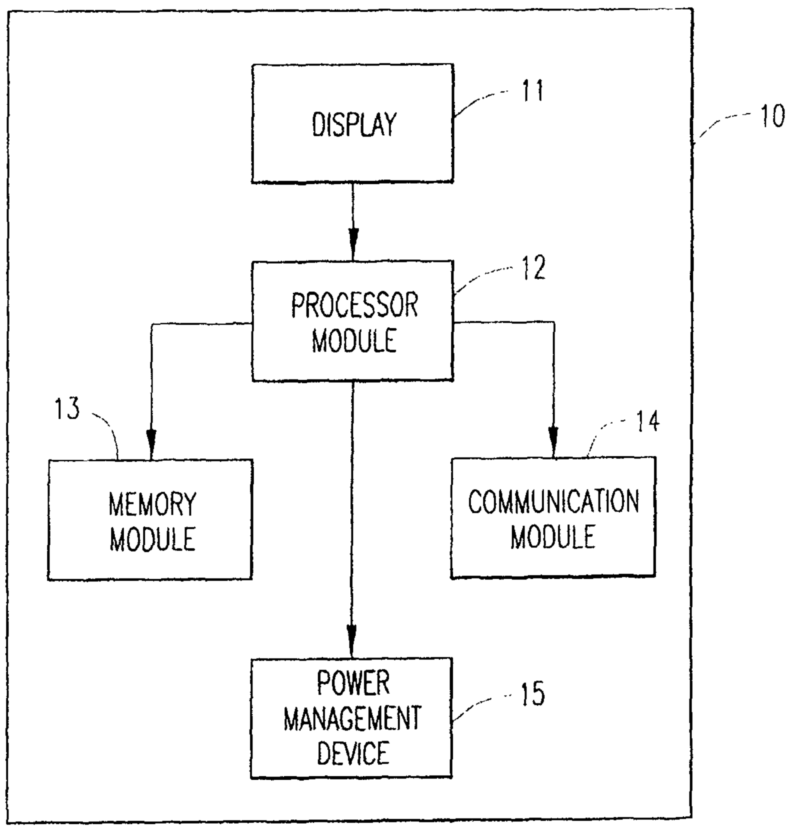
FIG. 1A shows a block diagram of a MFWD of the present invention illustrating the basic functional blocks thereof.

Referring first to FIG. 1A, a multifunction wireless device (MFWD) of the present invention 100 advantageously comprises five functional blocks: display 11, processing module 12, memory module 13, communication module 14 and power management module 15. The display 11 may be, for example, a high resolution LCD or equivalent is an energy consuming module and most of the energy drain comes from the backlight use. The processing module 12, that is the microprocessor or CPU and the associated memory module 13, are also major sources of power consumption. The fourth module responsible of energy consumption is the communication module 14, an essential part of which is the antenna system. The MFWD 100 has a single source of energy and it is the power management module 15 mentioned above that provides and manages the energy of the MFWD 10. In a preferred embodiment, the processing module 12 and the memory module 13 have herein been listed as separate modules. However, in another embodiment, the processing module 12 and the memory module 13 may be separate functionalities within a single module or a plurality of modules. In a further embodiment, two or more of the five functional blocks of the MFWD 100 may be separate functionalities within a single module or a plurality of modules.

The MFWD 100 generally comprises one, two, three or more multilayer printed circuit boards (PCBs) on which to carry and interconnect the electronics. At least one of the PCBs includes feeding means and/or grounding means for the antenna system.

At least one of the PCBs, preferably the same one as the at least one PCB including feeding means and/or grounding means, includes a layer that serves as a ground plane of the antenna system.

The antenna system within the communication module 14 is an essential element of the MFWD 10, as it provides the MFWD 100 with wide geographical and range coverage, high-speed connection and/or seamless connection to multiple networks and standards. Thus, a volume of space within the MFWD 100 needs to be made available to the integration of the antenna system. However, the integration of the antenna system is complicated by the fact that the MFWD 100 also includes one or more advanced functions provided by at least one, two, three or more additional electronic subsystems within and/or modulation to the various modules 11-15 such as:

- a receiver of analog and/or digital sound signals (e.g. for FM, DAB, XDARS, SDARS, or the like).
- a receiver of digital broadcast TV signals (such as DVB-H, DMB)
- a module to download and play streamed video,
- an advanced image recording system (comprising e.g. one, two, three or more of: optical or digital zoom; flash light; one, two or more image sensors, one, two or more of which maybe more than 2 Megapixels in size), data storage means in excess of 1 GB (fixed and/or removable; hard disk drive; non volatile (e.g. magnetic, ferroelectric or electronic) memory), a high resolution image and/or character and graphic display (more than 100 times 100 pixels or more than 320 times 240 pixels (e.g. more than 75,000 pixels) and/or 65,000 color levels or more), a full keyboard (e.g. number keys and character keys separated therefrom and/or at least 26, 30, 36, 40 or 50 keys; the keyboard may be integrated within the MFWD or may be connectable to the MFWD by a cable or a short range wireless connectivity system), a touch screen with a size of at least half of the overall device a geolocalization system (such as e.g. GPS or Galileo or a mobile network related terrestrial system), and/or a module to handle an internet access protocol and/or messaging capabilities (such as email, instant messaging, SMS, MMS or the like).

In some examples, the integration of an antenna system into the MFWD 100 is further complicated by the presence in the MFWD 100 of additional antennas, such as for example antennas for reception of broadcast radio and/or TV, antennas for geolocalization services, and/or antennas for wireless connectivity systems.

The MFWD 100 according to one embodiment achieves an efficient integration of an antenna system alongside other electronic modules and/or subsystems that provide sophisticated functionality to the MFWD 100, (and possibly also in conjunction with additional antennas), in a way that the MFWD meets size, weight and/or battery consumption constraints critical for a portable small-sized device.

The MFWD 100 according to one embodiment is preferably able to provide both voice and high-speed data transmission and receive services through at least one or more of said frequency regions in the spectrum. For that purpose, a MFWD will include the RF capabilities, antenna system and signal processing hardware to connect to a mobile network at a speed of preferably at least 350 Kbits/s, while in some embodiments the data transfer will be performed with at least 1 Mbit/s, 2 Mbit/s or 10 Mbit/s or beyond. For this purpose, a MFWD will preferably include at least 3G (such as for instance UMTS, UMTS-FDD, UMTS-TDD, W-CDMA, cdma2000, TD-SCDMA, Wideband CDMA) and/or 3.5G and/or 4G services (including for instance HSDPA, WiFi, WiMax, WiBro and other advanced services) in one or more of said frequency regions. In some embodiments a MFWD will include also 2G and 2.5G services such as GSM, GPRS, EDGE, TDMA, PCS, CDMA, cdmaOne. In some embodiments a MFWD will include 2G and or 2.5G services at one or both of the first two frequency regions (810-960 MHz and 1710-1990 MHz) and a 3G or a 4G service in the upper frequency region (1900-2170 MHz). In particular, some MFWD devices will provide 3 GSM/GPRS services (GSM900, GSM1800, GSM1900 or PCS) and UMTS/W-CDMA, while some others will provide 4 GSM/GPRS services (GSM850, GSM900, GSM1800, GSM1900 or PCS) and UMTS and/or W-CDMA to ensure seamless connectivity to multiple networks in several geographical domains such as for instance Europe and North America. In some embodiments, a MFWD will include 3G, 3.5G, 4G or a combination of such services in said three frequency regions.

In some embodiments of the invention, the MFWD 100 includes wireless connectivity to other wireless devices or networks through a wireless system such as for instance WiFi (IEEE802.11 standards), Bluetooth, ZigBee, UWB in some additional frequency regions such as for instance an ISM band (for instance around 430 MHz or 868 MHz, or within 902-928 MHz or in the 2400-2480 MHz range, or in the 5.1-5.9 GHz frequency range or a combination of them) and/or within a ultra wide-band range (UWB) such as the 3-5 GHz or 3-11 GHz frequency range.

In some embodiments of the invention, the MFWD 100 provides voice over IP services (VoIP) through a wireless connection using one or more wireless standards such as WiFi, WiMax and WiBro, within the 2-11 GHz frequency region or in particular the 2.3-2.4 GHz frequency region.

The MFWD 100 may have a bar shape, which means that it is given by a single body. It may also have a two-body structure such as a clamshell, flip or slider structure. It may further or additionally have a twist structure in which a body portion e.g. with a screen can be twisted (rotated with two or more axes of rotation which are preferably not parallel).

The MFWD 100 may operate simultaneous in two or more wireless services (e.g. a short range wireless connectivity service and a mobile telephone service, a geolocalization service and a mobile telephone service, etc.).

For any wireless service, more than one antenna (system) may be provided in order to obtain a diversity system and/or a multiple input/multiple output system.

In a MFWD 100 according to an embodiment of the present invention, the structure of the antenna system is advantageously shaped to efficiently use the volume of physical space made available for its integration within the MFWD 100 in order to obtain a superior RF performance of the antenna system (such as for example, and without limitation, input impedance level, impedance bandwidth, gain, efficiency, and/or radiation pattern) and/or superior RF performance of the MFWD 100 (such as for example and without limitation, radiated power, received power and/or sensitivity) in at least one of the communication standards of operation in at least one of the frequency regions. Alternatively, the antenna system can be advantageously shaped to minimize the volume required within the MFWD 100 yet still achieve a certain RF performance.

As a consequence, the resulting MFWD 100 may exhibit in some examples one, two, three or more of the following features:

increased communication range, improved quality of the communication or quality of service (QoS), extended battery life for higher autonomy of the device, reduced device profile and/or the size (an aspect particularly critical for slim phones and/or twist phones), and/or reduced weight of the device (aspect particularly critical for multimedia phones and/or smart phones), all of which are qualities that translate into increased user acceptance of the MFWD 100.

The antenna system also comprises at least one feeding point and may optionally comprise one, two or more grounding points. In some examples of MFWDs, the antenna system may comprise more than one feeding point, such as for example two, three or more feeding points.

The MFWD 100 comprises one, two, three, four, five or more contact terminals. A contact terminal couples the feeding means included in a PCB of the MFWD 100 with a feeding point of the antenna system. The feeding means comprise one, two, three or more RF transceivers coupled to the antenna system through contact terminals.

Similarly, a contact terminal can also couple the grounding means included in a PCB of the MFWD 100 with a grounding point of the antenna system. A contact terminal may take for instance the form of a spring contact with a corresponding landing area, or a pogo pin with a corresponding landing area, or a couple of pads held in electrical contact by fastening means (such as a screw) or by pressure means.

A volume of space within the MFWD 100 of one embodiment of the invention is dedicated to the integration of the antenna system into the device. An antenna box for the MFWD 100 is herein defined as being the minimum-sized parallelepiped of square or rectangular faces that completely encloses the antenna volume of space and wherein each one of the faces of the minimum-sized parallelepiped is tangent to at least one point of the volume. Moreover, each possible pair of faces of the minimum-size parallelepiped shares an edge forming an inner angle of 90°.

Figure 1B:
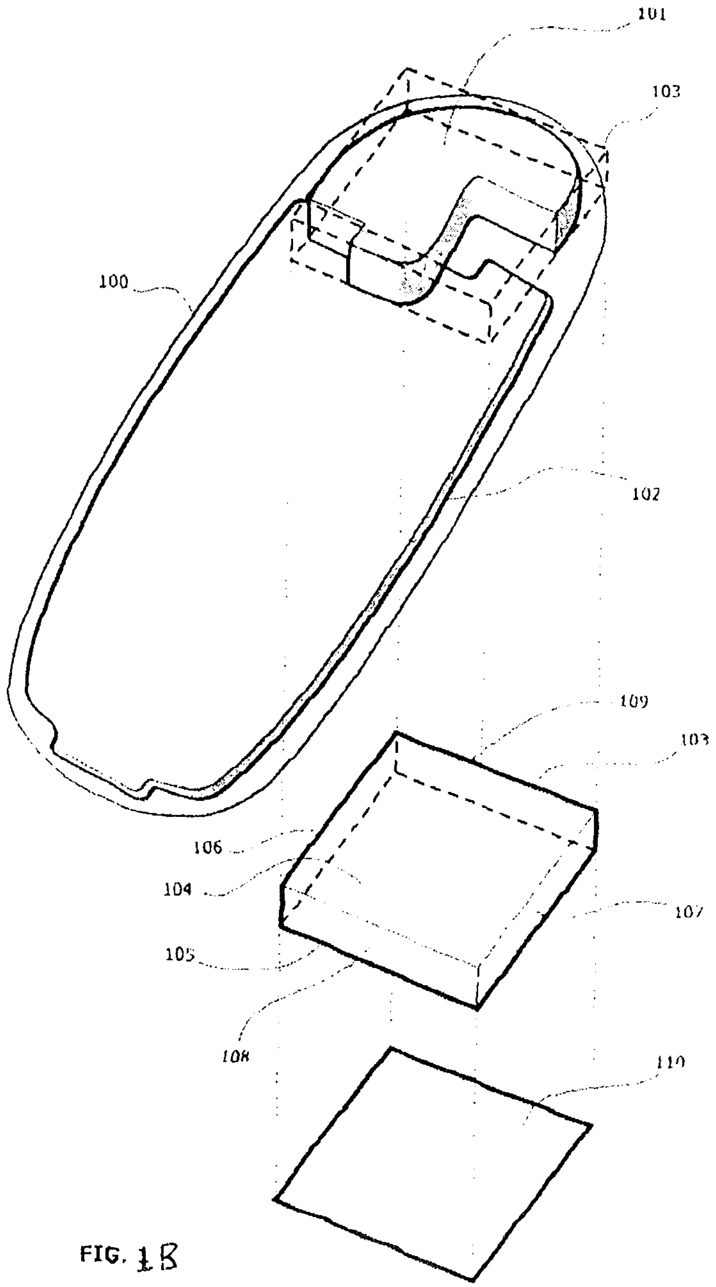
FIG. 1B shows a perspective view of a MFWD including a space for the integration of an antenna system, and its corresponding antenna box and antenna rectangle.

For example, the antenna box shown at 103 of FIG. 1B delimits the volume of space within the MFWD 100 dedicated to the antenna system in the sense that, although other elements of the MFWD 100 (such as for instance an electronic module or subsystem) can be within the antenna box, no portion of the antenna system can extend outside the antenna box.

Therefore, although the volume within the MFWD 100 dedicated to the integration of the antenna system will generally be irregularly shaped, the antenna box itself will have the shape of a right prism (i.e., a parallelepiped with square or rectangular faces and with the inner angles between two faces sharing an edge being 90°).

An antenna system of the MFWD 100 of one embodiment of the invention has a structure able to support different radiation modes so that the antenna system can operate with good performance and reduced size in the communication standards allocated in multiple frequency bands within at least three different regions of the electromagnetic spectrum. Such an effect is achieved by appropriately shaping the structure of the antenna system in a way that different paths are provided to the electric currents that flow on the conductive parts of said structure of the antenna system, and/or to the equivalent magnetic currents on slots, apertures or openings within said structure, thereby exciting radiation modes for the multiple frequency bands of operation. In some cases the structure of an antenna system will comprise a first portion that provides a first path for the currents associated with a radiation mode in a first frequency band within a first region of the electromagnetic spectrum, a second portion that provides a second path for the currents associated with a radiation mode in a second frequency band within a second region of the electromagnetic spectrum and a third portion that provides a third path for the currents associated with a radiation mode in a third frequency band within a third region of the electromagnetic spectrum.

Some of these basic concepts of antenna design are set forth in co-pending U.S. patent application Ser. No. 11/179,257, filed Jul. 12, 2005 and entitled “Multi-Level Antenna” and in co-pending U.S. patent application Ser. No. 11/179,250, filed Jul. 12, 2005 and entitled “Space-Filing Miniature Antenna” both of which are hereby incorporated by reference herein.

In some embodiments of the invention the first, second and third portions are overlapping partially or completely with each other, while in other embodiments the three portions are essentially non-overlapping. In some embodiments only two of the three portions overlap either partially or completely and in some cases one portion of the three portions is the entire antenna system.

In some examples, at least one of the paths has an electrical length substantially close to one time, three times, five times or a larger odd integer number of times a quarter of the wavelength at a frequency of the associated radiation mode. In other examples, at least one of the paths has an electrical length approximately equal to one time, two times, three times or a larger integer number of times a half of the wavelength at a frequency of the associated radiation mode.

A structure of an antenna system of the MFWD 100 according to the present invention is able to support different radiation modes. Such an effect is advantageously achieved by means of one of, or a combination of, the following mechanisms:

creating slots, apertures and/or openings within the structure, bending and/or folding the structure, because an edge-rich, angle-rich and/or discontinuity-rich structure is obtained in which different portions of the structure offer longer and more winding paths for the electric currents and/or the equivalent magnetic currents associated with different frequency bands of operation than would the path of a simpler structure that uses neither one of the aforementioned mechanisms.

The process of shaping the structure of the antenna system into a configuration that supports different radiation modes can be regarded as the process of lowering the frequency of a first radiation mode associated with a first frequency band, and/or subsequently including additional radiation modes associated with additional frequency bands, to an antenna formed of a substantially square or rectangular conducting plate (or a substantially planar structure) that occupies the largest face of the antenna box.

The geometry of a substantially square or rectangular conducting plate occupying a largest face of the antenna box is an advantageous starting point for the design of the geometry of the structure of the antenna system since such a structure offers a priori the longest path for the currents of a radiation mode corresponding to a lowest frequency band, together with the maximum antenna surface. Antenna designers have frequently encountered difficulty in maintaining the performance of small antennas. There is a fundamental physical limit between size and bandwidth in that the bandwidth of an antenna is generally directly related with the volume that the antenna occupies. Thus, in antenna design it may be preferable to pursue maximization of the surface area of an antenna in order to achieve maximum bandwidth. The geometry of an antenna comprised of a substantially square or rectangular conducting plate can be modified by at least one of the following:

creating slots, gaps or apertures within the extension of the plate, removing peripheral parts of the plate, folding or bending parts of said plate, so that the folded or bent parts are no longer on the plane defined originally by the plate, and/or including additional conducting parts in the antenna box that are not contained on the plane originally defined by the plate;

in order to adapt the antenna system to the frequency bands of operation, to the space required by additional electronic modules or subsystems, and/or to other space constraints of the MFWD 100 (as for example those imposed by the ergonomics, or the aesthetics of the MFWD).

In some examples within embodiments of the present invention, one or several modifications of the structure of an antenna system are aimed at lengthening the path of the electric currents and/or the equivalent magnetic currents of a particular radiation mode to decrease its associated frequency band. In other examples, one or several modifications of the structure of an antenna system are aimed at splitting, or partially diverting, the electric currents and/or the equivalent magnetic currents on different parts of the structure of the antenna system to enhance multimode radiation, which may be advantageous for wideband behavior.

The resulting antenna structure (i.e., after modifying its geometry) includes a plurality of portions that allow the operation of the antenna system in multiple frequency bands. Generally, the structure of the antenna system comprises one, two, three, four or more antenna elements with each element being formed by a single conducting geometric element, or by a plurality of conducting geometric elements that are in electrical contact with one another (i.e., there is electrical continuity for direct or continuous current flow). One antenna element may comprise one or more portions of the structure of the antenna system and one portion of the antenna system may comprise one, two, three or more antenna elements. Different antenna elements may be electromagnetically coupled (either capacitively coupled or inductively coupled). Generally an antenna element of the antenna system is not connected by direct contact to another antenna element of said antenna system, unless such contact is optionally done through the ground plane of the antenna system. In some examples, an antenna system with a structure comprising several antenna elements is advantageous to increase the number of frequency bands of operation of said antenna system and/or to enhance the RF performance of said antenna system or that of a MFWD including said antenna system.

In some examples, slots, gaps or apertures created between different antenna elements, or between parts of a same antenna element, serve to decrease electromagnetic coupling between the antenna elements, or the parts of the same antenna element. In other examples, the structure of the antenna system seeks to create proximity regions between antenna elements, or between parts of a same antenna element, to enhance the coupling between the antenna elements, or the parts of a same antenna element.

The design of the structure of the antenna system is intended to use efficiently as much of the volume of the space within the antenna box as possible in order to obtain a superior RF performance of the antenna system and/or superior RF performance of the MFWD 100 in at least one frequency band. In particular, according to the present invention, the structure of the antenna system comes into contact with each of the six (6) faces of the antenna box in at least one point of each face to make better use of the available volume. However, it is generally advantageous to position the geometrical complexity of the structure predominantly on a largest face of the antenna box, and use the third dimension of the antenna box (i.e., the dimension not included in said largest face) to separate the antenna system from other elements of the MFWD 100 (such as for instance, and without limitation, a ground plane, a grounded shield can, a loudspeaker module, a vibrating module, a memory card socket, a hard disk drive, and/or a connector) that may degrade the RF performance of the antenna system and/or the RF performance of the MFWD 100.

For one purpose of the design of the antenna system, an antenna rectangle is defined as being the orthogonal projection of the antenna box along the normal to the face with largest area of the antenna box.

In some exemplary MFWDs, one of the dimensions of the antenna box can be substantially smaller than any of the other two dimensions, or even be close to zero. In such cases, the antenna box collapses to a practically two-dimensional structure (i.e., the antenna box becomes approximately the antenna rectangle).

The antenna rectangle has a longer side and a shorter side. The length of the longer side is referred to as the width of the antenna rectangle (W), and the length of the shorter side is referred to as the height of the antenna rectangle (H). The aspect ratio of the antenna rectangle is defined as the ratio between the width and the height of the antenna rectangle.

In addition to the antenna rectangle, a ground plane rectangle is defined as being the minimum-sized rectangle that encompasses the ground plane of the antenna system included in the PCB of the MFWD 100 that comprises the feeding means responsible for the operation of the antenna system in its lowest frequency band. That is, the ground plane rectangle is a rectangle whose edges are tangent to at least one point of the ground plane.

The area ratio is defined as the ratio between the area of the antenna rectangle and the area of the ground plane rectangle.

In some examples, the antenna system of the present invention advantageously places a feeding point of the antenna system, preferably a feeding point responsible for the operation of the antenna system in its lowest frequency band, near a corner of the antenna rectangle, because it may provide a longer path on the structure of the antenna system for the electric currents and/or the equivalent magnetic currents coupled to the antenna system through the feeding point.

In other examples, the antenna system of the present invention advantageously places a feeding point of the antenna system, preferably a feeding point responsible for the operation of the antenna system in its lowest frequency band, in such a way that a contact terminal of the MFWD 100 is located near an edge of a ground plane encompassed by the ground plane rectangle. Preferably that edge is common with a side of the ground plane rectangle, and preferably the side is a short side of the ground plane rectangle. Such placement of the feeding point of the antenna system, and that of the contact terminal of the MFWD 100 associated with the feeding point, may provide a longer path for electric and/or magnetic currents flowing on the ground plane of the antenna system enhancing the RF performance of the antenna system, or that of the MFWD 100, in at least the lowest frequency band. This becomes particularly relevant in those MFWD 100 having form factors that require a small size of the ground plane rectangle and, consequently, a small size of the whole device.

The structure of the antenna system becomes geometrically more complex as the number of frequency bands in which the MFWD 100 has to operate increases, and/or the size of the antenna box decreases, and/or the RF performance requirements are made more stringent in at least one frequency band of operation. In a MFWD 100 according to the present invention, the structure of the antenna system is geometrically defined by its antenna contour. The antenna contour of the antenna system is a set of joint and/or disjoint segments comprising:

the perimeter of one or more antenna elements placed in the antenna rectangle, the perimeter of closed slots and/or closed apertures defined within the antenna elements, and/or the orthogonal projection onto the antenna rectangle of perimeters of antenna elements, or perimeters of or parts of antenna elements that are placed in the antenna box but not in the antenna rectangle.

The antenna contour, i.e., its peripheral both internally and externally, can comprise straight segments, curved segments or a combination thereof. Not all the segments that form the antenna contour need to be connected (i.e., to be joined). In some cases, the antenna contour comprises two, three, four or more disjointed subsets of segments. A subset of segments is defined by one single segment or by a plurality of connected segments. In other cases, the entire set of segments that form the antenna contour are connected together defining a single set of joined segments (i.e., the antenna contour has only one subset of segments).

Along the contour different segments can be identified e.g. by a corner between two segments, wherein the corner is given by a point on the contour where no unique tangent can be identified. At the corners the contour has an angle. The segments next to a corner may be straight or curved or one straight and the other curved. Further, segments may be separated by a point where the curvature changes from left to right or from right to left. In a sine curve, for example such points are given where the curve intersects the horizontal axis (x-axis, abscissa, sin(x)=0).

It is preferred that right and left curved segments are provided (when following the contour) and/or that at corners angles to the left and to the right (when following the contour) are provided. Preferably the numbers of left and right curved segments respectively, (if provided) do not differ by more than 80%, 70%, 60%, 50%, 40%, 30%, 20% or 10% of the larger of the two numbers. Also the number of corner angles between adjacent segments which following the contour go to the right and those that go to the left do not differ by more than 80%, 70%, 60%, 50%, 40%, 30%, 20% or 10% of the larger of the two numbers. Further preferably the number of the left curved segments plus the number of the corners where the contour turns left and the number of the right curved segments plus the number of corners where the contour turns right do not differ by more than 80%, 70%, 60%, 50%, 40%, 30%, 20% or 10% of the larger of the two numbers.

Generally, one, two, three or more subsets of segments of the antenna contour advantageously each comprise at least a certain minimum number of segments that are connected in such a way that each segment forms an angle with any adjacent segments or a curved segment interposed between such segments, such that no pair of adjacent segments defines a larger straight segment. The angles at corners or curved segments increase the degree of convolution of the curves formed by the segments of each of said subsets leading to an antenna contour that is geometrically rich in at least one of edges, angles, corners or discontinuities, when considered at different levels of detail. Possible values for the minimum number of segments of a subset include 5, 6, 7, 8, 10, 12, 14, 16, 18, 20, 25, 30, 35, 40, 45 and 50. Also a maximum number of segments of a subset may be given. Possible values of said maximum number are 10, 15, 20, 25, 30, 40, 50, 75, 100, 150, 200, 250 and 500.

Additionally, to shape the structure of an antenna system in some embodiments the segments of the antenna contour should be shorter than at least one fifth of a free-space wavelength corresponding to the lowest frequency band of operation, and possibly shorter than one tenth of said free-space wavelength. Moreover, in some further examples the segments of the antenna contour should be shorter than at least one twentieth of said free-space wavelength.

The antenna contour needs to make efficient use of the area of the antenna rectangle in order to attain enough geometrical complexity to make the resulting structure of an antenna system suitable for the MFWD 100. In particular, according to the present invention, the antenna contour preferably comes into contact with each of the four (4) sides of the antenna rectangle in at least one point of each side of the antenna rectangle. The antenna contour should include at least ten segments in order to provide some multiple frequency band behavior, and/or size reduction, and/or enhanced RF performance to the resulting antenna system. However, a larger number of segments may be used, such as for instance 15, 20, 25, 30, 35, 40, 45, 50 or more segments. In general, the larger the number of segments of the antenna contour and the narrower the angles between connected segments, the more convoluted the structure of the antenna system becomes. The number of segments of the antenna contour may be less than 20, 25, 30, 40, 50, 75, 100, 150, 200, 250 or 500.

The length of the antenna contour of an antenna system is defined as the sum of the lengths of each one of the disjointed subsets that make up the antenna contour. The larger the length of the antenna contour, the higher the richness of the antenna contour in at least one of edges, angles, corners or discontinuities, making the resulting structure of an antenna system suitable for a MFWD.

In some examples the length of the antenna contour is larger than 1, 2, 3, 4, 5, 6, 7, 8, 9, 10, 12, 15, 20, 25, 30, 40, or more times the length of the diagonal of the antenna rectangle or less than any of those values.

Each of the one or more antenna elements comprised in the antenna system might be arranged according to different antenna topologies, such as for instance any one of the topologies selected from the following list: monopole antenna, dipole antenna, folded dipole antenna, loop antenna, patch antenna (and its derivatives for instance PIFA antennas), IFA antenna, slot antenna. Any of such antenna arrangements might comprise a dielectric material with a high dielectric constant (for instance larger than 3) to influence the operating frequency, impedance or both aspects of the antenna system.

In accordance with embodiments of the invention, the level of complexity of an antenna contour can be advantageously parameterized by means of two complexity factors, hereinafter referred to as $F_{21}$ and $F_{32}$, which capture and characterize certain aspects of the geometrical details of the antenna contour (such as for instance its edge-richness, angle-richness and/or discontinuity-richness) when viewed at different levels of scale.

For the computation of $F_{21}$ and $F_{32}$ of a particular antenna, a first, a second, and a third grid (hereinafter called grid $G_1$, grid $G_2$ and grid $G_3$ respectively) of substantially square or rectangular cells are placed on the antenna rectangle. The three grids are adaptive to the antenna rectangle. That is, the size and aspect ratio of the cells of each one of said three grids is determined by the size and aspect ratio of the antenna rectangle itself. The use of adaptive grids is advantageous because it provides a sufficient number of cells within the antenna rectangle to fully capture the geometrical features of the antenna contour at differing levels of detail.

Moreover, the three grids are selected to span a range of levels of scale corresponding to two octaves: A cell of grid size $G_2$ is half the size of a cell of grid $G_1$ (i.e., a ½ scaling factor or an octave of scale); a cell of grid size $G_3$ is half the size of a cell of grid $G_2$, or one fourth the size of a cell of grid $G_1$ (i.e., a ¼ scaling factor or two octaves of scale). A range of scales of two octaves provides a sufficient variation in the size of the cells across the three grids as to capture gradually from the coarser features of the antenna contour to the finer ones.

Grids $G_1$ and $G_3$ are constructed from grid $G_2$, which needs to be defined in the first place.

As far as the second grid (or grid $G_2$) is concerned, the size of a cell and its aspect ratio (i.e., the ratio between the width and the height of the cells) are first chosen so that the antenna rectangle is perfectly tessellated with an odd number of columns and an odd number of rows.

In the present invention, columns of cells are associated with the longer side of an antenna rectangle, while rows of cells are associated with a shorter side of the antenna rectangle. In other words, a longer side of the antenna rectangle spans a number of columns, with the columns being parallel to the shorter side of the antenna rectangle. In the same way a shorter side of the antenna rectangle spans a number of rows, with the rows being parallel to the longer side of the antenna rectangle.

If the antenna rectangle is tessellated with an excessive number of columns, then the size of the resulting cells is much smaller than the range of typical sizes of the features necessary to shape the antenna contour. However, if the antenna rectangle is tessellated with an insufficient number of columns, then the size of the resulting cells is much larger than the range of typical sizes of the features necessary to shape the antenna contour. It has been found that setting to nine (9) the number of columns that tessellate the antenna rectangle provides an advantageous compromise, for the preferred sizes of an MFWD, and the corresponding available volumes for the antenna system, according to the present invention. Therefore, a cell width ($W_2$) is selected to be equal to a ninth (1/9) of the length of the longer side of the antenna rectangle (W).

Moreover, it is also advantageous to use cells that have an aspect ratio close to one. In other words, the number of columns and rows of cells of the second grid that tessellate the antenna rectangle are selected to produce a cell as square as possible. A grid formed by cells having an aspect ratio close to one is preferred in order to perceive features of the antenna contour using approximately a same level of scale along two orthogonal directions defined by the longer side and the shorter side of the antenna rectangle. Therefore, preferably, the cell height ($H_2$) is obtained by dividing the length of the shorter side of the antenna rectangle (H) by the odd integer number larger than one (1) and smaller than, or equal to, nine (9), that results in an aspect ratio $W_2/H_2$ closest to one.

In the particular case that two different combinations of a number of columns and rows of cells of the second grid produce a cell as square as possible, a second grid is selected such that the aspect ratio is larger than 1.

Thus, the antenna rectangle is tessellated perfectly with 9 by (2n+1) cells of grid $G_2$, wherein n is an integer larger than zero (0) and smaller than five (5).

A first grid (or grid $G_1$) is obtained by combining four (4) cells of the grid $G_2$. Each cell of the grid $G_1$ consists of a 2-by-2 arrangement of cells of grid $G_2$. Therefore, a cell of the grid $G_1$ has a cell width equal to twice (2) the width of a cell of the second grid ($W_2$) (i.e., $W_1=2\times W_2$); and a cell height ($H_1$) equal to twice (2) the height of a cell of the second grid ($H_2$) (i.e., $H_1=2\times H_2$).

Since grid $G_2$ tessellates perfectly the antenna rectangle with an odd number of columns and an odd number of rows, an additional row and an additional column of cells of said grid $G_2$ are necessary to have enough cells of the grid $G_1$ as to completely cover the antenna rectangle.

In order to uniquely define the tessellation of the antenna rectangle with grid $G_1$ a corner of said antenna rectangle is selected to start placing the cells of the grid $G_1$.

Figure 5:
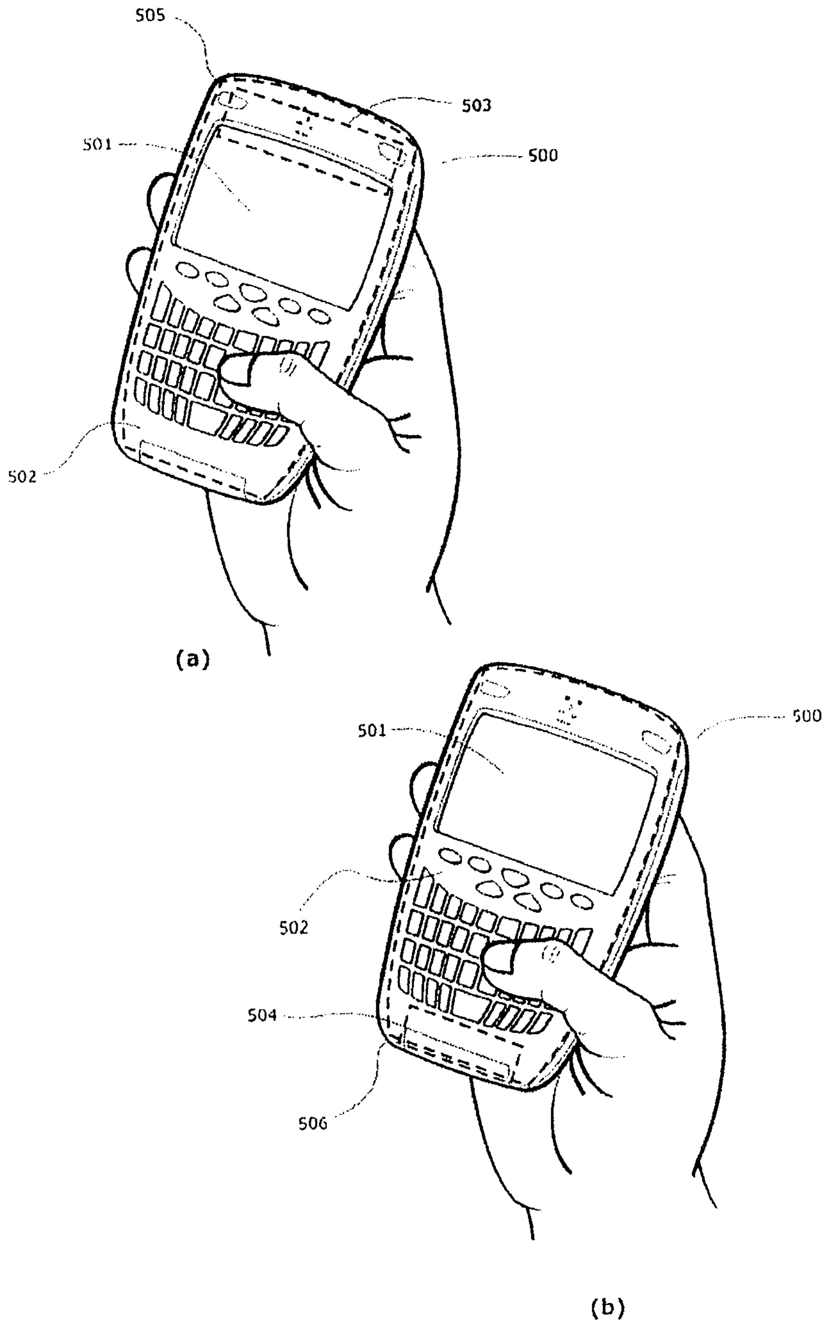
FIGS. 5A-B show an example of MFWD being held typically by a right-handed user to originate a phone call, and how the feeding point corner of the antenna rectangle of said MFWD may be selected.
FIG. 5C shows an exploded view of an exemplary clamshell-type MFWD.

A feeding point corner is defined as being the corner of the antenna rectangle closest to a feeding point of the antenna system responsible for the operation of the antenna system in its lowest frequency band. In case that the feeding point is placed at an equal distance from more than one corner of the antenna box, then the corner closest to a perimeter of the ground plane of the PCB of the MFWD 100 is selected, preferably the corner closest to a shorter edge of the ground-plane rectangle. In case both corners are placed at the same distance from the feeding point and from the shorter edge of the ground-plane rectangle, the feeding point corner will be chosen. For reasons of ergonomics and taking into account the absorption of radiation in the hand of the MFWD user, and considering that there is a predominance of right hand users, it has been observed that in some embodiments it is convenient to place a feeding point and/or to designate the feeding point corner on the corner of the antenna rectangle which is closer to a left corner of the ground plane rectangle. That is, the left side of the ground plane rectangle being the closest to the left side of the MFWD 100 as seen by a right-handed user typically holding the MFWD 100 with the right hand to originate a phone call, while facing a display of the MFWD 100. Also, the selection of the feeding point corner on the top or bottom corner on the left side of the MFWD 100 depends on the position of the antenna system with respect to a body of the MFWD 100. That is, an upper-left corner of the antenna rectangle is preferred in those cases in which the antenna system is placed substantially near the top part of the body of the MFWD (usually, above and/or behind a display) and a lower-left corner of the antenna rectangle is preferred in those cases in which the antenna system is placed substantially near the bottom part of the body of the MFWD 100 (usually, below and/or behind a keypad). Again, due to ergonomics reasons, a top and a bottom part of a body of a MFWD are defined as seen by a right-handed user holding MFWD typically with the right hand to originate a phone call, while facing a display 501 as seen in FIGS. 5 (*a*) and 5 (*b*).

A first cell of the grid $G_1$ is then created by grouping four (4) cells of grid $G_2$ in such a manner that a corner of the first cell is the feeding point corner, and the first cell is positioned completely inside the antenna rectangle.

Once the first cell of the grid $G_1$ is placed, other cells of said grid $G_1$ can be placed uniquely defining the relative position of the grid $G_1$ with respect to the antenna rectangle. The antenna rectangle spans 5 by (n+1) cells of the grid $G_1$, (when $G_2$ includes 9 columns) requiring the additional row and the additional column of cells of the grid $G_2$ that meet at the corner of the antenna rectangle that is opposite to the feeding point corner, and that are not included in the antenna rectangle.

The complexity factor $F_{21}$ is computed by counting the number of cells $N_1$ of the grid $G_1$ that are at least partially inside the antenna rectangle and include at least a point of the antenna contour (in the present invention the boundary of the cell is also part of the cell), and the number of cells $N_2$ of the grid $G_2$ that are completely inside the antenna rectangle and include at least a point of the antenna contour, and then applying the following formula:

$$F_{21} = -\frac{\log(N_2) - \log(N_1)}{\log(1/2)}$$

Figure 8A:
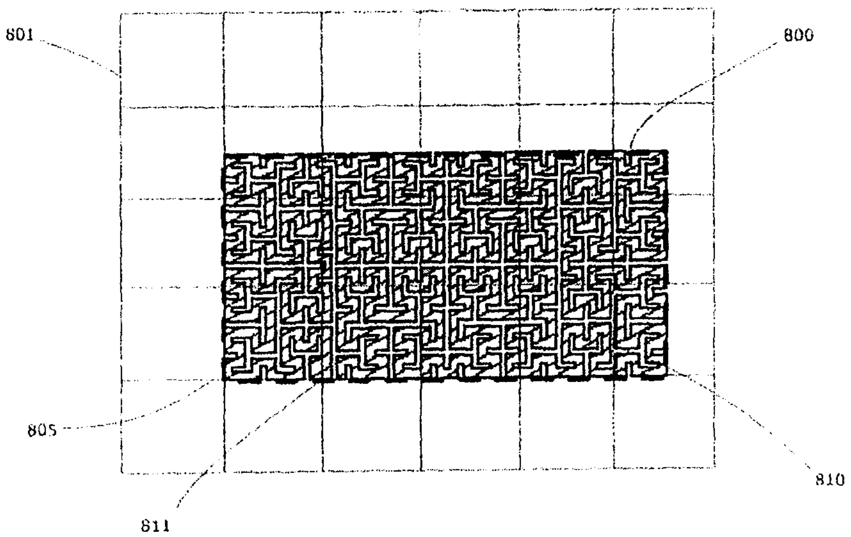
FIG. 8A shows an example of an antenna contour inspired in a Hilbert curve under a first grid to compute the complexity factors of said antenna contour.
Figure 8B:
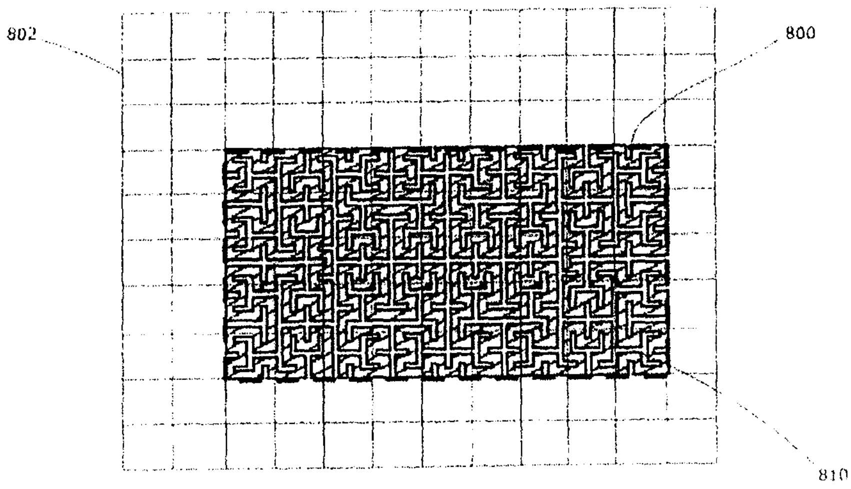
FIG. 8B shows the example of the antenna contour of FIG. 8*a* under a second grid to compute the complexity factors of said antenna contour.
Figure 8C:
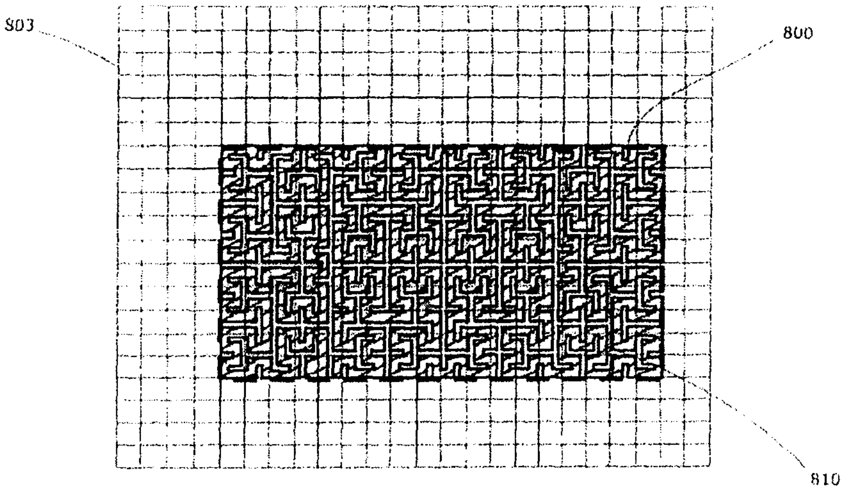
FIG. 8C shows the example of the antenna contour of FIG. 8*a* under a third grid to compute the complexity factors of said antenna contour.

Complexity factor $F_{21}$ is predominantly characterized by capturing the complexity and degree of convolution of features of the antenna contour that appear when the contour is viewed at coarser levels of scale. As it is illustrated in the example of FIGS. 8A-C, the election of grid $G_1$ 801 and grid $G_2$ 802, and the fact that with grid $G_2$ 802 the antenna rectangle 800 is perfectly tessellated by an odd number of columns and an odd number of rows, results in a value of the factor $F_{21}$ equal to one for an antenna contour shaped as the antenna rectangle 800. On the other hand, an antenna contour whose shape is inspired in a Hilbert curve that fills the antenna rectangle 800 features a value of the factor $F_{21}$ smaller than two. Therefore the factor $F_{21}$ is geared more towards assessing an overall complexity of an antenna contour (i.e., whether the degree of convolution of an antenna contour distinguishes sufficiently from a simple rectangular shape when looked at from a zoomed-out view), rather than estimating if the full complexity of an antenna contour (i.e., the complexity of the antenna contour when looked at from a zoomed-in view) approaches that of a highly-convoluted curve such as the Hilbert curve.

Moreover, in some embodiments the factor $F_{21}$ is related to the number of paths that a structure of the antenna system provides to electric currents and/or the equivalent magnetic currents to excite radiation modes (i.e., factor $F_{21}$ tends to increase with the number of antenna portions within the structure of the antenna system and/or the number of antenna elements that form the antenna system). In general, the more frequency bands and/or radiation modes that need to be supported by the antenna structure of the MFWD 100, the higher the value of the factor $F_{21}$ that needs to be attained by the antenna contour of the antenna system of the MFWD 100.

A third grid (or grid $G_3$) is readily obtained by subdividing each cell of grid $G_2$ into four cells, with each of the cells having a cell width ($W_3$) equal to one half (½) of the width of a cell of the second grid ($W_2$) (i.e., $W_3=½\times W_2$); and a cell height ($H_3$) equal to one half (½) of the height of a cell of the second grid ($H_2$) (i.e., $H_3=½\times H_2$).

Therefore, since each cell of the grid $G_2$ is replaced with 2-by-2 cells of the grid $G_3$, then 18 by (4n+2) cells of grid $G_3$ are thus required to tessellate completely the antenna rectangle.

The complexity factor $F_{32}$ is computed by counting the number of cells $N_2$ Of grid $G_2$ that are completely inside the antenna rectangle and include at least a point of the antenna contour, and the number of cells $N_3$ of the grid $G_3$ that are completely inside the antenna rectangle and include at least a point of the antenna contour, and applying then the following formula:

$$F_{32} = -\frac{\log(N_3) - \log(N_2)}{\log(1/2)}$$

Complexity factor $F_{32}$ is predominantly characterized by capturing the complexity and degree of convolution of features of the antenna contour that appear when the contour is viewed at finer levels of scale. As it is illustrated in the example of FIGS. 8A-C, the election of grid $G_2$ 802 and grid $G_3$ 803 is such that an antenna contour whose shape is inspired in a Hilbert curve that fills the antenna rectangle 800 features a value of the factor $F_{32}$ equal to two. On the other hand, an antenna contour shaped as the antenna rectangle 800 features a value of the factor $F_{32}$ larger than one. Therefore the factor $F_{32}$ is geared more towards evaluating the full complexity of an antenna contour (i.e., whether the degree of convolution of an antenna contour tends to approach that of a highly-convoluted curve such as the Hilbert curve), rather than discerning if said antenna contour is substantially different from a rectangular shape.

Moreover, the factor $F_{32}$ is in some embodiments related to the degree of miniaturization achieved by the antenna system. In general, the smaller the antenna box of the MFWD 100, the higher the value of the factor $F_{32}$ that needs to be attained by the antenna contour of the antenna system of the MWFD 100.

The complexity factors $F_{21}$ and $F_{32}$ span a two-dimensional space on which the antenna contour of the antenna system of the MFWD 100 is mapped as a single point with coordinates ($F_{21}$, $F_{32}$). Such a mapping can be advantageously used to guide the design of the antenna system by tailoring the degree of convolution of the antenna contour until some preferred values of the factors $F_{21}$ and $F_{32}$ are attained, so that the resulting antenna system: (a) provides the required number of frequency bands in which the MFWD operates; (b) meets MFWD size and/or integration constraints; and/or (c) enhances the RF performance of the antenna system and/or that of the MFWD in at least one of the frequency bands of operation.

In a preferred embodiment of the present invention, the MFWD 100 comprises an antenna system whose antenna contour features a complexity factor $F_{21}$ larger than one and a complexity factor $F_{32}$ larger than one. In a preferred embodiment, the MFWD 100 comprises an antenna system whose antenna contour features a complexity factor $F_{21}$ larger than or equal to 1.1 and a complexity factor $F_{32}$ larger than or equal to 1.1.

In some examples the antenna contour features a complexity factor $F_{32}$ larger than a certain minimum value in order to achieve some degree of miniaturization.

An antenna contour with a complexity factor $F_{32}$ approximately equal to two, despite achieving substantial size reduction, may not be preferred for the MFWD 100 of the present invention as the antenna system is likely to have reduced capability to operate in multiple frequency bands and/or limited RF performance. Therefore in some examples of embodiments of the present invention the antenna contour features a complexity factor $F_{32}$ smaller than a certain maximum value in order to achieve enhanced RF performance.

In some cases of embodiments of the present invention the antenna contour features a complexity factor $F_{32}$ larger than said minimum value but smaller than said maximum value.

Said minimum and maximum values for the complexity factor $F_{32}$ can be selected from the list of values comprising: 1.10, 1.15, 1.20, 1.25, 1.30, 1.35, 1.40, 1.45, 1.50, 1.55, 1.60, 1.65, 1.70, 1.75, 1.80, 1.85, and 1.90.

Similarly, in some examples an antenna contour advantageously features a complexity factor $F_{21}$ larger than a lower bound and/or smaller than an upper bound. The lower and upper bounds for the complexity factor $F_{21}$ can be selected from the list of comprising: 1.05, 1.10, 1.15, 1.20, 1.25, 1.30, 1.35, 1.40, 1.45, 1.50, 1.55, 1.60, 1.65, 1.70, 1.75, and 1.80.

The complexity factors $F_{21}$ and $F_{32}$ have turned out to be relevant parameters that allow for an effective antenna design. Evaluation of those parameters give good hints on possible changes of antennas in order to obtain improved antennas.

In some cases the parameters $F_{21}$ and $F_{32}$ allow for easy identification of unsuitable antennas. Further those parameters may also be used in numerical optimization algorithms as target values or to define target intervals in order to speed up such algorithms.

In the following paragraphs some parameter ranges for $F_{21}$ and $F_{32}$ which have turned out to be particularly advantageous or useful are summarized.

It has been found that for MFWDs it is particularly useful to have a value of $F_{21}$ larger than 1.43, 1.45, 1.47 or even preferably greater than 1.50. Such values in this complexity factor translate into a richer frequency response of the antenna which allows for more possible resonant frequencies and more frequency bands with better bandwidths or a combination of those effects.

Furthermore, for SMRT or MMT, design demands may be different since those devices are usually larger and a reduction of the antenna size is not of such utmost importance, but energy consumption may be important since those devices have to operate to provide many different functionalities. For those devices a complexity factor $F_{21}$ of only more than 1.39, preferably 1.41 or most preferred more than 1.43 turns out to be advantageous.

For clamshell, twist or slider devices it has to be taken into account that those phones consist of at least two parts which may be moved relative to each other. As a result only a small amount of space is available for the phones and hence, a value of $F_{21}$ of more than 1.43, 1.45, 1.47, or even more preferably greater than 1.50 is advantageous. The same applies to slim devices. For those devices, where there is the requirement of the antenna to be flat, a value of $F_{21}$ greater than the above-mentioned limits provides sufficient possibilities for fringing electromagnetic fields to escape from the area below a patch such that the patch achieves a higher bandwidth and a higher gain. The antenna in case of clamshell, twist or slider devices does not necessarily have to become a patch or patch-like antenna.

For some MFWDs it is usually not possible to allocate a certain volume of space which is only available for the antenna. It may, for example, be necessary to fit an antenna around one, two or more openings in which a camera, a speaker, RF connectors, digital connectors, speaker connectors, power connectors, infrared ports and/or mechanical elements such as screws, plastic insets, posts or clips have to be provided. The respective opening(s) can be achieved by a certain value $F_{21}$ which is higher than 1.38, 1.40, or 1.42, or more preferably greater than 1.45 or 1.50. It turns out that with such values for $F_{21}$ it is possible to provide sufficient opening in order to insert other components.

For those antennas which in their physical properties come quite close to patch antennas namely those with an overlap between the antenna and the ground-plane (patch-like antennas), a value of $F_{21}$ being higher than 1.45, 1.47, 1.50, or 1.60 turns out to be a good measure for an antenna to provide an expected improved bandwidth or gain with respect to a patch antenna without any complexity in at least one of the frequency bands. This region for $F_{21}$ further turns out to be useful for an MFWD with two or more RF transceivers. With a lower value it will be difficult to sufficiently isolate the two RF transceivers against each other. By the complexity factor $F_{21}$ being more than 1.45, 1.47 or 1.50 the two RF transceivers can be electrically separated sufficiently, e.g. by connecting them to two antenna portions which are not in direct electrical contact.

The last mentioned range is also equally suitable for a MFWD with two, three or more antenna elements. Those elements may be convoluted into each other in order to occupy less space which translates into a high value of $F_{21}$.

A MFWD with an antenna with a complexity factor of $F_{32}$ being larger than 1.55, 1.57 or 1.60 is advantageous. Such a high value of $F_{32}$ provides an additional factor for tuning the frequency of high frequency bands without changing the gross geometry for low frequency bands. For this range of $F_{32}$ it turns out that the parameter $F_{21}$ being lower than 1.41, 1.39, 1.37, or 1.35 is advantageous since for a high value of $F_{32}$ which provides some miniaturization, $F_{21}$ may be low in particular to avoid an antenna with too many separate portions or antenna arms since such independent portions are difficult to physically secure with a device in order to achieve proper mechanical robustness.

For a SMRT or MMT device a value of $F_{32}$ being larger than 1.50, 1.52, 1.55 or 1.60 is desirable. The phones which usually operate in high frequency bands such as UMTS and/or a wireless connectivity at a frequency of around 2.4 GHz a higher value of $F_{32}$ can be used to appropriately adapt the antenna to a desired resonance frequency and/or bandwidth in those bands.

For slim devices (thickness less than 14 mm, 13 mm, 12 mm, 11 mm, 10 mm, 9 mm or 8 mm) it turns out that a parameter of $F_{32}$ being larger than 1.60, 1.62 or 1.65 may be desired in order to achieve an edge rich structure that reduces the problems of certain antenna structures, such as flat patch antennas. A high value of $F_{32}$ may lead to an increased bandwidth which is useful in certain cases such as coverage of the UMTS band. For the same reasons, in some embodiments of MFWD and particularly in slim devices, it is preferred that the intersection of the projection of the antenna rectangle 110 onto the ground plane rectangle 202 is less than 90% of the area of said antenna rectangle. In particular, such a intersection should be in some cases below 80%, 70%, 50%, 30%, 20% or 10% of said area. Such values for the intersection may be given also for devices which are not considered slim.

For clamshell, twist or slider devices, even higher values of $F_{32}$ such as higher than 1.63, 1.65, 1.68 or 1.70 may be necessary since in those MFWDs the antennas have to be even more flat.

MFWDs which have a camera or any other item such as a connector integrated in the antenna box it is desirable to have a value of $F_{32}$ being larger than 1.56, 1.58, 1.60 or 1.63. For those devices it turns out that the mechanical fixing of the antenna may be difficult due to other items which are within the antenna box. With a high value of $F_{32}$ being more than 1.55, or the other values mentioned above, the antenna usually has an edge or recess rich structure that facilitates fixing of the antenna at its border. Therefore, usually there is no problem in mechanically securing an antenna with a high value of $F_{32}$ within a wireless device.

For antennas which are overlapping with the ground plane of a PCB of the MFWD with at least 50% or 100%, it is possible to achieve appropriate antenna performance even if the value of $F_{21}$ is smaller than e.g. 1.42, 1.40 or 1.38 in cases that the complexity factor $F_{32}$ is more than 1.55. Such edges, curves or steps in the border which lead to a high value of $F_{32}$, increase efficiency and gain since they lead to strong reorientations of current. This may compensate for lower values of $F_{21}$, in particular for antennas of patch-like geometry (i.e. those where the antenna overlaps 100% with the ground plane of a PCB of the MFWD).

Equally for MFWDs with two or more RF transceivers, efficient antennas are possible for values of $F_{21}$ being lower than 1.40, 1.38 or 1.35 in cases that the complexity factor $F_{32}$ is larger than 1.50, 1.52, 1.53, 1.57 or 1.60. Appropriate separation of the two RF transceivers is difficult with a low value of $F_{21}$. It may still be possible, however, with a high complexity value of $F_{32}$, which enables some kind of compensation for a low value of $F_{21}$.

In some embodiments, when a high level of complexity is sought it might be necessary to design an antenna system whose structure comprises 2, 3 or more antenna elements. Such complexity may be achieved at a coarser and/or finer level of detail. When a high level of complexity is sought in a coarser level of detail, a high value of $F_{21}$ might be required, namely more than 1.43, 1.45, 1.47, or 1.50. When a high level of complexity is sought in a finer level of detail, a high value of $F_{32}$ might be required, namely more than 1.61, 1.63, 1.65 or 1.70.

Furthermore, it turns out that for some MFWDs with three or more antenna elements, a value of $F_{21}$ lower than 1.36, 1.34, 1.32, 1.30, or even less than 1.25 is advantageous. In these cases the use of an additional antenna element pursues the enhancement of the radio electric performance of the antenna system in at least one of the frequency bands rather than introducing an additional frequency band disjoined from those already supported by the antenna system. For the above mentioned reason it may be advantageous to keep the value of $F_{21}$ below a certain maximum. That can be achieved by reducing the separation of the third or additional antenna elements with respect to the antenna elements already present in the structure of the antenna system, so that the gaps between those antenna elements are not fully observed at a coarser level of detail. Therefore, for MFWDs with three or more antenna elements, lower values of $F_{21}$ may be preferred in certain cases. Additionally, the separation of the antenna system into three or more antenna elements allows for easier adaptation of each antenna element to space requirements within the MFWD such that miniaturization is not such an issue. Therefore, it is possible to have antennas with larger dimensions which then provide for improved radiation efficiency, higher gain and also simply easier design and hence, less costly antennas.

With MFWDs, in general, it turns out to be particularly useful to have a value of $F_{21}$ greater than 1.42, 1.44, 1.46, 1.48 or 1.50 while at the same time having a value of $F_{32}$ being lower than 1.44, 1.42, 1.40 or 1.38. This is because for the portion of the antenna that resonates at low frequencies (which means long wavelengths, and hence, a long antenna portion), higher miniaturization is required. This miniaturization of large-scale portions translates into a high value of $F_{21}$ and vice versa. For higher frequencies which have smaller wavelengths, there is not such a strong requirement for miniaturization but, rather an enhanced bandwidth is desired. Therefore lower values of $F_{32}$ may be preferred. Low values of $F_{32}$ further allow for maximum efficiency since those antennas do not need to be extremely miniaturized.

It is particularly useful to use a parameter range of $F_{21}$ being more than 1.32, 1.34 or 1.36 and less than 1.54, 1.52 or 1.50 while at the same time $F_{32}$ is less than 1.44, 1.42 or 1.40 and more than 1.22, 1.24 or 1.26. In this parameter range the values of $F_{21}$ and $F_{32}$ assume intermediate values which give the possibility of having different design parameters such as smallness, multi-band and broadband operation, as well as an appropriate antenna gain and efficiency to be taken into account equally. This parameter range is particularly useful for MFWDs where there is no single or no two design parameters which are of outstanding importance.

Another useful parameter range is given by $F_{21}$ being less than 1.32, 1.30 or 1.28 with a value of $F_{32}$ being less than 1.54, 1.52 or 1.50 and at the same time being greater than 1.34, 1.36 or 1.38. This parameter range is useful for MFWDs where the robustness of the device is of outstanding importance since a low value of $F_{21}$ leads to devices with a particularly simple geometry without having many highly diffracted portions which are difficult to mechanically secure individually within a device. In order to achieve some miniaturization, however, a value of $F_{32}$ in the indicated range is preferred when taking into account the trade off between the disadvantages of too high values of $F_{32}$ (in terms of too strong miniaturization which leads to a poor bandwidth) while on the other hand wanting to have at least some kind of miniaturization corresponding to $F_{32}$ being above a lower limit.

For some MFWDs it may be desirable to have the value of $F_{32}$ being less than 1.52, 1.50, 1.48, or 1.45. It was found that antenna elements with highly complex borders are often quite difficult to manufacture and assemble. For instance stamping tools require more resolution and wear out more easily in case of complex borders (which means high value of $F_{32}$) which translates into higher manufacturing costs (tooling manufacturing costs, tool maintenance cost, larger number of hits per piece of the stamping tool) and delivery lead times, particularly for large volume production.

This turns out to be important for large volume devices such as slim phones where mass production is common. High volume puts extreme pressure on manufacturing costs, time to market and production volumes.

Additionally, shapes with high factors of $F_{32}$ are very complicated to model with appropriate CAD tools as the very complicated shapes turn out to consume a lot of computing time. This increases development costs which in turn increases total costs of such an antenna design.

Equally, for clamshell, twist or slider phones (which may have a major portion of the market share where mass manufacturing is carried out), it may be desirable to have a value of $F_{32}$ being less than 1.30, 1.28 or 1.26.

For relatively low cost and robust antenna design, it is preferable to have the value of $F_{21}$ being more than 1.15 or 1.17 and at the same time being less than 1.40, 1.38 or 1.36 while the value of $F_{32}$ is less than 1.30, 1.28 and more than 1.15 or 1.17.

Additionally, it is advantageous to have a SMRT or a MMT device which is of the type twist, or clamshell.

For a MFWD which is slim (which here means it has a thickness of less than on the order of 14 mm) and is of the type clamshell, twist or slider the flatness requirement is very demanding because each of the parts forming the clamshell, twist or slider may only have a maximum thickness of 5, 6, 7, 8 or 9 mm. With the technology disclosed herein, it is possible to design flat antennas even for such MFWDs.

A MFWD incorporating 3.5G or 4G features (i.e. comprising 3G and other advanced services such as for instance HSDPA, WiBro, WiFi, WiMAX, UWB or other high-speed wireless standards, hereinafter 4G services) might require operation in additional frequency bands corresponding to said 4G standards (for instance, bands within the frequency region 2-11 GHz and some of its sub-regions such as for instance 2-11 GHz, 3-10 GHz, 2.4-2.5 GHz and 5-6 GHz or some other bands). In some cases, to achieve a maximum volume compactness it would be advantageous that the same antenna system is capable of supporting the radiation modes corresponding to the additional frequency bands. Nevertheless, this approach can be inconvenient as it will increase complexity to the RF circuitry of the MFWD 100, for example by filters to separate the frequency bands of the 4G services from the frequency bands of the rest of services. Therefore it may be advantageous to have a dedicated antenna for 4G services although inside the antenna box.

In other cases, achieving good isolation between the frequency bands of the 4G services and the frequency bands of the rest of services (3G and below) is preferred to compactness. In those cases the 4G antenna (i.e. the one or more additional antenna covering one or more of the 4G services) will preferably be separated as much as possible from the antenna box. Generally the longer side of the antenna rectangle is placed alongside a short edge of the ground plane rectangle. In some cases it would be advantageous to place the 4G antenna substantially close to the edge that is opposite to the shorter edge. In other cases it would be advantageous to place the 4G antenna substantially close to an edge that is adjacent to the shorter edge. Therefore since the MFWDs physical dimensions are usually predefined, the separation between antennas can be further increased by reducing the shorter side of the antenna rectangle and thus increasing its aspect ratio. As a consequence, for those devices, it may be desirable to have a value of $F_{32}$ higher than 1.35, 1.50, 1.60, 1.65 or 1.75. When the complexity factor $F_{21}$ is in the lower half of the typical range, for example when $F_{21}$ is smaller than 1.40, it may be advantageous to have a value of $F_{32}$ higher than 1.35. On the other hand when the complexity factor $F_{21}$ is in the upper half of its typical range, for example when $F_{21}$ is larger than 1.45, it may be advantageous to have a value of $F_{32}$ higher than a minimum value that can be selected from the list of values comprising: 1.10, 1.15, 1.20, 1.25, 1.30, 1.35, 1.40, 1.45, 1.50, 1.55, 1.60, 1.65, 1.70, 1.75, 1.80, 1.85, and 1.90.

Advantageously MFWD including 4G services may have two or more dedicated antennas for the 4G services forming an antenna diversity arrangement. In those cases not only is good isolation between the antenna system and the antennas for the 4G services required but also good isolation between the two or more antennas forming the antenna diversity arrangement.

One, two or more 4G antennas may be IFA-antennas and they may be located outside of the ground plane rectangle. They may be located next to the ground plane. One, two or more 4G antennas may be slot antennas, preferably within the ground plane.

Typically the number of contacts in an antenna system is proportional to the number of RF transceivers coupled to the antenna system and to the number of antenna elements comprised in the structure of the antenna system. Each RF transceiver drives an antenna element through typically one contact. Additionally each of the antenna elements may have a second contact for grounding purposes. Parasitic antenna elements typically comprise a contact terminal used for grounding purposes.

In some examples, the MFWD integrates an antenna system in such a way that the antenna rectangle of the antenna system is at least partially (such as for instance at least a 10%, 20%, 30%, 40%, 50% or even 60%) or completely on the projection of the ground plane rectangle of said MFWD. In some other examples, the antenna rectangle is completely outside of the projection of the ground plane rectangle of said MFWD.

In other examples in which the antenna rectangle of an antenna system is in the projection of the ground plane rectangle of a MFWD in an area of less than 10%, 20% or 30% of the antenna rectangle, the antenna contour of the antenna system preferably features a complexity factor $F_{21}$ larger than 1.20, 1.30, 1.40 or 1.50. In still other examples in which the antenna rectangle of an antenna system is in the projection of the ground plane rectangle of a MFWD in an area larger than 80%, 90% or 95% of said antenna rectangle, the antenna contour of the antenna system preferably features a complexity factor $F_{21}$ smaller 1.30, 1.35, 1.40 or 1.45.

Another aspect of the integration of an antenna system within a MFWD is the positioning of the antenna system with respect to the one or more bodies comprised in the MFWD.

An antenna system can be integrated either in the top part of the body of a MFWD (usually, above and/or behind a display), or in the bottom part of a body of the MFWD (usually, below and/or behind a keypad).

In some examples, an antenna system integrated within the bottom part of as body of a MFWD features advantageously an antenna contour with a complexity factor $F_{21}$ smaller than 1.45 and a complexity factor $F_{32}$ smaller than 1.50, since generally there is quite a bit more space available in such a part of the device. In some other examples, the antenna contour preferably features a factor $F_{21}$ larger than 1.45 and/or a factor $F_{32}$ larger than 1.75.

In some examples, an antenna system integrated on the top part of the body of a MFWD advantageously features an antenna contour with a complexity factor $F_{21}$ smaller than 1.30, 1.25, or 1.20. In some other examples, the antenna contour preferably features a factor $F_{21}$ larger than 1.45, 1.50 or 1.55.

In some cases, a two-body MFWD (such as for instance a clamshell or a flip-phone, a twist device, or a slider device) integrates the antenna system in the vicinity of the hinge that allows rotation of at least one of the two bodies. In such cases, the antenna contour of the antenna system preferably features a complexity factor $F_{21}$ larger than 1.20 and/or a complexity factor $F_{32}$ larger than or equal to 1.55.

Further of advantage for a general trade off between multiple parameters are values of a complexity factor of $F_{21}$ being more than 1.52 and less than 1.65 and/or a complexity factor $F_{32}$ being more than 1.55 and less than 1.70.

Illustration Examples

Referring now to FIG. 1B, there is shown a perspective view of a MFWD 100 comprising, in this particular example, only one body. A volume of space 101 within the MFWD 100 is made available for the integration of an antenna system. The MFWD 100 also comprises a multilayer PCB that includes feeding means and/or grounding means. A layer 102 of the PCB serves as a ground plane of the antenna system.

An antenna box 103 is obtained as a minimum-sized parallelepiped that completely encloses the volume 101. In this example, the antenna box 103 has rectangular faces 104-109. According to the present invention as described above, the structure of the antenna system comes into contact with each of the six (6) faces of the antenna box 104-109 in at least one point of each face. Moreover, the antenna system of MFWD 100 has no portion that extends outside the antenna box 103.

An antenna rectangle 110 is obtained as the orthogonal projection of the antenna box 103 along the normal to the face with largest area, which in this case is the direction normal to faces 104 and 105.

Figure 2:
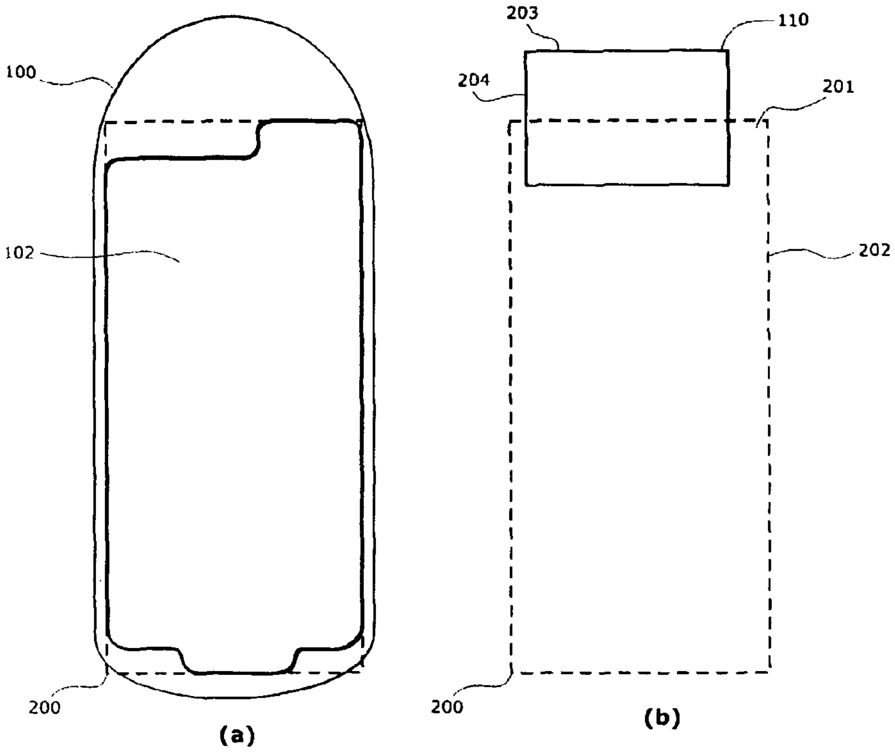
FIG. 2A shows an example MFWD comprising a ground plane layer included in a PCB, and its corresponding ground plane rectangle.
FIG. 2B shows the ground plane rectangle of the MFWD of FIG. 2*a* in combination with an antenna rectangle for an antenna system.

Referring now to FIG. 2A, there is shown a top plan view of the MFWD 100. For the sake of clarity, the volume of space 101 has been omitted in FIG. 2A. A ground plane rectangle 200 is adjusted around the layer 102 that serves as a ground plane to the antenna system of the MFWD 100. The ground plane rectangle 200 is the minimum-sized rectangle in which each of its edges is tangent to at least one point of the perimeter of layer 102.

FIG. 2B depicts the relative position of the ground plane rectangle 200 and the antenna rectangle 110 for the MFWD 100 of FIG. 1A. The antenna rectangle 110 has a long side 203 and a short side 204. The ground plane rectangle 110 has a long edge 202 and a short edge 201.

In this particular example, the antenna rectangle 110 and the ground plane rectangle 200 lie substantially on a same plane (i.e., the antenna rectangle 110 and the ground plane rectangle 200 are substantially coplanar). Furthermore, a long side 203 of the antenna rectangle 110 is substantially parallel to a short edge 201 of the ground plane rectangle 200, while in some other embodiments it will be substantially parallel to a long edge 202 of the ground plane rectangle 200.

In this example, the antenna rectangle 110 is partially overlapping the ground plane rectangle 200. Although in other cases, they can be completely overlapping or completely non-overlapping. Moreover, in this example the placement of the antenna rectangle 110 is not symmetrical with respect to an axis of symmetry that is parallel to the long edge 202 of the ground plane rectangle 200 and that passes by the middle point of the short edge 201 of said ground plane rectangle 200. In other words, the antenna rectangle 110 is shifted slightly to the left as seen in this view.

Figure 3:
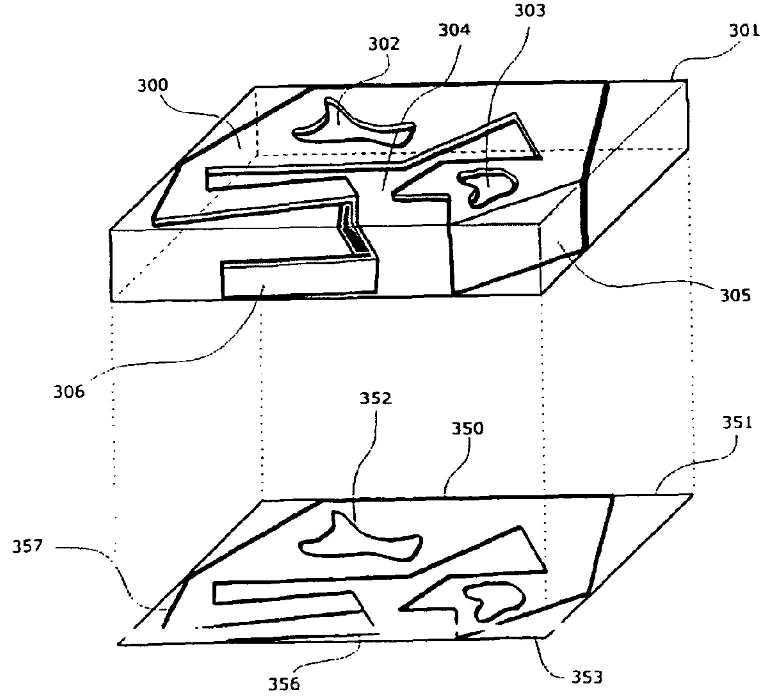
FIG. 3 shows an example of an antenna contour of an antenna system for a MFWD.

FIG. 3 shows an example of a structure of an antenna system contained within an antenna box 301. In this particular example, the structure comprises only one antenna element 300. The antenna element 300 has been shaped to be able to support different radiation modes, in order that the resulting antenna system can operate in multiple frequency bands. In particular, two apertures 302 and 303 with closed perimeters have been created in the antenna element 300. Additionally, the antenna element 300 also features an opening 304 that increases the number of segments that form the perimeter of the antenna element 300. The antenna element 300 also includes two parts 305 and 306 that are bent 90° with respect to the rest of the antenna element 300, but are fully contained in the antenna box 301.

The bottom part of FIG. 3 shows an antenna rectangle 351 associated with the antenna box 301. The antenna rectangle 351 contains the antenna contour 350 associated with the antenna element 300.

The antenna contour 350 comprises three disjointed subsets of segments: (a) a first subset is formed by the segments of the perimeter 357 (which includes both external segments of the antenna element 300 and those segments added to said antenna element by the opening 304) and the group of segments 356 corresponding to the orthogonal projection of part 306 of the antenna element 300; (b) a second subset is formed by the segments 352 associated to the perimeter of aperture 302; and (c) a third subset is formed by the segments 353 associated to the perimeter of aperture 303.

Note that in this example, part 305 of the antenna element 300 has an orthogonal projection that completely matches a segment of the perimeter 357, and therefore does not increase the number of segments of the antenna contour 350.

Figure 4:
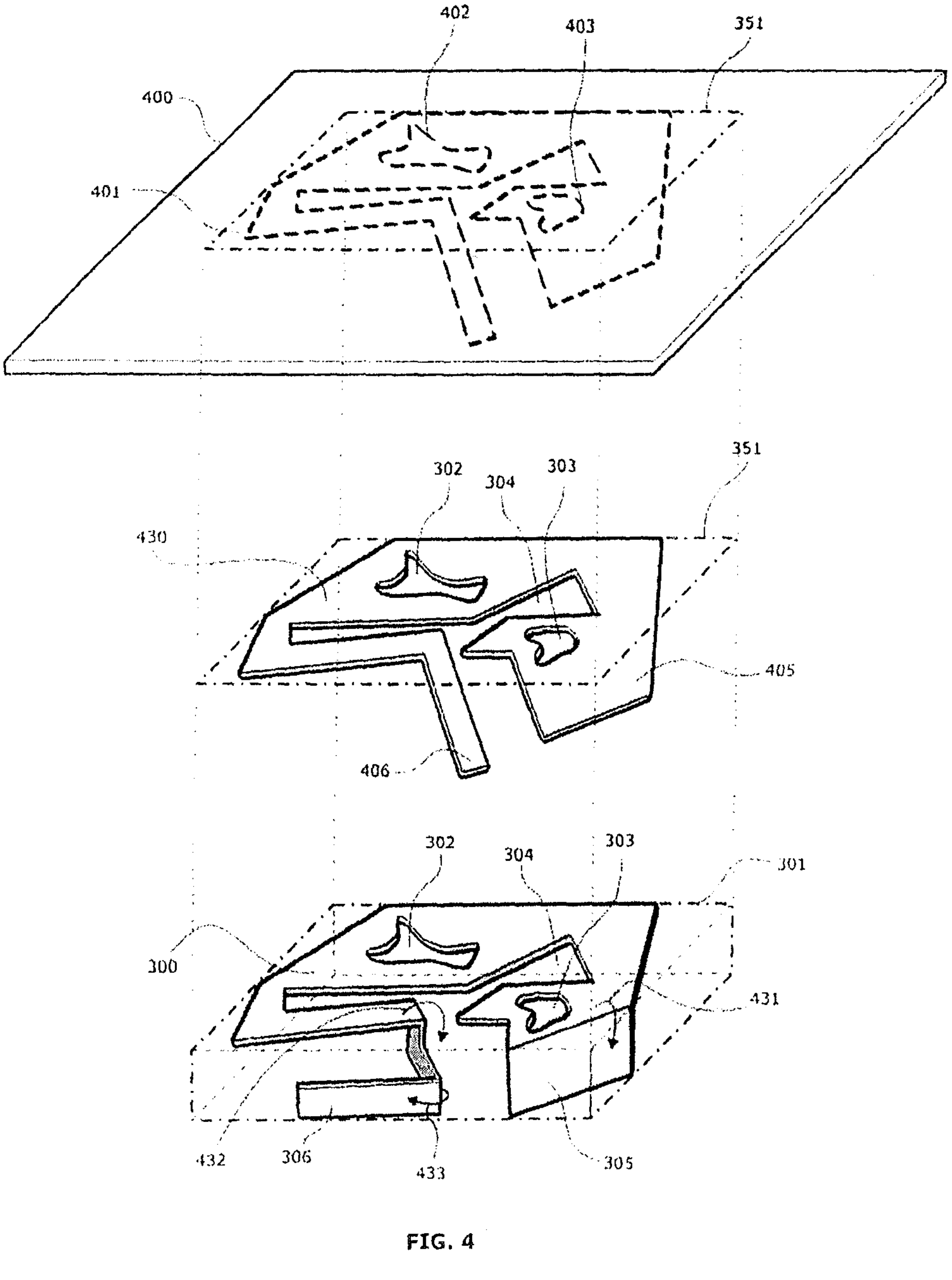
FIG. 4 from top to down shows an example of a process (for instance a stamping process) followed to shape a rectangular conducting plate to create the structure of an antenna system for a MFWD.

Referring now to FIG. 4 there is shown how the structure of an antenna system such as the one presented in FIG. 3 can be obtained by appropriately shaping a rectangular conducting plate 400. The structure in FIG. 4 can be seen to have been formed in three steps (top to down) in a manufacturing process of antenna system by means of, for instance, a stamping process.

The top part of FIG. 4 shows the plate 400 occupying (and extending beyond) the antenna rectangle 351 (represented as a dash-dot line). The cut out lines that delimit those parts of the conducting plate 400 that will be removed are depicted as dashed lines. A peripheral part of the plate 400 will be removed, as indicated by the outline 401. Additionally, two closed apertures will be created as defined by outline 402 and outline 403.

The middle part of FIG. 4 shows a planar structure 430 resulting after eliminating the parts of plate 400 that will not be used to create the antenna system. In the planar structure 430, two closed apertures 302 and 303, and an opening 304 can be identified.

The planar structure 430 has a first part 405, and a second part 406, that extend beyond the antenna rectangle 351. The first and second parts 405 and 406 are bent or folded so that their orthogonal projection does not extend outside the antenna rectangle 351.

The bottom part of FIG. 4 shows the antenna element 300 obtained from the planar structure 430. The antenna element 300 is a three-dimensional structure that fits within the antenna box 301 (also depicted as a dash-dot line). The first part of the planar structure 405 is bent 90 degrees downwards (in the direction indicated by arrow 431) to become part 305 of the antenna element 300. The second part of the planar structure 406 is folded twice to become part 306 of said antenna element 300. The second part 406 is rotated a first time 90 degrees downwards (as indicated by the arrow 432), and then at another point along the second part 406 rotated a second time 90 degrees leftwards (as indicated by the arrow 433).

Referring now to FIG. 5A-B there is shown a MFWD 500 consisting of a single body being typically held by a right-handed user to originate a phone call while facing a display 501 of the MFWD 500. The MFWD 500 comprises an antenna system and a PCB that includes a layer that serves as a ground plane of the antenna system 502 (depicted in dashed line). The antenna system is arranged inside an antenna box, whose antenna rectangle 503, 504 is depicted also in dashed line. The antenna rectangle 503, 504 is in the projection of the ground plane layer 502. In the case of FIG. 5A, the antenna rectangle 503 is placed substantially in the top part of the body of the MFWD 500 (i.e., above and/or behind a display 501), while in FIG. 5B the antenna rectangle 504 is placed substantially in the bottom part of the body of the MFWD 500 (i.e., below and/or behind a keypad).

For reasons of ergonomics, it is advantageous in the examples of FIG. 5 to select a corner of the antenna rectangle close to the left edge of the MFWD 500. The upper left corner of the antenna rectangle 505 is selected as the feeding point corner in the case of FIG. 5A, while the lower left corner of the antenna rectangle 506 is selected as the feeding point corner in the case of FIG. 5B. In these two examples the corners designated as feeding point corners 505, 506 are also substantially close to a short edge of a ground plane rectangle (not depicted in FIG. 5) that encloses the ground plane layer 502.

Figure 5C:
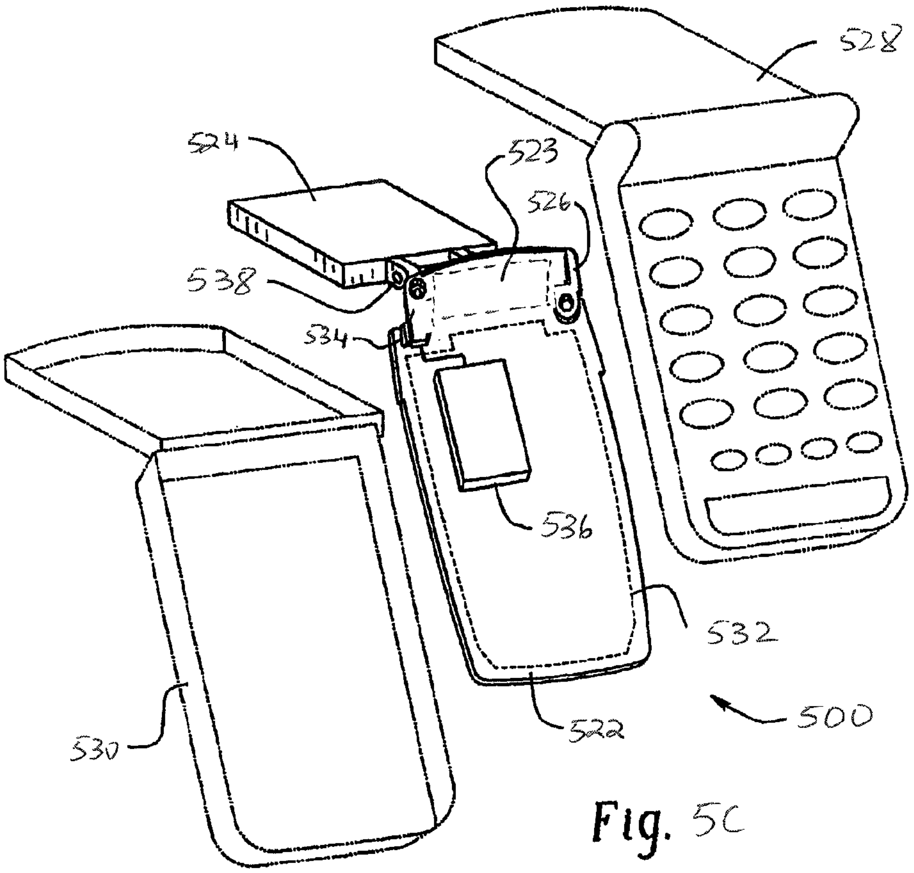

FIG. 5C illustrates an alternate embodiment of a MFWD 500 having a clamshell-type configuration. The MFWD 500 includes a lower circuit board 522, an upper circuit board 524, and an antenna system. The antenna system is arranged inside an antenna box, whose antenna rectangle 523 is depicted also in dashed line. The antenna rectangle 523 is secured to a mounting structure 526. FIG. 5C further illustrates an upper housing 528, a lower housing 530 that join to enclose the circuit boards 522, 524 and the antenna rectangle 523. The lower circuit board includes a ground plane 532, a feeding point 534, and communications circuitry 536. The antenna rectangle 523 is secured to a mounting structure 526 and coupled to the lower circuit board 522. The lower circuit board 522 is then connected to the upper circuit board 524 with a hinge 538, enabling the lower circuit board 522 and the upper circuit board 524 to be folded together in a manner typical for clamshell-type phones. In some embodiments, the hinge 538 may be adapted to provide rotation of the upper circuit board 524 with respect to the lower circuit board 522 around two or more, preferably non-parallel, axes of rotation, resulting in a MFWD 500 having a twist-type configuration. In order to reduce electromagnetic interference from the circuit boards 522, 524, the antenna rectangle 523 is preferably mounted on the lower circuit board 522 adjacent to the hinge 538.

Figure 6A:
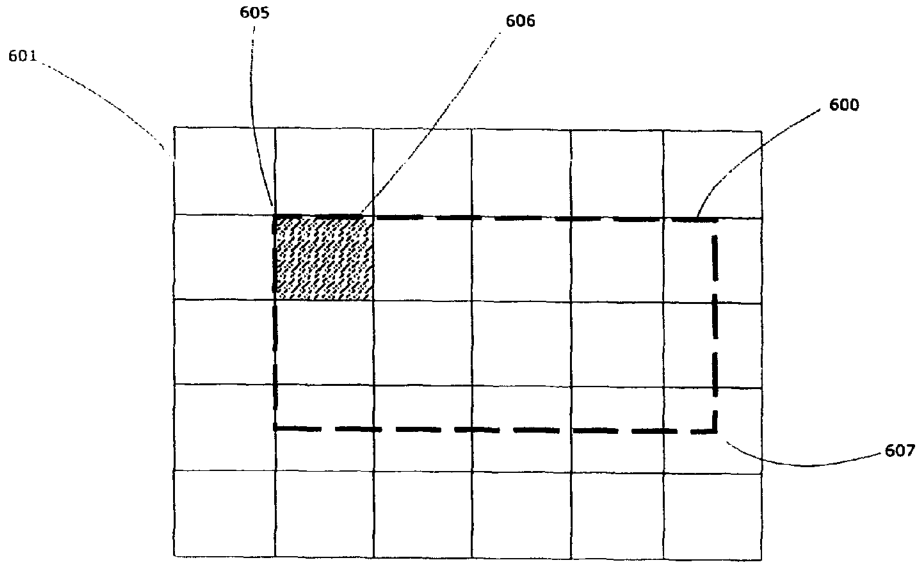
FIG. 6A shows an example of a first grid to compute the complexity factors of an antenna contour.
Figure 6B:
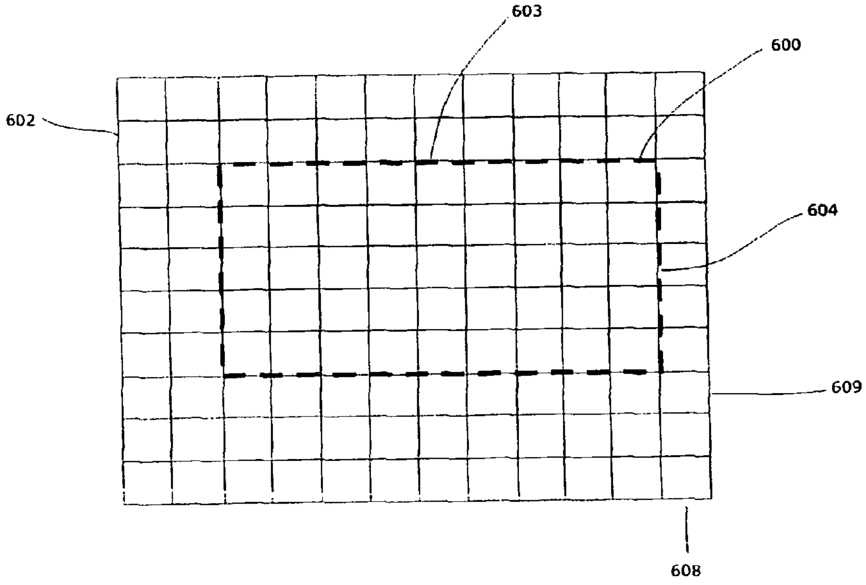
FIG. 6B shows an example of a second grid to compute the complexity factors of an antenna contour.

FIG. 6A-6C represents, respectively examples of a first grid 601, a second grid 602 and a third grid 603 used for the computation of the complexity factors $F_{21}$ and $F_{32}$ of an antenna contour that fits in an antenna rectangle 600. The antenna rectangle 600 has a long side 603 and a short side 604.

In FIG. 6B, the second grid 602 has been adjusted to the size of the antenna rectangle 600. The long side of the antenna rectangle 603 is fitted with nine (9) columns of cells of the second grid 602. As far as the number of rows is concerned, the aspect ratio of the antenna rectangle 600 in this particular example is such that a cell aspect ratio closest to one is obtained when the short side of the antenna rectangle 604 is fitted with five (5) rows of cells of the second grid. Therefore, the antenna rectangle 600 is perfectly tessellated with 9 by 5 cells of the second grid 602.

FIG. 6A shows a possible first grid 601 obtained from grouping 2-by-2 cells of the second grid 602. In this example, the upper left corner of the antenna rectangle 600 is selected as the feeding point corner 605. A first cell of the first grid 606 is placed such that the cell 606 has a corner designated as the feeding point corner 605 and is completely inside the antenna box 600. In the example of FIG. 6A, the antenna rectangle 600 spans five (5) columns and three (3) rows of cells of the first grid 601.

Since the antenna rectangle 600 is tessellated with an odd number of columns and rows of cells of the second grid. An additional column 608 and an additional row 609 of cells of the second grid 602 are necessary to have enough cells of the first grid 601 to completely cover the antenna rectangle 600. The additional column 608 and additional row 609 meet at the lower right corner of the antenna rectangle 607 (i.e., the corner opposite to the feeding point corner 605).

FIG. 6C shows the third grid 603 obtained from dividing each cell of the second grid 602 into four (4) cells. Each cell of the third grid 603 has a cell width and cell height equal a half of the cell width and cell height of a cell of the second grid 602. Thus, in this example the antenna rectangle 600 is perfectly tessellated with eighteen (18) columns and ten (10) rows of cells of the third grid 603.

Figure 7:
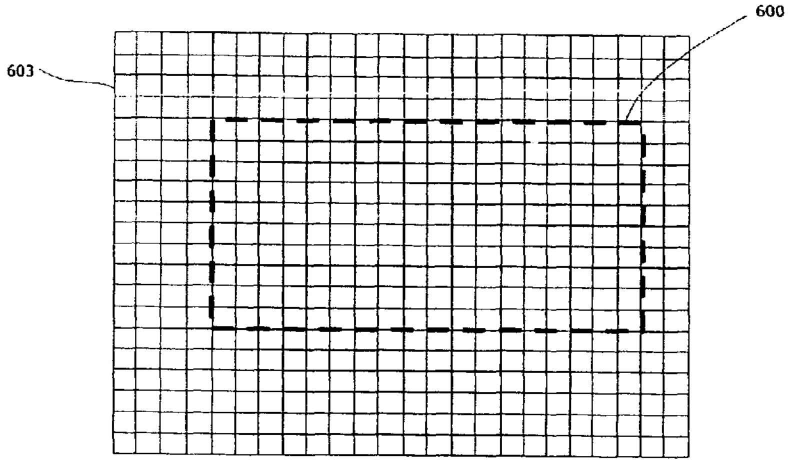
FIG. 7 shows the two-dimensional representation of the $F_{32}$ vs. $F_{21}$ space.
Figure 7:
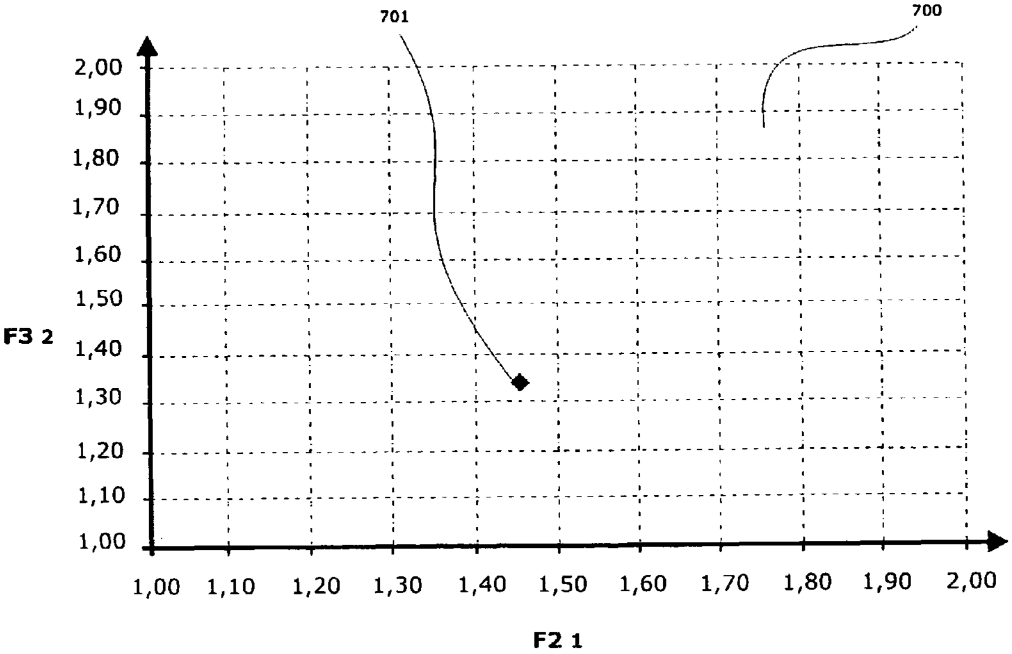

Referring now to FIG. 7 there is shown a graphical representation of the two-dimensional space 700 defined by the complexity factors $F_{21}$ and $F_{32}$ for an illustrative antenna (not shown). The antenna contour of the illustrative antenna system of a MFWD is represented as a bullet 701 of coordinates ($F_{21}$, $F_{32}$) in the two-dimensional space 700.

FIGS. 8A-8C provide examples to illustrate the complexity factors that feature two radically different antennas: (1) A solid planar rectangular antenna that occupies the entire area of an antenna rectangle 800 for a MFWD (not specifically shown); and (2) an antenna whose contour is inspired in a Hilbert curve 810 that fills the available space within the antenna rectangle 800 (the antenna structure shown in the rectangle 800 of each of FIGS. 8A-8C). These two antenna examples, although not advantageous to provide the multiple frequency band behavior required for the antenna system of a MFWD, help to show the relevance and characteristics of the two complexity factors $F_{21}$ and $F_{32}$.

FIGS. 8A-8C show antenna 810 inside the antenna rectangle 800 under a first grid 801, a second grid 802, and a third grid 803. In this example, the antenna rectangle 800 is perfectly tessellated with nine (9) columns and five (5) rows of cells of said second grid 802 (FIG. 8*b*). The antenna 810 has a feeding point 811, located substantially close to the lower left corner of the antenna rectangle 805 (being thus the feeding point corner).

In FIG. 8A, there are fifteen (15) cells of the first grid 801 at least partially inside the antenna rectangle 800 and that include at least a point of the antenna contour of antenna 810 (i.e., $N_1$=15). In FIG. 8B, there are forty-five (45) cells of the second grid 802 completely inside the antenna rectangle 800 and that include at least a point of the antenna contour of the antenna 810 (i.e., $N_2$=45). Finally in FIG. 8C, there are one hundred eighty (180) cells of the third grid 803 completely inside the antenna rectangle 800 and that include at least a point of the antenna contour of the antenna 810 (i.e., $N_3$=180). Therefore, in the present example, an antenna whose contour is inspired in the Hilbert curve 810 shown within the antenna space 800 of FIGS. 8A-8C features $F_{21}$=1.58 (i.e., smaller than 2.00) and $F_{32}$=2.00.

On the other hand if the process of counting the cells in each of the three grids is repeated for a planar rectangular antenna whose contour fills the entire rectangular space of the antenna rectangle 800 (not actually shown) then $N_1$=12, $N_2$=24 and $N_3$=52, which results in $F_{21}$=1.00 and $F_{32}$=1.12 (i.e., larger than 1.00).

These results illustrate that complexity factor $F_{21}$ is geared more towards discerning if the antenna contour of a particular antenna system distinguishes sufficiently from a simple planar rectangular antenna rather than capturing the complete intricacy of said antenna contour, while complexity factor $F_{32}$ is predominantly directed towards capturing whether the degree of complexity of the antenna contour approaches to that of a highly-convoluted curve such as a Hilbert curve.

FIGS. 9A-9C and 10A-10C provide two examples illustrating the complexity factors that characterize a quasi-rectangular antenna 910 having a highly convoluted perimeter and a triple branch antenna 1010, respectively. These two exemplary antennas help to show the relevance of the two complexity factors.

Figure 9A:
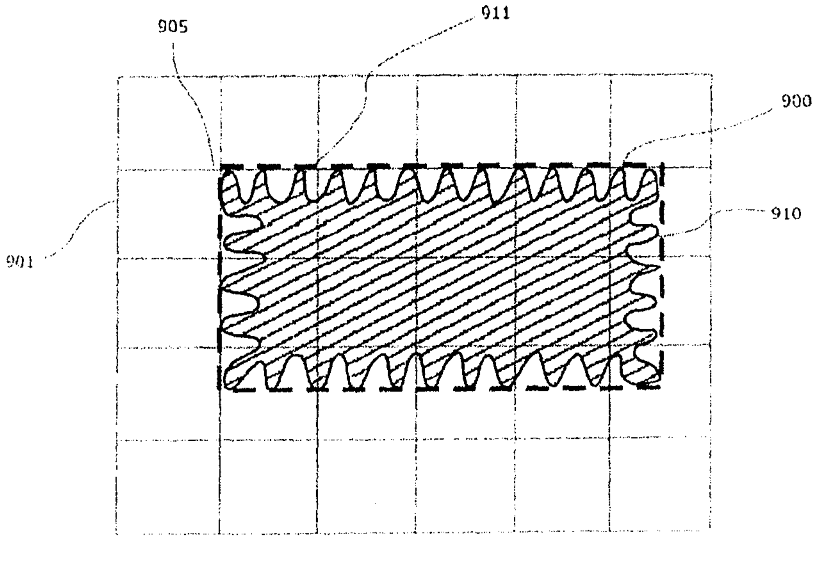
FIG. 9A shows an example of a quasi-rectangular antenna contour featuring a great degree of convolution in its perimeter under a first grid to compute the complexity factors of said antenna contour.
Figure 9B:
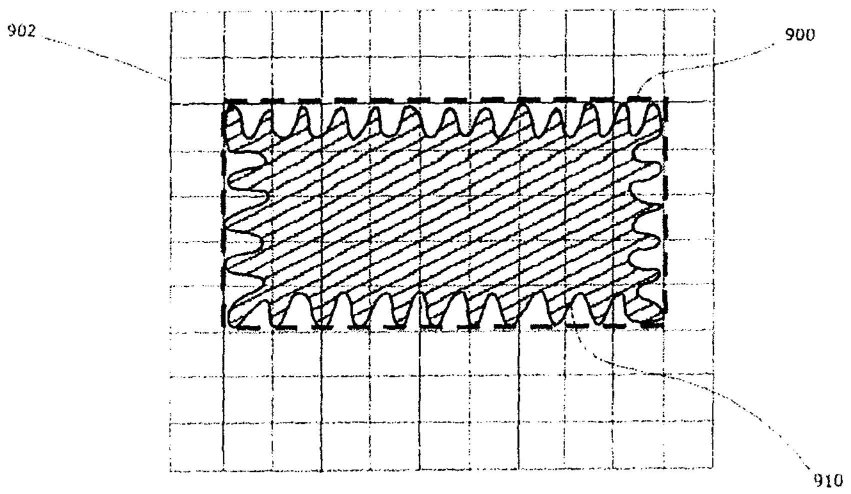
FIG. 9B shows the example of the quasi-rectangular antenna contour featuring a great degree of convolution of FIG. 9*a* under a second grid to compute the complexity factors of said antenna contour.
Figure 9C:
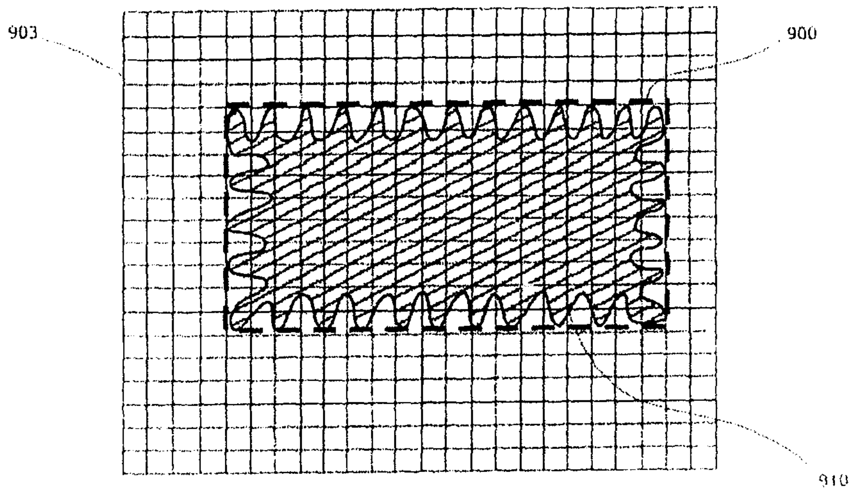
FIG. 9C shows the example of the quasi-rectangular antenna contour featuring a great degree of convolution of FIG. 9*a* under a third grid to compute the complexity factors of said antenna contour.

FIGS. 9A-9C show, respectively, the antenna 910 inside an antenna rectangle 900 under a first grid 901, a second grid 902, and a third grid 903. In this example, the antenna rectangle 900 is perfectly tessellated with nine (9) columns and five (5) rows of cells of said second grid 902 (FIG. 9*b*). The antenna 910 has a feeding point 911, located substantially close to the upper left corner of the antenna rectangle 905 (being thus the feeding point corner).

In FIG. 9A, there are twelve (12) cells of the first grid 901 at least partially inside the antenna rectangle 900 and that include at least a point of the antenna contour of antenna 910 (i.e., $N_1$=12). In FIG. 9B, there are twenty-four (24) cells of the second grid 902 completely inside the antenna rectangle 900 and that include at least a point of the antenna contour of the antenna 910 (i.e., $N_2$=24). Finally in FIG. 9C, there are ninety-six (96) cells of the third grid 903 completely inside the antenna rectangle 900 and that include at least a point of the antenna contour of the antenna 910 (i.e., $N_3$=96). Therefore, in the present example, a quasi-rectangular antenna 910 having a highly convoluted perimeter features $F_{21}$=1.00 and $F_{32}$=2.00. This antenna example appears on a coarse scale (as probed e.g. by a long wavelength resonance) quite similar to a simple planar rectangular antenna which is also shown by $F_{21}$ being very low. On the other hand the edge is highly convoluted which will have influence on small wavelength resonances. This feature is characterized by a high value of $F_{32}$.

Figure 10A:
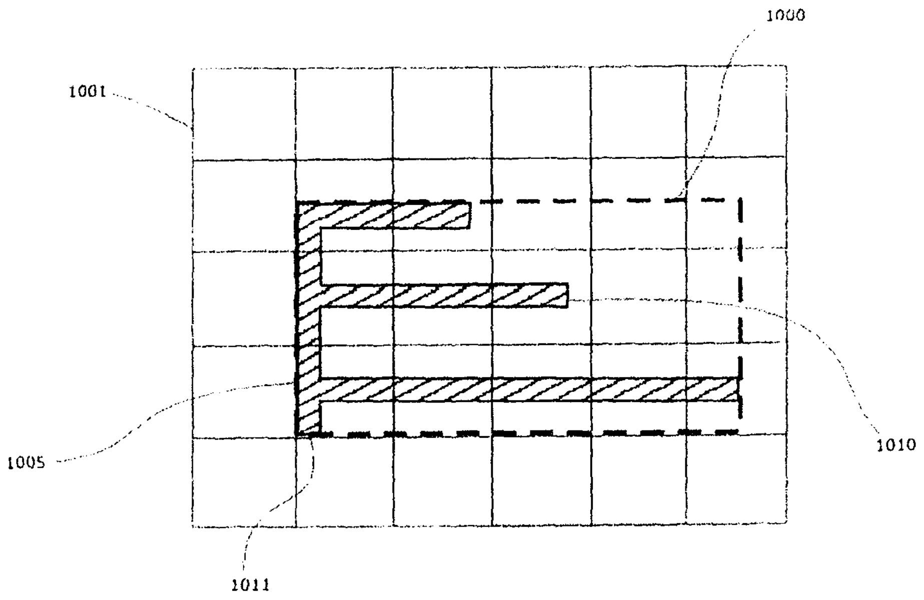
FIG. 10A shows an example of a triple branch antenna contour under a first grid to compute the complexity factors of said antenna contour.
Figure 10B:
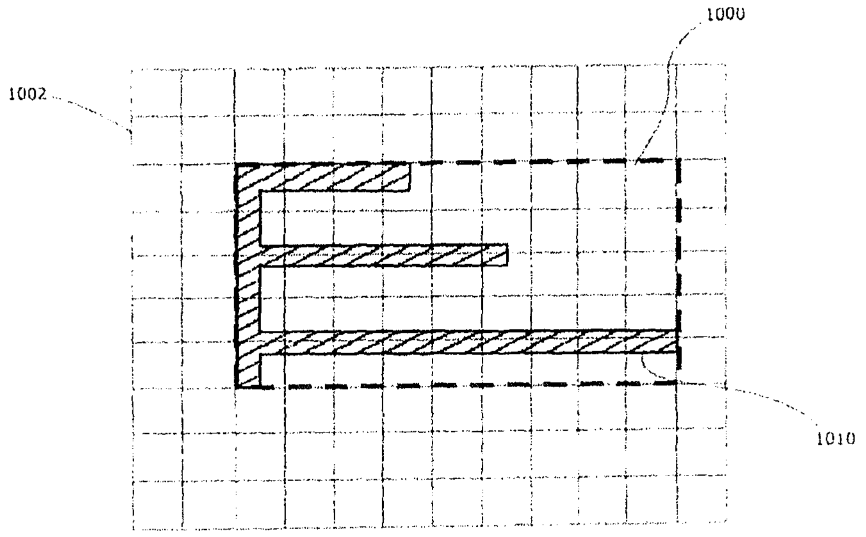
FIG. 10B shows the example of the triple branch antenna contour of FIG. 10*a* under a second grid to compute the complexity factors of said antenna contour.
Figure 10C:
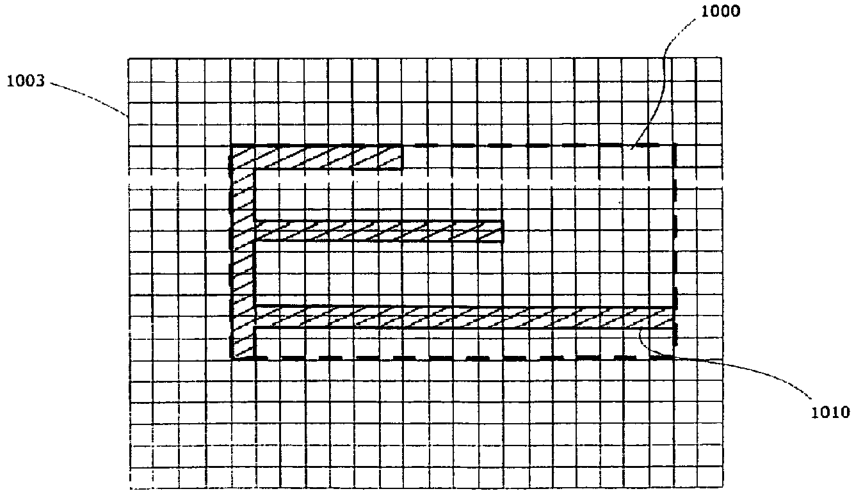
FIG. 10C shows the example of the triple branch antenna contour of FIG. 10*a* under a third grid to compute the complexity factors of said antenna contour.

FIGS. 10A-C show, respectively, antenna 1010 inside the antenna rectangle 1000 under a first grid 1001, a second grid 1002, and a third grid 1003. In this example, the antenna rectangle 1000 is perfectly tessellated with nine (9) columns and five (5) rows of cells of said second grid 1002 (FIG. 10*b*). The antenna 1010 has a feeding point 1011, located substantially close to the bottom left corner of the antenna rectangle 1005 (being thus the feeding point corner).

As for the antenna 1010 as shown in FIG. 10A, there are ten (10) cells of the first grid 1001 at least partially inside the antenna rectangle 1000 and that include at least a point of the antenna contour of antenna 1010 (i.e., $N_1$=10). In FIG. 10B, there are thirty-four (34) cells of the second grid 1002 completely inside the antenna rectangle 1000 and that include at least a point of the antenna contour of the antenna 1010 (i.e., $N_2$=34). Finally in FIG. 10C, there are seventy (70) cells of the third grid 1003 completely inside the antenna rectangle 1000 and that include at least a point of the antenna contour of the antenna 1010 (i.e., $N_3$=70). Therefore, in the present example, a triple branch antenna, similar to an asymmetric fork, features $F_{21}$=1.77 and $F_{32}$=1.04. In this fork example the antenna is not miniaturized since the three branches are essentially straight. This configuration corresponds to a low value of $F_{32}$. The fork, however is substantially different from a rectangle in that the three branches can be identified clearly and performance of the calculations in accordance with the principles of the invention yields a high value of $F_{21}$.

Figure 11:
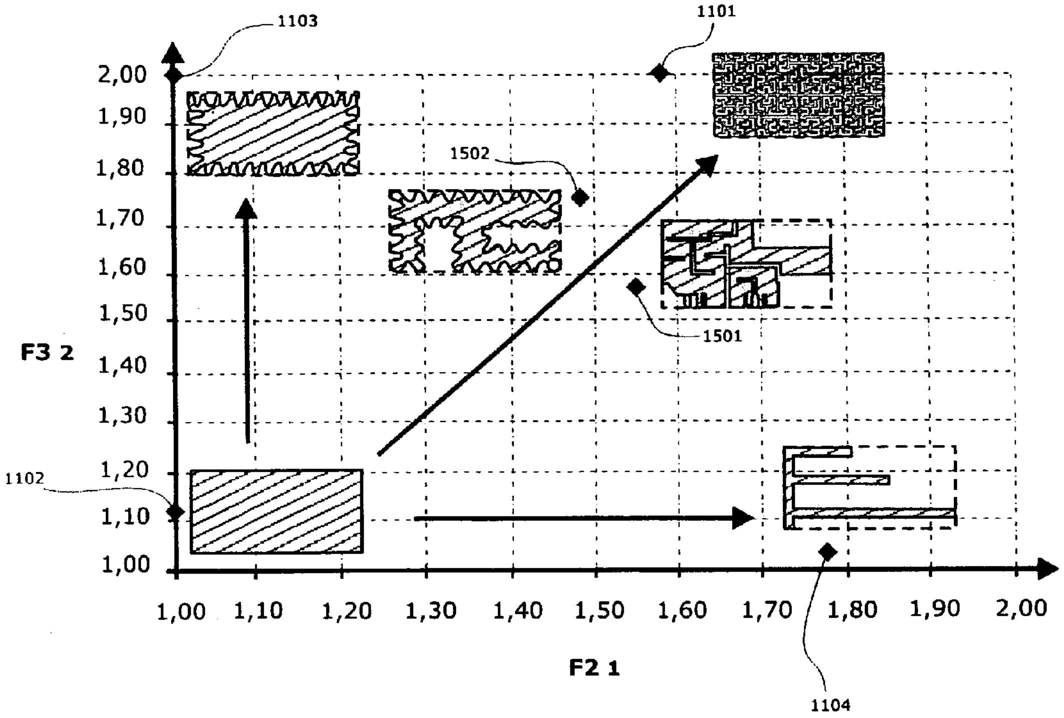
FIG. 11 shows the mapping of the antenna contour of FIGS. 6, 8, 9 and 10 in the $F_{32}$ vs. $F_{21}$ space.

FIG. 11 is a graphical presentation that maps the values of the complexity factors $F_{21}$ and $F_{32}$ of the exemplary antennas of FIGS. 6, 8, 9, and 10. In FIG. 11 the horizontal axis represents increasing values of $F_{21}$ while the vertical axis represents increasing values of $F_{32}$. The exemplary simple planar, rectangular antenna discussed above in connection with FIG. 6, occupies the entire area of an antenna rectangle 800 and is characterized by a pair of complexity factors $F_{21}$=1.00 and $F_{32}$=1112 that are mapped as bullet 1102 in FIG. 11. The complexity factors for the antenna whose contour is discussed above in connection with FIG. 8, and that is inspired in a Hilbert curve 810 are $F_{21}$=1.58 and $F_{32}$=2.00 and is mapped onto FIG. 11 as bullet 1101. The quasi-rectangular antenna, discussed above in connection with FIG. 9, and having a highly convoluted perimeter of 910 is characterized by complexity factors $F_{21}$=1.00 and $F_{32}$=2.00 and is mapped onto FIG. 11 as bullet 1103. Bullet 1104 represents the pair of complexity factors $F_{21}$=1.77 and $F_{32}$=1.04 for the exemplary triple branch antenna 1010 discussed above in connection with FIG. 10. These antenna examples help to show the value and antenna characteristics represented by the two complexity factors. $F_{21}$ and $F_{32}$ Further, FIG. 11 and the bullets 1001-1004 illustrate how a two dimensional graphical space 700 might be used for antenna system design.

Referring to FIG. 11 and the bullet 1102 in connection with the configuration and performance characteristics of the sample planar rectangular antenna of FIG. 6 it can be seen that such an antenna has a relatively low level of complexity on both a gross as well as a finer level of detail. Thus, while the antenna is relatively large and resonant at a relatively low frequency, it is less likely to provide multiple frequencies of resonance for multiband performance. As one moves up along the vertical axis toward bullet 1103 in connection with the configuration and performance characteristics of the generally rectangular antenna with a convoluted space-filling perimeter of FIG. 9, it can be seen that while the complexity of the antenna remains low at a gross level of detail, the complexity increases at a finer level of detail. This, in turn, enhances the miniaturization of the antenna to some degree and causes the antenna to resonate at lower harmonic frequencies and behave as a larger antenna than it actually is even though this may not be enough of a change to render the antenna suitable for successful use.

If one now moves from the origin of the graph of FIG. 11 along the horizontal axis toward bullet 1104 in connection with the configuration and performance characteristics of the forked antenna of FIG. 10 we see that the antenna has a relatively high level of complexity on a gross level of detail but a low level of complexity at a finer level of detail. These characteristics tend to enrich the frequency of resonance and, thus, its, multiband capabilities as well as, in some respects, its miniaturization. Finally, in moving toward bullet 1101 of FIG. 11 in connection with the configuration and performance characteristics of the antenna discussed above in connection with FIG. 8, we see that the antenna is highly complex on both gross and fine levels of detail. This produces an antenna with a high degree of miniaturization which tends to penalize the bandwidth of the antenna and render it less than ideal for antenna performance.

An antenna designer can see that the complexity factors $F_{21}$ and $F_{32}$, as represented and characterized by the antennas on FIGS. 6, 8, 9 and 10 and the illustrated graph of FIG. 11 are very useful tools for modern antenna design for MFWD and similar devices. Use of these tools in accordance with the invention yields antenna designs, as well as MFWD devices having antennas, with enhanced performance characteristics.

Figure 12A:
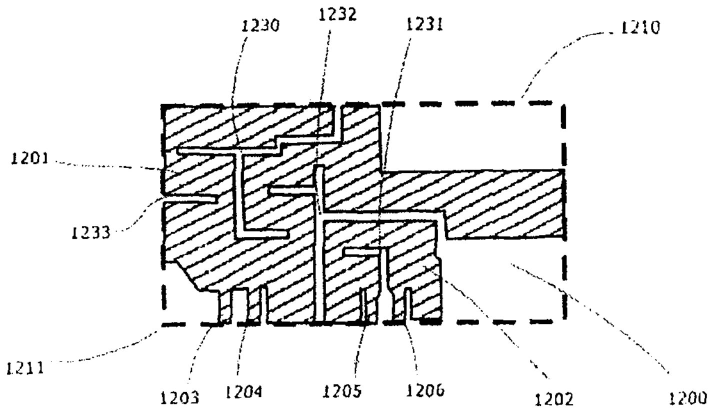
FIG. 12A shows an example of antenna contour of the antenna system of a MFWD according to the present invention.

FIG. 12A shows a top-plan view of one illustrated embodiment of the structure 1200 of an antenna system for a MFWD according to the present invention. The antenna rectangle 1210 is depicted as a dashed line. The structure 1200 has been shaped to attain the desired multiple frequency band operation as well as desired RF performance. In particular, peripheral parts of a substantially flat conducting plate have been removed, and slots 1230-1233 have been created within the structure 1200. Slot 1232 divides the structure 1200 into two antenna elements 1201 and 1202. Antenna element 1201 and antenna element 1202 are not in direct contact, although the two antenna elements 1201 and 1202 are in contact through the ground plane of the MFWD.

The resulting structure 1200 supports different radiation modes so as to operate in accordance with two mobile communication standards: GSM and UMTS. More specifically it operates in accordance with the GSM standard in the 900 MHz band (completely within the 810 MHz-960 MHz region of the spectrum), in the 1800 MHz band (completely within the 1710 MHz-1990 MHz region of the spectrum), and in the 1900 MHz band (also completely within the 1710 MHz-1990 MHz region of the spectrum). The UMTS standard makes use of a band completely within the 1900 MHz-2170 MHz region of the radio spectrum. Therefore, the antenna system operates in four (4) separate frequency bands within three (3) separate regions of the electromagnetic spectrum.

In the example of FIG. 12A, the MFWD comprises four (4) contact terminals to couple the structure of said antenna system 1200 with feeding means and grounding means included on a PCB of said MFWD. In FIG. 12A, the antenna element 1201 includes a feeding point 1204 and a grounding point 1203, while the antenna element 1202 includes another feeding point 1205 and a grounding point 1206.

The feeding point 1204 is responsible for the operation of the antenna system in its lowest frequency band (i.e., in accordance with the 900 MHz band of the GSM standard). Therefore, the lower left corner of the antenna rectangle 1211 is chosen to be the feeding point corner.

Figure 12B:
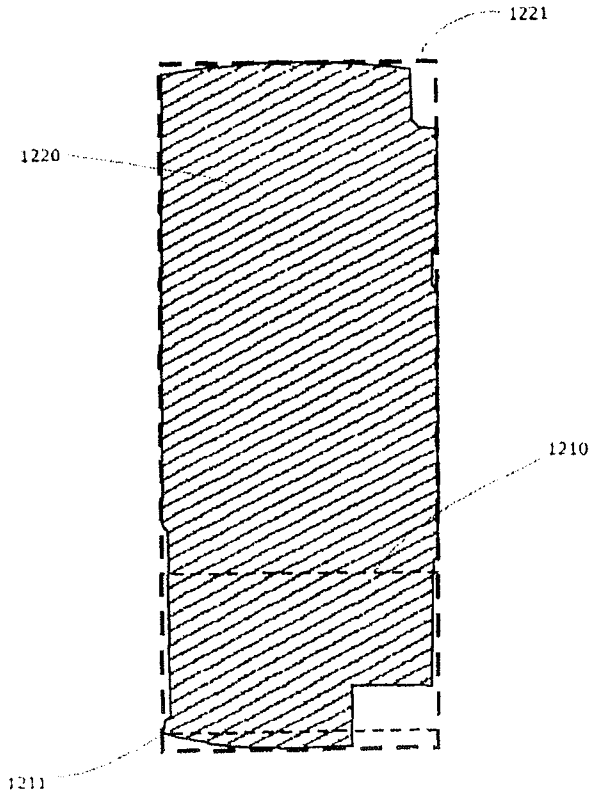
FIG. 12B shows an example of a PCB of a MFWD including a layer that serves as the ground plane to the antenna system of FIG. 12*a;*

FIG. 12B shows the position of the antenna rectangle relative to the PCB that includes the layer 1220 that serves as a ground plane of the antenna system. The layer 1220 is confined in a minimum-sized rectangle 1221 (depicted in dash-dot line), defining the ground plane rectangle for the MFWD. In this example, the antenna rectangle 1210 is placed substantially in the bottom part of the PCB of said MFWD. Moreover, the antenna rectangle 1210 is substantially parallel to the ground plane rectangle 1221. The antenna rectangle 1210 in this example is completely located in the projection of the ground plane rectangle 1221; however, the antenna rectangle 1210 is not completely on the projection of the ground plane layer 1220 that serves as a ground plane.

A long side of the antenna rectangle 1210 is substantially parallel to a short edge of the ground plane rectangle. The feeding corner 1211 is near a corner of the ground plane rectangle, providing advantageously a longer path to the electric and/or equivalent magnetic currents flowing on the ground plane layer 1220 to potentially enhance the RF performance of the antenna system or the RF performance of the MFWD in at least a lowest frequency band.

The antenna contour of the structure of antenna system 1200 of the example in FIG. 12A is formed by the combination of two disjoint subsets of segments. A first subset is given by the perimeter of the antenna element 1201 and comprises forty-eight (48) segments. A second subset is given by the perimeter of the antenna element 1202 and comprises twenty-six (26) segments. Additionally, all these segments are shorter than at least one tenth of a free-space wavelength corresponding to the lowest frequency band of operation of said antenna system.

Moreover, the length of the antenna contour of the structure 1200 is more than six (6) times larger than the length of a diagonal of the antenna rectangle 1210 in which said antenna contour is confined.

Figure 13A:
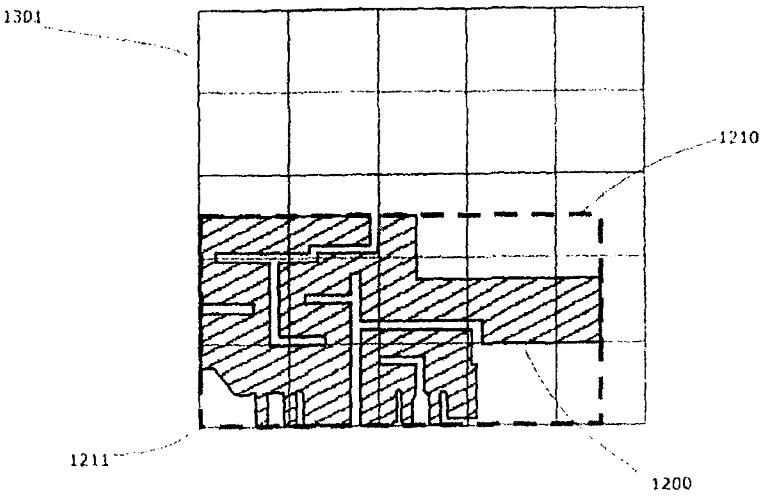
FIG. 13A shows the antenna contour of FIG. 12*a* placed under a first grid to compute the complexity factors of said antenna contour.
Figure 13B:
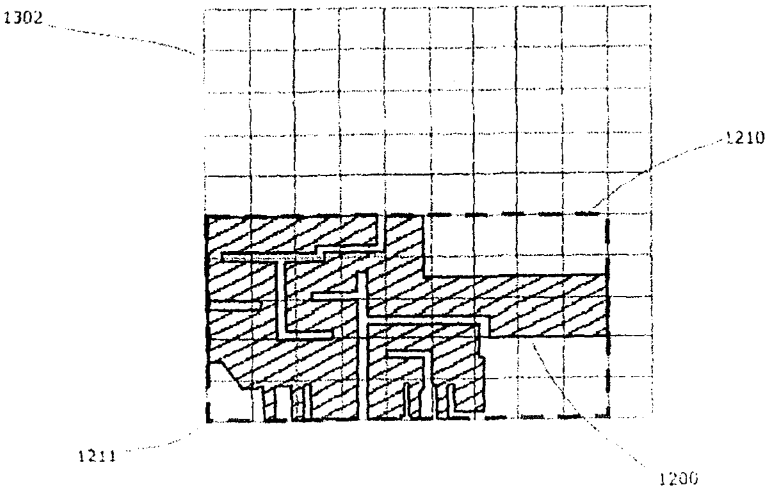
FIG. 13B shows the antenna contour of FIG. 12*a* placed under a second grid to compute the complexity factors of said antenna contour.

In FIGS. 13A-13B, the antenna contour of the structure of the antenna system 1200 is placed under a first grid 1301, a second grid 1302, and a third grid 1303 for the computation of the complexity factors of said structure 1200.

The antenna rectangle 1210 has been fitted with nine (9) columns and five (5) rows of cells of said second grid 1302 (in FIG. 13B), as the aspect ratio of the antenna rectangle 1210 is such that fitting five (5) rows of cells in the short side of the antenna rectangle 1210 produces a cell of the second grid 1302 with an aspect ratio closest to one.

In FIG. 13A, there are thirteen (13) cells of the first grid 1301 that, while being at least partially inside the antenna rectangle 1210 and including at least a point of the antenna contour of the structure 1200 (i.e., $N_1=13$).

In FIG. 13B, there are thirty-eight (38) cells of the second grid 1302 completely inside the antenna rectangle 1210 and that include at least a point of the antenna contour of the structure 1200 (i.e., $N_2=38$).

Figure 13C:
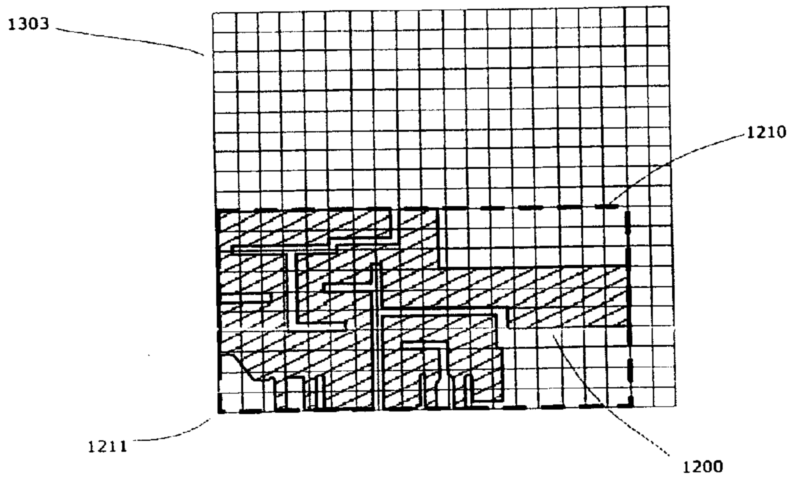
FIG. 13C shows the antenna contour of FIG. 12*a* placed under a third grid to compute the complexity factors of said antenna contour.

Finally in FIG. 13C, there are one hundred and fourteen (114) cells of the third grid 1303 completely inside the antenna rectangle 1210 and that include at least a point of the antenna contour of the structure 1200 (i.e., $N_3=114$).

The complexity factor $F_{21}$ for the antenna shown in FIGS. 12A, 13A and 13B is computed as $$F_{21} = -\frac{\log(38) - \log(13)}{\log(1/2)} = 1.55$$

while the complexity factor $F_{32}$ is obtained as $$F_{32} = -\frac{\log(114) - \log(38)}{\log(1/2)} = 1.58$$

Therefore, the exemplary structure of antenna system for a MFWD 1200 shown in 12A, 13A and 13B is characterized advantageously by complexity factors $F_{21}=1.55$ and $F_{32}=1.58$.

Figure 14A:
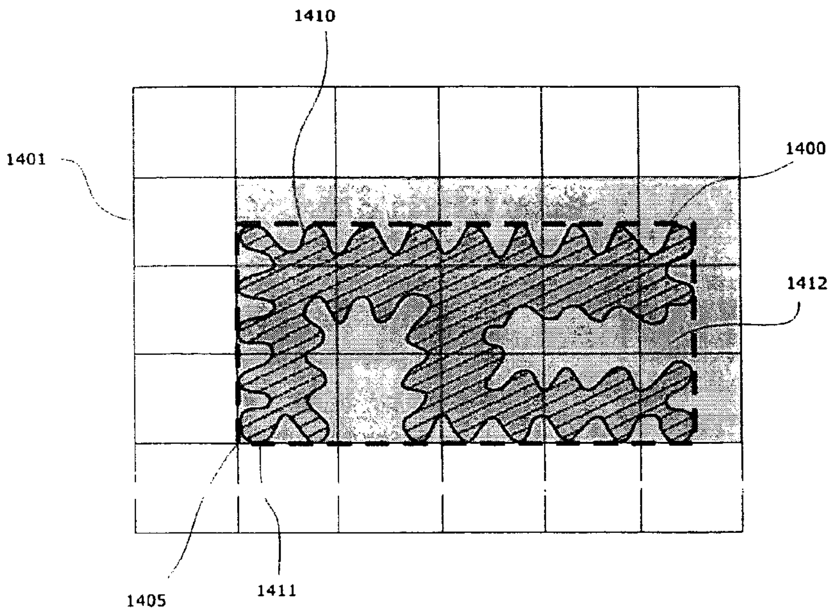
FIG. 14A shows an antenna contour according to the present invention placed under a first grid to compute the complexity factors of said antenna contour.
Figure 14B:
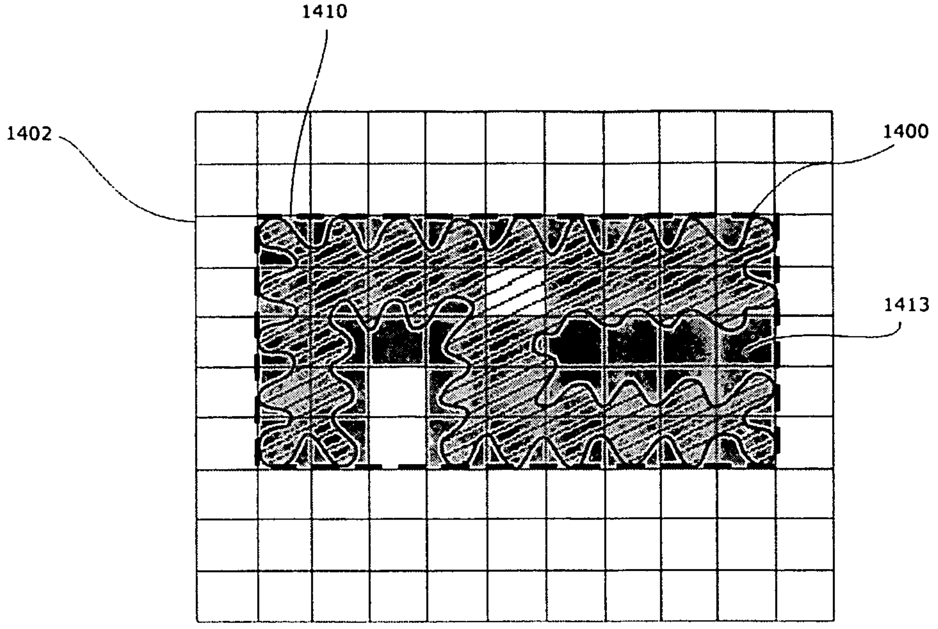
FIG. 14B shows the antenna contour according to the present invention of FIG. 14*a* placed under a second grid to compute the complexity factors of said antenna contour.
Figure 14C:
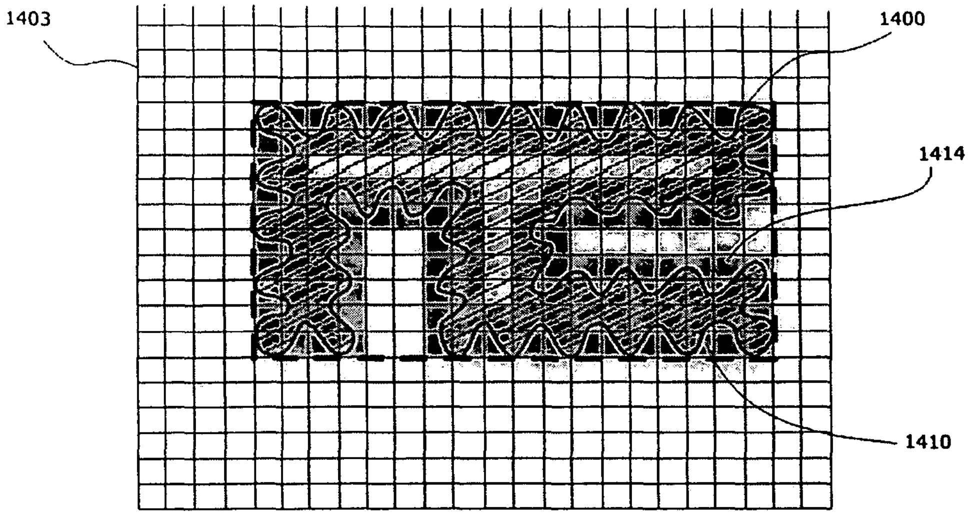
FIG. 14C shows the antenna contour according to the present invention of FIG. 14*a* placed under a third grid to compute the complexity factors of said antenna contour.

FIGS. 14A-14C show, respectively, another exemplary antenna 1410 inside the antenna rectangle 1400 under a first grid 1401, a second grid 1402, and a third grid 1403 for the computation of the complexity factors of the antenna 1410. In this example, the antenna rectangle 1400 may be tessellated with nine (9) columns and five (5) rows of cells of the second grid 1402 (FIG. 14B) as well as with nine (9) columns and seven (7) rows of cells of said second grid (not depicted) since in both cases the aspect ratio is at its closest to one. A second grid 1402 with nine (9) columns and five (5) rows of cells has been selected since the aspect ratio for grid 1402 is bigger than 1. The antenna 1410 has a feeding point 1411, located substantially close to the bottom left corner of the antenna rectangle 1405 (being thus the feeding point corner).

In FIG. 14A, there are fifteen (15) cells of the first grid 1401 that, while being at least partially inside the antenna rectangle 1400 and that include at least a point of the antenna contour 1410 (i.e., $N_1=15$). It should be noted that the cells have been shaded forming the group of cells 1412 to add clarity to the discussion contained herein.

In FIG. 14B, there are forty-two (42) cells of the second grid 1402 completely inside the antenna rectangle 1400 and that include at least a point of the antenna contour 1410 (i.e., $N_2=42$). These cells are shaded forming the group of cells 1413 for clarity as set forth above.

Finally in FIG. 14C, there are one hundred and forty-two (142) cells of the third grid 1403 completely inside the antenna rectangle 1400 and that include at least a point of the antenna contour of the structure 1410 (i.e., $N_3=142$). These cells are shaded forming the group of cells 1414 for clarity as set forth above.

The complexity factor $F_{21}$ is for the antenna shown in FIGS. 14A-14C computed as $$F_{21} = -\frac{\log(42) - \log(15)}{\log(1/2)} = 1.49$$

while the complexity factor $F_{32}$ is obtained as $$F_{32} = -\frac{\log(142) - \log(42)}{\log(1/2)} = 1.76$$

Therefore, the example antenna 1410 for a MFWD features advantageously complexity factors $F_{21}=1.49$ and $F_{32}=1.76$.

Figure 15:
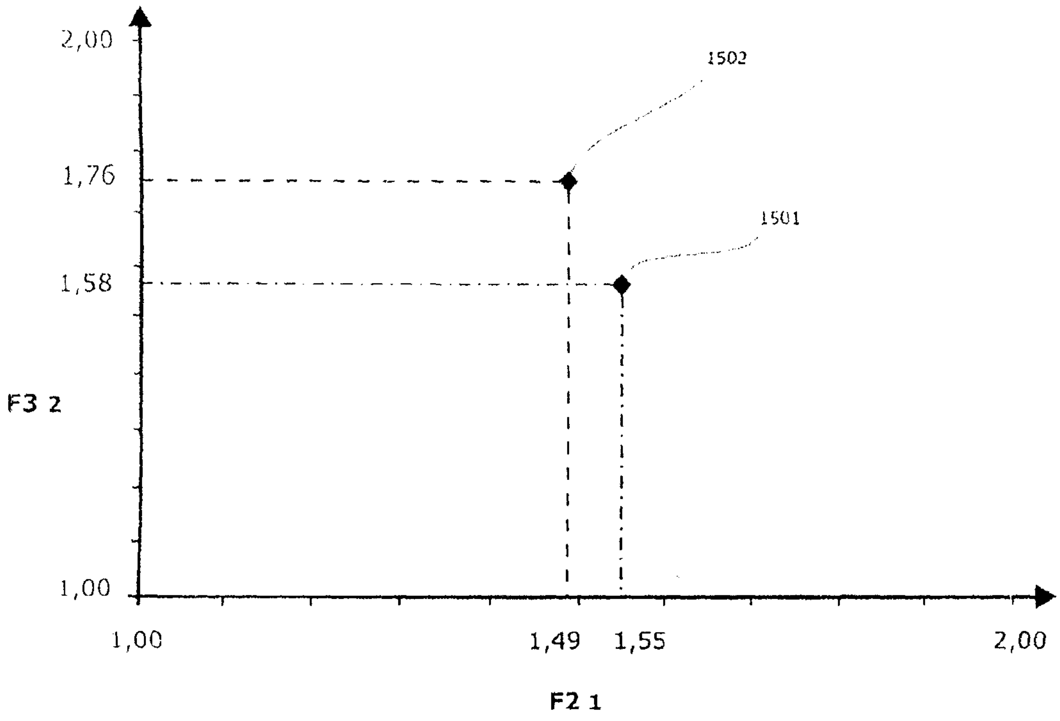
FIG. 15 shows the mapping of the antenna contour of FIGS. 12 and 14 in the $F_{32}$ vs. $F_{21}$ space.

The antenna complexity contour of the antenna structure 1200, FIGS. 12A, 13A and 13B is mapped in the graphical representation of FIG. 15 as a bullet 1501 with coordinates ($F_{21}=1.55$ or $F_{32}=1.58$). The antenna 1410 of FIGS. 14A-14C is mapped on the graph of FIG. 15 as a bullet 1502 with coordinates ($F_{21}=1.49$ or $F_{32}=1.76$). Those two examples show cases where intermediate values of $F_{21}$ and $F_{32}$ are used. For intermediate values the value of $F_{21}$ of the structure 1200 is relatively high and in case of the structure 1400 the value of $F_{32}$ is relatively high.

Referring now to FIGS. 16-19, there is shown one example of optimizing the geometry of an antenna system to obtain a superior performance for MFWDs. In that sense, complexity factors $F_{21}$ and $F_{32}$, as described above, are useful in guiding the optimization process of the structure of an antenna system to reach a target region of the (F21, F32) plane, as it is depicted in the flowchart 1600 in FIG. 16.

In one embodiment, the process to design an antenna system starts with a set of specifications 1601. A set of specifications includes a list of heterogeneous requirements that relate to mechanical and/or functional aspects of said antenna system. A typical set of specifications may comprise:

- Dimensional information of the MFWD, and more particularly of the space available within the MFWD for the integration of an antenna system (data necessary to define the antenna box and the antenna rectangle) and of the ground-plane of the MFWD (data necessary to define the ground plane rectangle).
- Communication standards operated by the MFWD, and some requirements on RF performance of the antenna system (such as for example, and without limitation, input impedance level, impedance bandwidth, gain, efficiency, and/or radiation pattern) and/or RF performance of the MFWD (such as for example, and without limitation, radiated power, received power and/or sensitivity).
- Information on the functionality envisioned for a given MFWD (i.e., MMT, SMRT, or both), number of bodies the MFWD comprises (for instance whether the MFWD features a bar, clamshell, flip, slider or twist structure), and presence of other electronic modules and/or subsystems in the vicinity of the antenna box, or even (at least partially) within the antenna box.

As described above, an aspect of the present invention is the relation between functional properties of an antenna system of a MFWD and the geometry of the structure of the antenna system. According to the present invention, a set of specifications for an antenna system can be translated into a certain level of geometrical complexity of the antenna contour associated to the structure of said antenna system, which is advantageously parameterized by means of factors $F_{21}$ and $F_{32}$ described above.

Therefore, once a set of specifications has been compiled, one embodiment of the design method of the present invention translates the set of specifications into a target region of the ($F_{21}$, $F_{32}$) plane 1602. In some examples, the target region is defined by a minimum and/or a maximum value of factor $F_{21}$ (denoted by $F_{21}^{min}$ and $F_{21}^{max}$ in FIG. 16), and/or a minimum and/or a maximum value of factor $F_{32}$ (denoted by $F_{21}^{min}$ $F_{21}^{max}$ in FIG. 16).

It will then be advantageous in order to benefit from a superior RF performance of the antenna system and/or a superior RF performance of the MFWD to shape the structure of the antenna system so that its antenna contour features complexity factors within the target region of the ($F_{21}$, $F_{32}$) plane.

Starting from an initial structure of an antenna system 1603, whose antenna contour features complexity factors $F_{21}^{0}$ and $F_{32}^{0}$), most likely outside the target region of the ($F_{21}$, $F_{32}$) plane, an antenna system designer may need to gradually modify the structure of antenna system 1605 (such as, for instance, creating slots, apertures and/or openings within said structure; or bending and/or folding said structure) to adjust the complexity factors of its antenna contour. This process can be performed in an iterative way, verifying after each step whether factors $F_{21}^{1}$ and $F_{31}^{2}$ are within the target region of the ($F_{21}$, $F_{32}$) plane 1604. Depending on the current values of the complexity factors after step "i" of this iterative process, an antenna system designer can apply changes to the structure of the antenna system at step "i+1" to correct the value of one, or both, complexity factors in a particular direction of the ($F_{21}$, $F_{32}$) plane.

Figure 16:
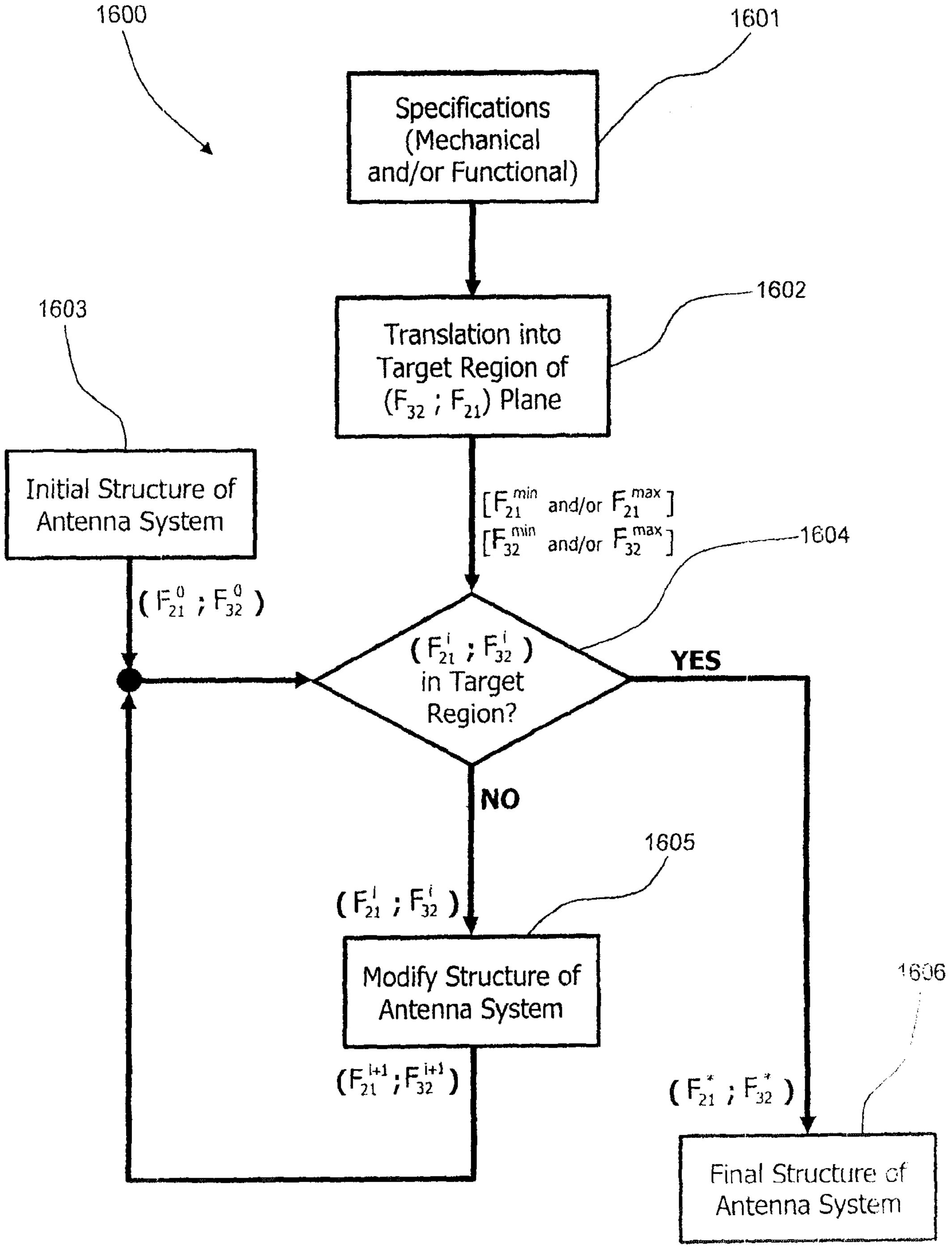
FIG. 16 illustrates a flow diagram for optimizing the geometry of an antenna system to obtain superior performance within a wireless device.

The design process ends 1606 when a structure of the antenna system has an antenna contour featuring complexity factors within the target region of the ($F_{21}$, $F_{32}$) plane (denoted by $F_{21}$* and $F_{32}$* in FIG. 16).

In further illustration of the above, an example of designing an antenna system of a MFWD can be illustrated by reference to one process to obtain the antenna system of FIG. 12*a*.

In this particular example, the MFWD is intended to provide advanced functionality typical of a MMT device and/or a SMRT device. The MFWD must operate two mobile communication standards: GSM and UMTS. More specifically it operates the GSM standard in the 900 MHz band (completely within the 810 MHz-960 MHz region of the spectrum), in the 1800 MHz band (completely within the 1710 MHz 1990 MHz region of the spectrum), and in the 1900 MHz band (also completely within the 1710 MHz-1990 MHz region of the spectrum). The UMTS standard makes use of a band completely within the 1900 MHz-2170 MHz region of the spectrum. The MFWD comprises one RF transceiver to operate each mobile communication standard (i.e., two RF transceivers).

The MFWD has a bar-type form factor, comprising a single PCB. The PCB includes a ground plane layer 1220, whose shape is depicted in FIG. 12B. The antenna system is to be integrated in the bottom part of the PCB, such integration being complicated by the presence of a bus connector and a microphone module.

In this example the ground plane rectangle 1221 is approximately 100 mm×43 mm. The antenna rectangle 1210 has a long side approximately equal to the short side of the ground plane rectangle 1221, and a short side approximately equal to one fourth of the long side of the ground plane rectangle 1221. Also in this example, the space provided within the MFWD for the integration of said antenna system allows placing parts of the structure of the antenna system at a maximum distance of approximately 6 mm above the ground plane layer 1220.

Furthermore, there are additional functional requirements in terms of impedance, VSWR and efficiency levels in each frequency band, and requirements on the mechanical structure of the antenna system and materials to be used. These requirements are listed in Table 1 below.

TABLE 1

| | | TARGET | | | |
|---|---|---|---|---|---|
| Parameter | Condition | Minimum | Typical | Maximum | Unit |
| Impedance | | | 50 | | Ohm |
| Frequency Bands | GSM900 | 800 | | 960 | MHz |
| | GSM1800 | 1710 | | 1880 | |
| | GSM1900 | 1850 | | 1990 | |
| | UMTS | 1920 | | 2170 | |
| VSWR | GSM900 | | | 3.5:1 | |
| | GSM1800 | | | 3.0:1 | |
| | GSM1900 | | | 3.0:1 | |
| | UMTS | | | 2.5:1 | |
| Efficiency | GSM900 | 20 | | | % |
| | GSM1800 | 30 | | | |
| | GSM1900 | 30 | | | |
| | UMTS | 30 | | | |
| Antenna System Structure | Type | | Patch, PIFA, Monopole, IFA . . . | | |
| | | | | 3 | |
| | | | 2 | | |
| | | | | 3 | |
| Antenna System Materials | Radiator | | Bronze, brass, stainless steel, nickel-silver . . . (Thickness: 0.1, 0.15, 0.2, 0.3, 0.4, or 0.5 mm | | |
| | Plating | | Nickel, gold . . . (Thickness: between 0.1 and 10 microns) | | |
| | Carrier | | ABS, PC-ABS, POM, LCP | | |
| | Assembly | | Clips, screws, adhesive, heat-stakes . . . | | |

The PCB area required by other electronic modules carried by the MFWD makes it difficult to remove any additional portions of the ground plane layer 1220 underneath the antenna system. Since substantial overlapping of the antenna rectangle 1210 and the ground plane rectangle 1221 occurs, a patch antenna solution is preferred for the MFWD of this example.

In order to take full advantage of the dimensions of the ground plane layer 1220 to potentially enhance the RF performance of the antenna system or the RF performance of the MFWD in at least a lowest frequency band, a feeding point of the antenna system will be placed substantially close to the bottom left corner of the ground plane layer 1220, so that a longer path is offered to the electric and/or equivalent magnetic currents flowing on said ground plane layer 1220. Therefore, the bottom left corner of the antenna rectangle 1211 is selected to be the feeding corner.

The antenna rectangle 1210 is then fitted with nine (9) columns and five (5) rows of cells of a second grid 1302 (in FIG. 13B), as the aspect ratio of the antenna rectangle 1210 is such that fitting five (5) rows of cells in the short side of the antenna rectangle 1210 produces a cell of the second grid 1302 with an aspect ratio closest to one.

Once a set of mechanical and/or functional specifications has been compiled, they are translated into a level of geometrical complexity that the antenna contour associated to the structure of an antenna system needs to attain.

For those antennas in which their physical properties come quite close to patch antennas, a value of $F_{21}$ being higher than 1.45, 1.47, 1.50, or 1.60 turns out to be a good measure for an expected improved bandwidth or gain with respect to a patch antenna without any complexity in at least one of the frequency bands. In the example of FIG. 12, a value of $F_{21}$ higher than 1.50 is preferred.

For a SMRT or MMT device a value of $F_{32}$ being larger than 1.50, 1.52, 1.55 or 1.60 is desirable. The phones which usually operate in high frequency bands such as UMTS and/or a wireless connectivity of around 2.4 GHz a higher value of $F_{32}$ can be used to appropriately adapt the antenna to a desired resonance frequency and/or bandwidth in those bands. In the example of FIG. 12, a value of $F_{32}$ higher than 1.55 is preferred.

Moreover, for MFWDs which have e.g. a camera or any other item such as a connector integrated in the antenna box, it is desirable to have a value of $F_{32}$ being larger than 1.56, 1.58, 1.60 or 1.63. Therefore, since in the example of FIG. 12 a connector and a microphone module are to be integrated in the antenna box alongside the antenna system, it is preferred to further increase the value of F32 to make it higher than 1.56.

Figure 18:
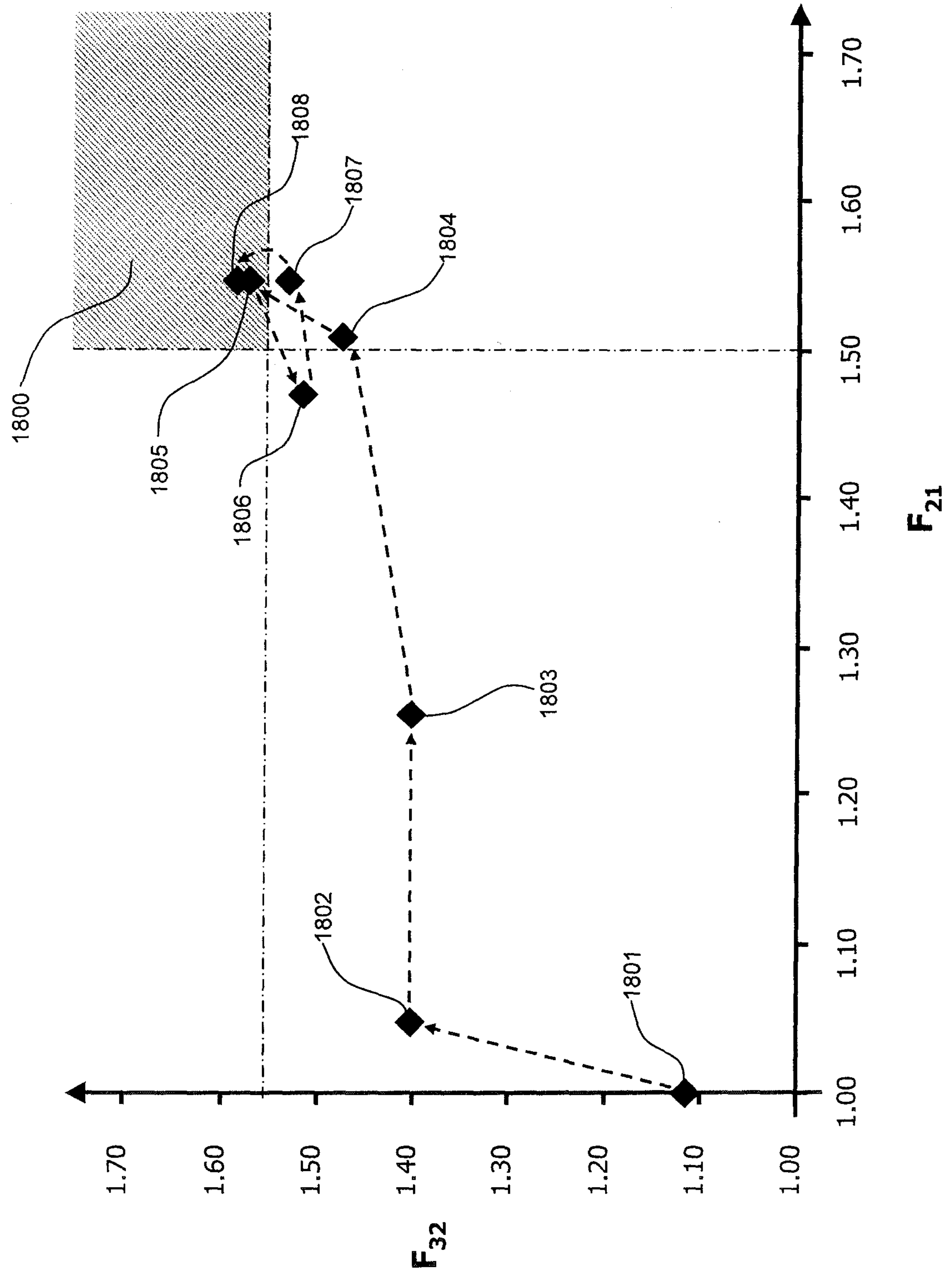
FIG. 18 is a complexity factor plain graphically illustrating the complexity factors of FIGS. 18A-18H.

In conclusion, it will be advantageous to shape the structure of the antenna 35 system in such a way that its antenna contour features complexity factor $F_{21}$ higher than 1.50 and $F_{32}$ higher than 1.56, thus defining a target region 1800 in the upper right part of the ($F_{21}$, $F_{32}$) plane in FIG. 18.

Referring now to FIG. 17, there is shown the progressive modification of the antenna contour as the structure of the antenna system through the different steps of the optimization process. As indicated by the designer of the MFWD, a feeding point to couple the RF transceiver that operates the GSM communication standard should be preferably located at point 1722, while a feeding point to couple the RF transceiver that operates the UMTS communication standard should be preferably located at point 1724. Furthermore, grounding points should be preferably located at points 1721 and 1723.

Table 2 lists for each step the number of cells of the first, second and third grids considered for the computation of the complexity factors of the antenna contour, 15 and the values of said complexity factors $F_{21}$, $F_{32}$.

TABLE 2

| Step | Cells Counted in First Grid ($N_1$) | Cells Counted in Second Grid ($N_2$) | Cells counted in Third Grid ($N_3$) | Complexity Factor $F_{21}$ | Complexity Factor $F_{32}$ |
|---|---|---|---|---|---|
| 0 | 12 | 24 | 52 | 1.00 | 1.12 |
| 1 | 15 | 31 | 82 | 1.05 | 1.40 |
| 2 | 13 | 31 | 82 | 1.25 | 1.40 |
| 3 | 13 | 37 | 103 | 1.51 | 1.48 |
| 4 | 13 | 38 | 113 | 1.55 | 1.57 |
| 5 | 13 | 36 | 103 | 1.47 | 1.52 |
| 6 | 13 | 38 | 110 | 1.55 | 1.53 |
| 7 | 13 | 38 | 114 | 1.55 | 1.58 |

Figure 17A:
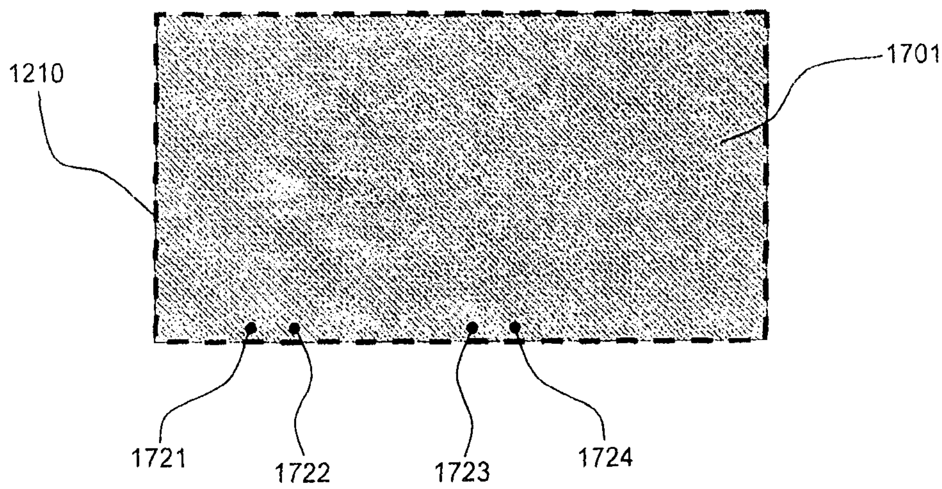
FIGS. 17A-17H illustrate the progressive modification of an antenna system through the different steps of the optimization process in accordance with the principles of the present invention.

As a starting point (step 0), the structure of the antenna system is simply a rectangular plate 1701 occupying the entire antenna rectangle 1210 and placed at the maximum distance allowed above the ground plane layer 1220 (see FIG. 17*a*). In this case the antenna contour is equal to the antenna rectangle 1210, and features complexity factors $F_{21}$=1.00 and $F_{32}$=1.12 (represented as point 1801 in FIG. 18), obviously outside the target region 1800.

Figure 17B:
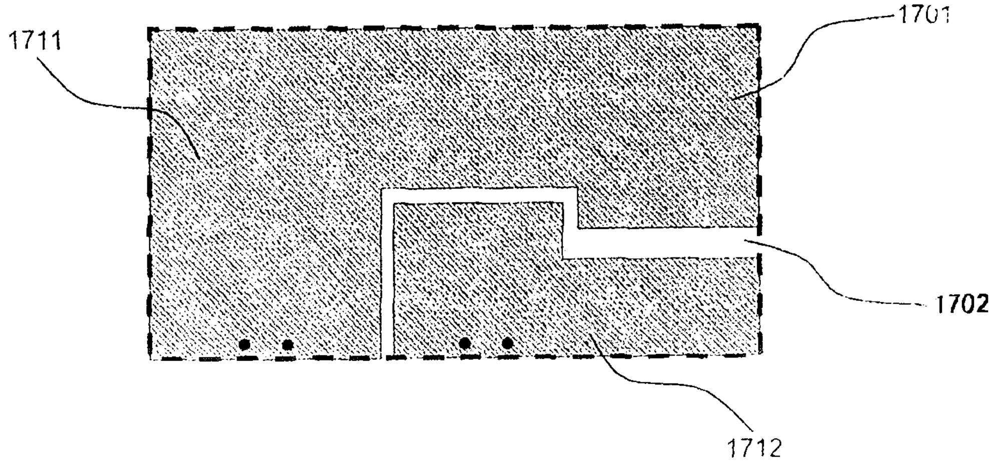

In the first iteration (step 1), a slot 1702 is practiced in the rectangular plate 1701, dividing said plate 1701 into two separate geometric elements: a larger antenna element 1711 and a smaller antenna element 1712, as shown in FIG. 17*b*. The larger antenna element 1711 will be coupled to the RF transceiver that operates the GSM communication standard, while the smaller antenna element 1712 will be coupled to the RF transceiver that operates the UMTS communication standard.

The slot 1702 increases the geometrical complexity of the antenna contour, mainly along the $F_{32}$ axis, mapping as point 1802 with coordinates $F_{21}$=1.05 and F32=1.40 on the ($F_{21}$, $F_{32}$) plane.

Figure 17C:
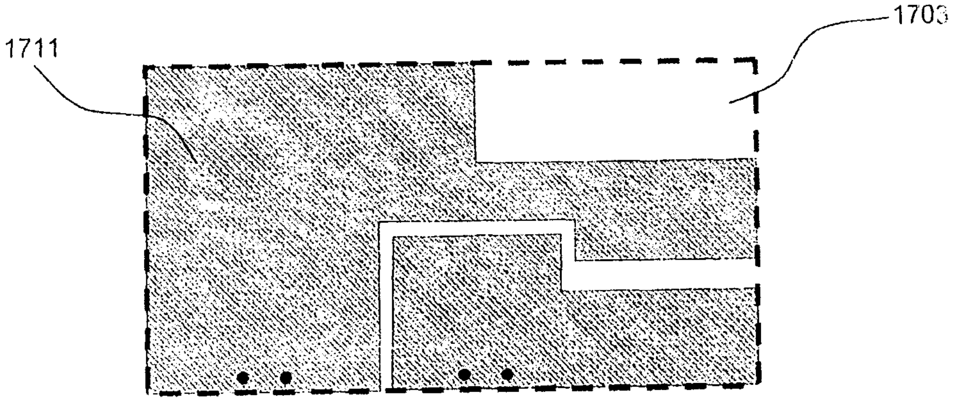

In order to offer a longer path to the electrical currents flowing on the antenna element 1711, particularly those currents responsible for a radiation mode associated to the lowest frequency band of said antenna system, the next iteration step (step 2) is initiated. An upper right portion of the antenna element 1711 is removed creating an opening 1703 (FIG. 17C). As it can be seen in Table 2, the effect sought when creating opening 1703 in the structure of the antenna system is directed towards enhancing the coarse complexity of the antenna contour (F21 increases from 1.05 to 1.25), while leaving its finer complexity unchanged. This modification accounts in FIG. 18 for the jump from point 1802 to 1803, still far from the target region 1800. A fringe benefit of creating the opening 1703 in the structure of the antenna system is that additional space within the MFWD, and in particular within the antenna box, is made available for the integration of other functional modules.

Figure 17D:
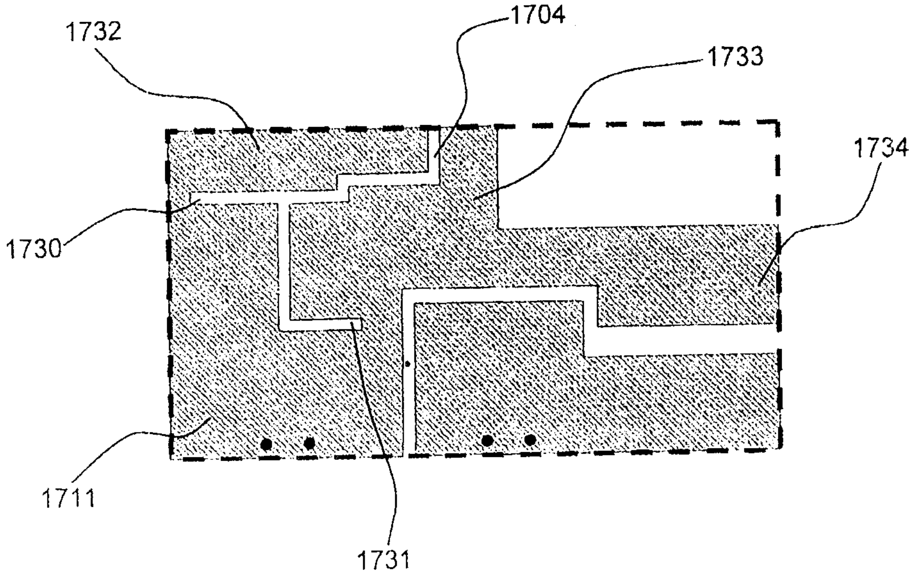

In the next iteration (step 3) a second slot is introduced in the structure of the antenna system (FIG. 17D). Slot 1704 is practiced in antenna element 1711 with the main purpose of creating different paths for the currents flowing on said antenna element, so that it can support several radiation modes. The slot 1704 intersects the perimeter of the antenna element 1711 and has two closed ends: a first end 1730 near the left side of the antenna rectangle, and a second end 1731. As a result, the antenna element 1711 comprises a first arm 1732, a second arm 1733, and a third arm 1734.

From Table 2 it can be seen that the complexity factor $F_{21}$ has been augmented to 1.51 in recognition of the improvement in the multiple frequency band and/or multiple radiation mode behavior of the structure shown in FIG. 17D. The convoluted shape of slot 1704 contributes also to an increase of complexity factor $F_{32}$, reaching the value of 1.48.

After step 3, the antenna contour corresponds to point 1804 on the ($F_{21}$, $F_{32}$) plane of FIG. 18. It can be noticed that while $F_{21}$ is already above the minimum value of 1.50, $F_{32}$ has not reached the minimum value of 1.56 yet.

Figure 17E:
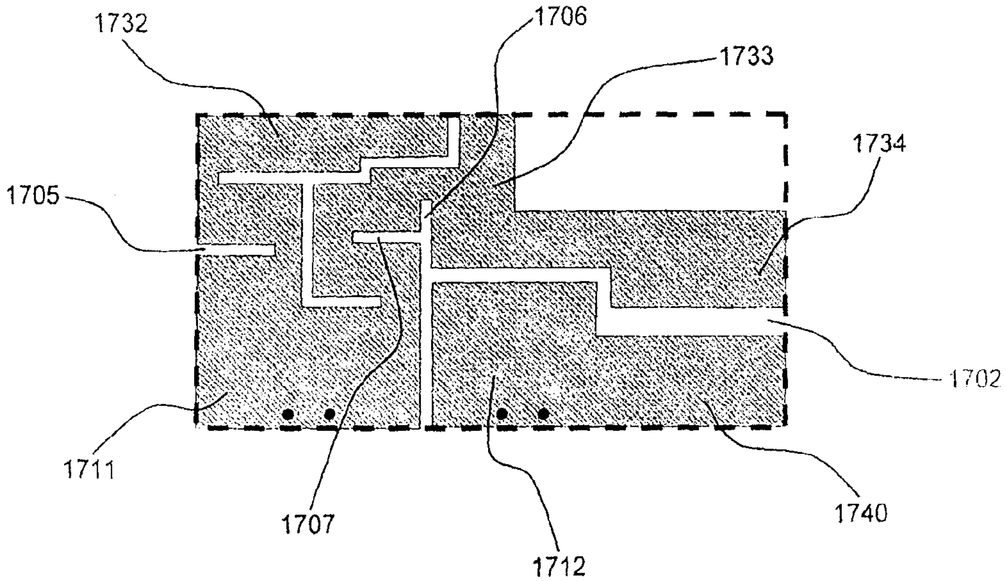
Figure 17F:
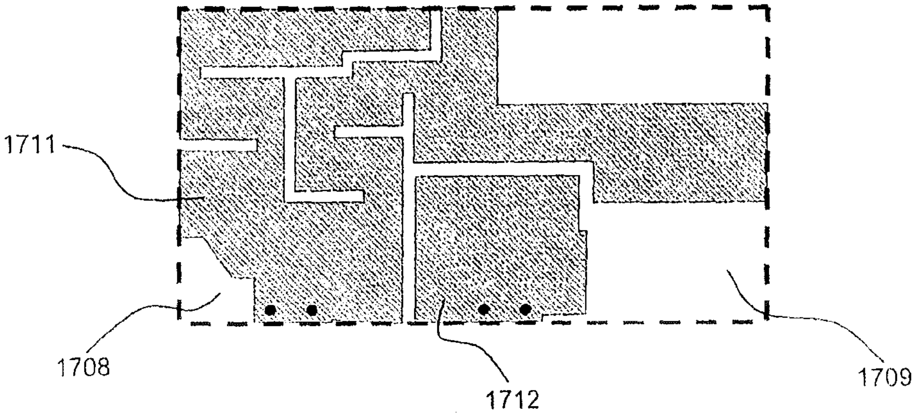
Figure 17G:
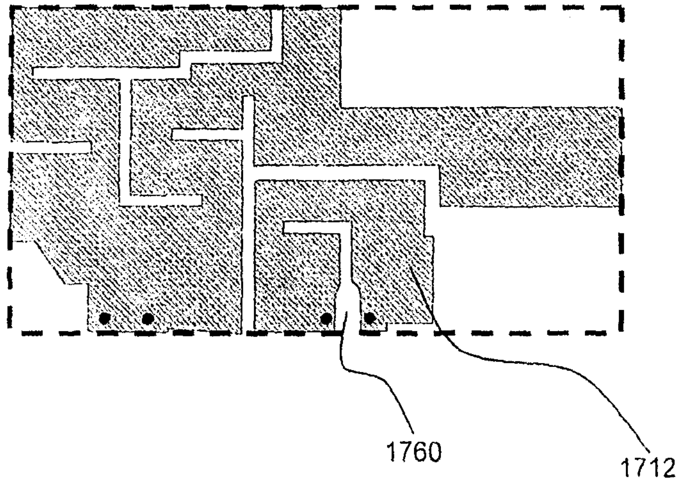
Figure 17H:
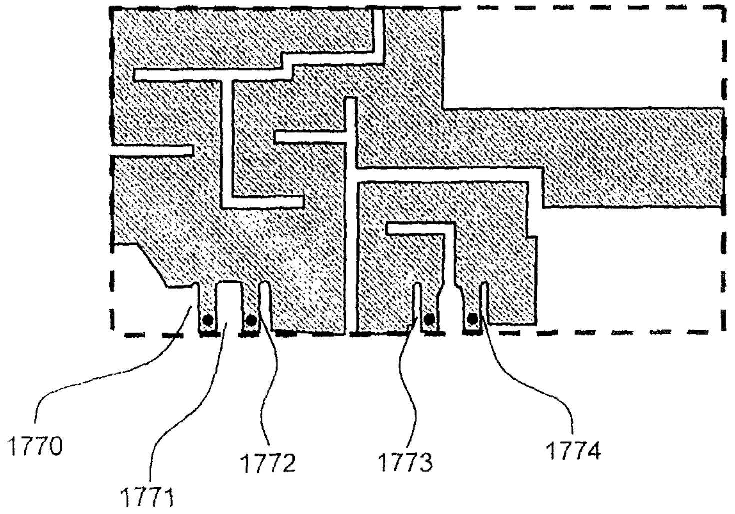

In order to increase the value of $F_{32}$ (step 4), three small slots 1705, 1706, 1707, are created in the structure of the antenna system, in particular in the antenna element 1711 (see FIG. 17E). Slots 1706 and 1707 are connected to slot 1702, introduced in the structure to separate the larger antenna element 1711 from the 15 smaller antenna element 1712. The slots 1705, 1706, 1707 are effective in providing a more winding path for the electrical currents flowing on the arms of antenna element 1711, hence increasing the degree of miniaturization of the resulting antenna system.

At this stage the antenna contour features complexity factors $F_{21}$=1.55 and $F_{32}$=1.57 and maps into point 1805 on the ($F_{21}$, $F_{32}$) plane of FIG. 18, clearly within the target region 1800.

However, the design in FIG. 17E is to be modified for mechanical reasons (step 5). A portion in the lower left corner of antenna element 1711 is to be removed (creating the opening 1708) in order for the antenna system to fit in its housing in the body of the MFVVD. Moreover in order to accommodate a connector and a microphone module, portion 1740 on the right side of the antenna element 1712 needs to be shortened and then bent 90 degrees downwards (i.e. towards the ground plane layer 1220) forming a capacitive load. Such a modification results in opening 1709.

Unfortunately, the changes introduced in step 5 lead to an antenna system whose antenna contour is no longer within the target region of the ($F_{21}$, $F_{32}$) plane 1800: $F_{21}$ has dropped to 1.47 (i.e., below 1.50) and $F_{32}$ to 1.52 (i.e., below 1.56), which corresponds to point 1806.

The detuning of the antenna system in its upper frequency band due mostly to the reduction in size of antenna element 1712 can be readily corrected by creating a slot 1760 in said antenna element 1712 (step 6), to increase the electrical length of said antenna element. With this modification, the antenna contour of FIG. 17G has fully restored the value of $F_{21}$ to 1.55, and partially that of $F_{32}$ (point 1807 in FIG. 18).

A final fine-tuning of the structure of the antenna system is performed at step 7 (FIG. 17H) aimed at restoring the level of $F_{32}$ to be within the target region 1800, in which small indentations 1770, 1771, 1772, 1773, 1774 are created in the proximity of the feeding points 1722, 1724 and grounding points 1721, 1723 of the antenna system. The final design of the antenna system has a structure whose antenna contour features $F_{21}$=1.55 and $F_{32}$=1.58 (represented as point 1808 in FIG. 18), well within the target region of the ($F_{21}$, $F_{32}$) plane 1800.

The typical performance of the antenna system of FIG. 12*a* (or FIG. 17*h*) is presented in FIG. 19.

Figure 19A:
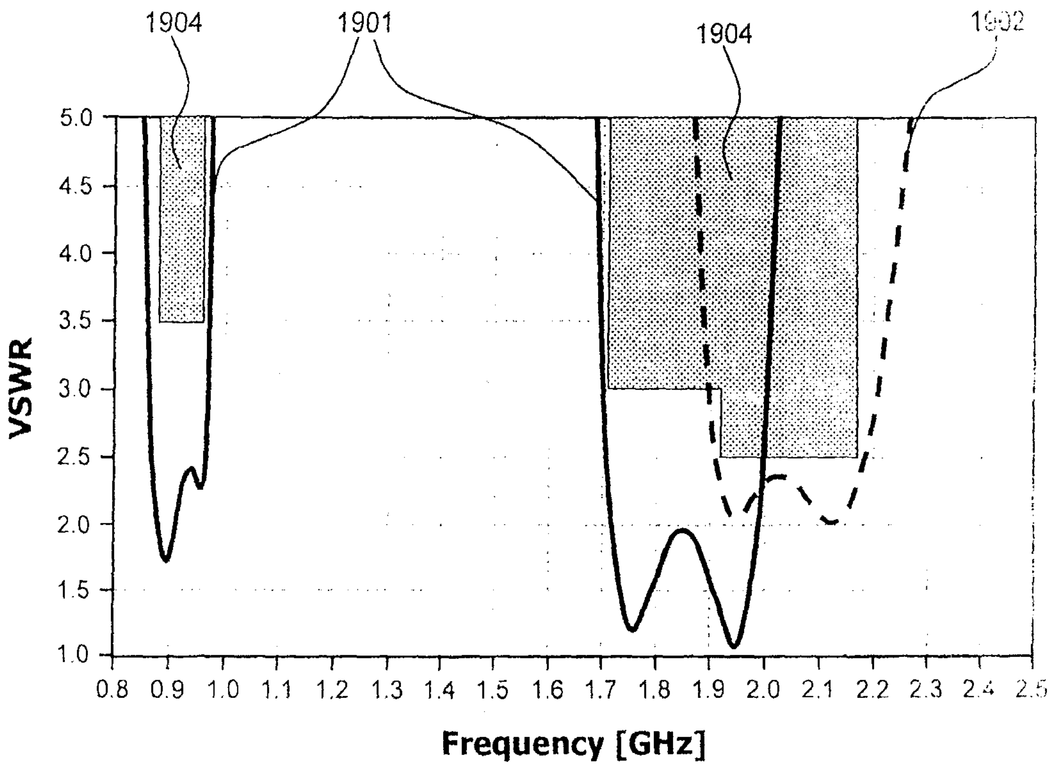
FIG. 19A is a graphical representation of the VSWR of the antenna system relative to frequency.

Referring specifically to FIG. 19A, there is shown the VSWR of the antenna system referred to an impedance of 50 Ohms as a function of the frequency. Solid curve 1901 represents the VSWR of antenna element 1711 (i.e., the antenna element coupled to the RF transceiver that operates the GSM communication standard), while dashed curve 1902 represents the VSWR of antenna element 1712 (i.e., the antenna element coupled to the RF transceiver that operates the UMTS communication standard). The shaded regions 1903 and 1904 correspond to the mask of maximum VSWR allowed constructed from the functional specifications provided in Table 1. As it can be observed in FIG. 19A, the VSWR curves 1901, 1902 are below the mask 1903, 1904 for all frequencies within the frequency bands of operation of the antenna system.

Figure 19B:
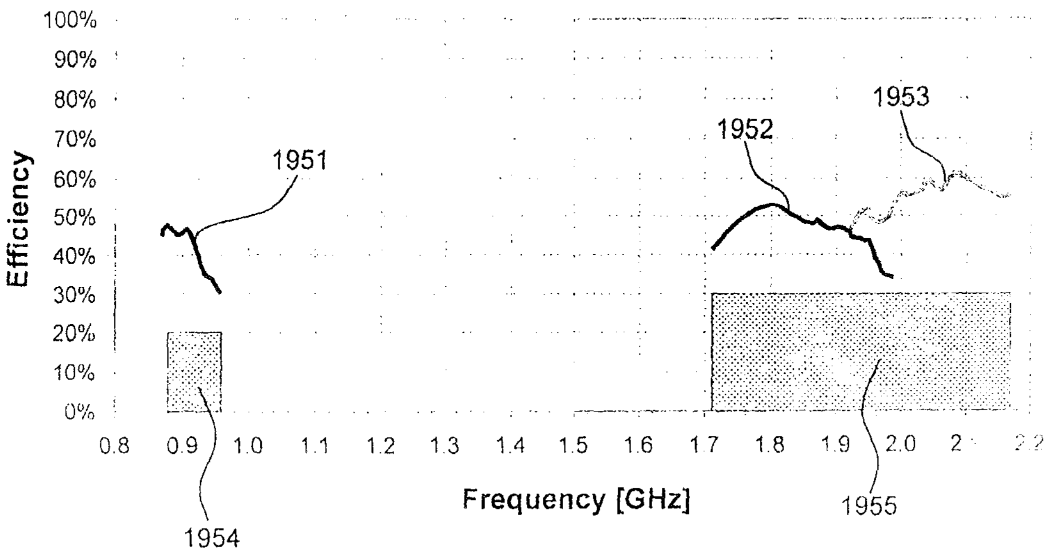
FIG. 19B is a graphical representation of the efficiency of the antenna system as a function of the frequency.

FIG. 19B shows the efficiency of the antenna system as a function of the frequency. Curve 1951 represents the efficiency of antenna element 1711 in the 900 MHz band of the GSM standard; curve 1952 represents the efficiency of antenna element 1711 in the 1800 MHz and 1900 MHz bands of the GSM standard; and curve 1953 represents the efficiency of antenna, element 1712 in the frequency band of the UMTS standard. The dashed regions 1954 and 1955 correspond to the mask of minimum efficiency required constructed from the functional specifications provided in Table 1. As it can be observed in FIG. 19*b*, the efficiency curves 1951, 1952, 1953 are above the mask 1954, 1955 for all frequencies within the frequency bands of operation of the antenna system.

FIGS. 20A-20F illustrate cross-sectional views of exemplary MFWDs comprising three bodies in which at least one body is rotated with respect to another body around two parallel axes.

Figure 20:
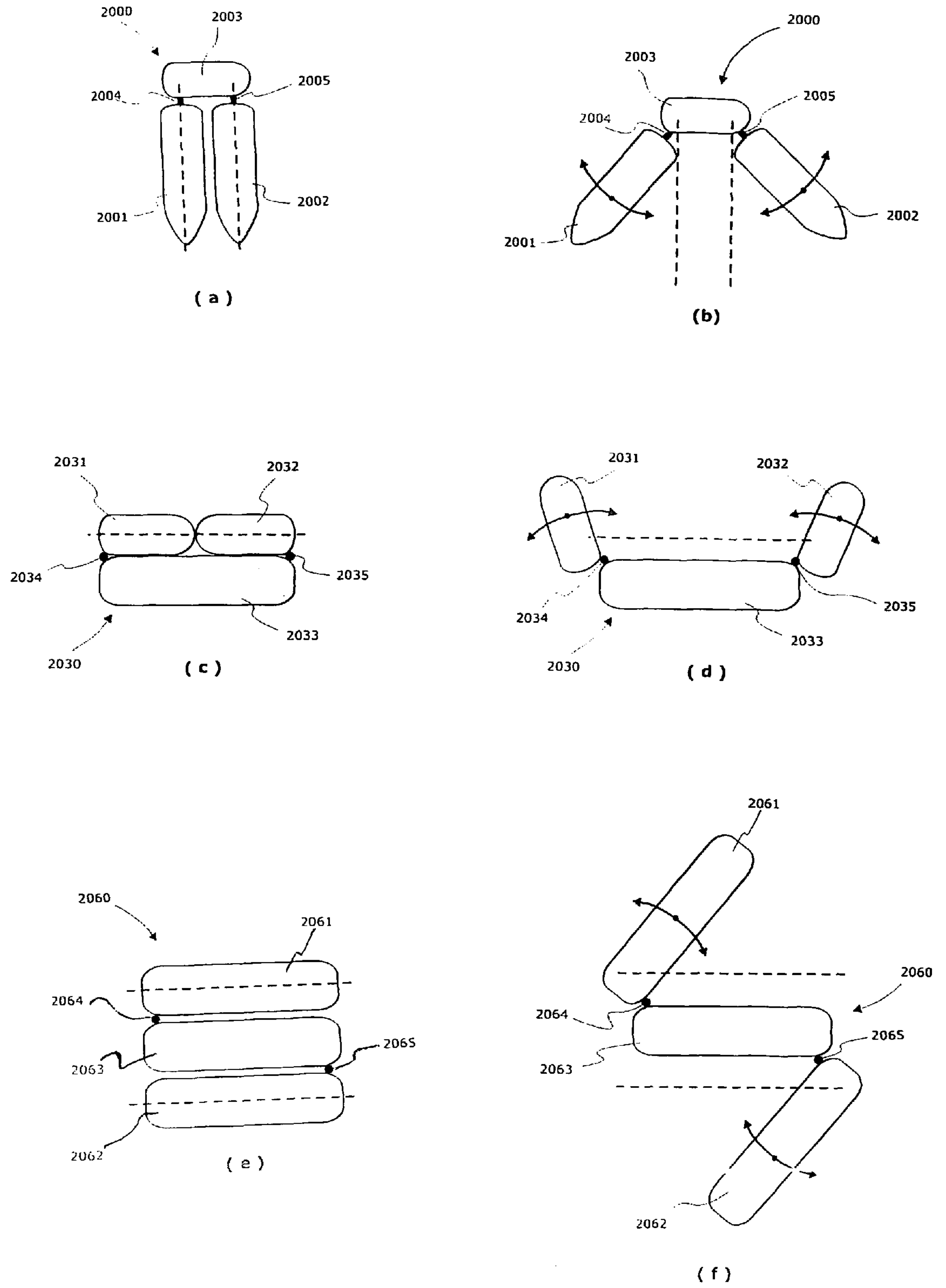
FIGS. 20A-20F illustrate cross-sectional views of exemplary MFWDs comprising three bodies.

FIGS. 20A-B illustrate a MFWD 2000 comprising a first body 2001, a second body 2002, and a third body 2003. A first connecting means 2004, such as, for example, a hinge, connects the first body 2001 to the third body 2003 and provides rotation of the first body 2001 around a first axis. A second connecting means 2005 connects the second body 2002 to the third body 2003 and provides rotation of the second body 2002 around a second axis. The first and second axes of rotation are parallel to each other and each of the axes is perpendicular to the cross-sectional plane of the figure. In this particular example, the third body 2003 is substantially smaller in size than the first and second bodies 2001, 2002 of the MFWD 2000.

FIG. 20A illustrates the three bodies 2001, 2002, 2003 of the MFWD 2000 in a closed (or folded) state. The dashed lines indicate the position occupied by the centers of the first body 2001 and that of the second body 2002 when they are in the closed state.

FIG. 20B illustrates the MFWD 2000 in a partially extended state. The first body 2001 and the second body 2002 are displaced with respect to a position they occupy in the closed state. The possible directions of rotation of the first body 2001 and the second body 2002 are indicated by the arrows.

FIGS. 20C-20D illustrate a MFWD 2030 comprising a first body 2031, a second body 2032, and a third body 2033. The MFWD 2030 further comprises a first connecting means 2034 connecting the first body 2031 to the third body 2033 and provides rotation of the first body 2031 around a first axis. The MFWD 2030 further comprises a second connecting means 2035 connecting the second body 2032 to the third body 2033 and provides rotation of the second body 2032 around a second axis. As shown in FIGS. 20A-20B, the first and second axes of rotation are parallel to each other.

In this particular example, the third body 2033 is substantially larger than the first and second bodies 2031, 2032 of the MFWD 2030, allowing the first body 2031 and the second body 2032 to be folded on top of the third body 2033 (and more generally on a same side of the third body 2033) when the MFWD 2030 is in its closed state, as illustrated in FIG. 20C. In some cases, the first body 2031 and the second body 2032 will be substantially equal in size, while in other cases, the first body 2031 and the second body 2032 will have substantially different dimensions.

FIG. 20D illustrates the MFWF 2030 in a partially extended state. In the partially extended state, the first body 2031 is rotated around the first rotation axis provided by the first connecting means 2034, while the second body 2032 is rotated around the second rotation axis provided by the second connecting means 2035.

A third example of a MFWD is presented in FIG. 20E-F, in which the MFWD 2060 comprises a first body 2061, a second body 2062, and a third body 2063. According to this example, the first, second, and third bodies 2061, 2062, 2063 can be selectively folded and unfolded by means of a first connecting means 2064 and a second connecting means 2065.

FIG. 20E illustrates the MFWD 2060 in a closed state. In this example, the first body 2061 is located on top of the third body 2063 while the second body 2062 is located below the third body 2063 (and more generally on an opposite side of the third body 2063).

The MFWD 2060 can be extended to its maximum size state by rotating the first body 2061 around a first rotation axis provided by the first connecting means 2064 and rotating the second body 2062 around a first rotation axis provided by the second connecting means 2065. FIG. 20F represents the MFWD 2060 in a partially extended state. The directions of rotation of the first body 2061 and the second body 2062 are indicated by means of the arrows shown in FIG. 20F.

As can be seen from the various examples and explanations above the use of the complexity factor $F_{21}$ and $F_{32}$ in accordance with the principles of the present invention are very useful in the design of MFWD devices and, in particular, multiband antennas for such devices. The choice of certain complexity factor ranges to optimize both the miniaturization of the antenna as well as the multiband and RF performance characteristics, all in accordance with the principles of the invention, should be clear to one of ordinary skill in the art from the above explanations.

The previous Detailed Description is of embodiment(s) of the invention. The scope of the invention should not necessarily be limited by this Description. The scope of the invention is instead defined by the following claims and the equivalents thereof.

What is claimed is:

1. A handheld multifunction wireless device having at least one of multimedia functionality and smartphone functionality, the handheld multifunction wireless device comprising:

a touch screen;

a geolocalization system; and an antenna system comprising a ground plane layer and three antenna elements within the handheld multifunction wireless device, the handheld multifunction wireless device being configured to transmit and receive signals from at least four frequency bands, each of the at least four frequency bands being used by at least one communication standard, the antenna system comprising:

a first antenna element having a conductive plate configured to simultaneously support radiation modes for at least first, second and third of the at least four frequency bands; and a second antenna element configured to receive signals from a 4 G communication standard, wherein a perimeter of the second antenna element defines an antenna contour having a level of complexity defined by complexity factor $F_{21}$ having a value of at least 1.20 and complexity factor $F_{32}$ having a value less than 1.75.

2. The handheld multifunction wireless device of claim 1, wherein the first frequency band is contained within 810-960 MHz frequency range, the second frequency band is contained within 1710-1990 MHz frequency range, and the third frequency band is contained within 1900-2170 MHz frequency range.

3. The handheld multifunction wireless device of claim 1, wherein the first antenna element is proximate to a short side of a ground plane rectangle defined by the ground plane layer, and the second antenna element is proximate to a short side of the ground plane rectangle.

4. The handheld multifunction wireless device of claim 1, wherein the first antenna element is proximate to a short side of a ground plane rectangle defined by the ground plane layer, and the second antenna element is proximate to a long side of the ground plane rectangle.

5. The handheld multifunction wireless device of claim 1, wherein the third antenna element is configured to operate in a fifth frequency band within 2400-2480 MHz frequency range.

6. A handheld multifunction wireless device having at least one of multimedia functionality and smartphone functionality, the handheld multifunction wireless device comprising:

a touch screen;

a microprocessor and an operating system adapted to permit running of word-processing, spreadsheet, and slide software applications;

an image recording system comprising an at least two-Megapixel image sensor;

an antenna system within the handheld multifunction wireless device and configured to operate in at least five frequency bands, the antenna system comprising:

a ground plane layer;

a first antenna element having a conductive plate configured to support first, second, and third radiation modes respectively providing first, second, and third paths for current respectively associated with first, second, and third frequencies bands, the first, the second, and the third radiation modes overlapping at least partially with each other, the first frequency band being contained within a first frequency region of an electromagnetic spectrum, the second and the third frequency bands being contained within a second frequency region of the electromagnetic spectrum that is higher in frequency than the first frequency region; and a second antenna element configured to operate in at least one frequency band, the at least one frequency band being used by a 4 G communication standard, wherein:

a perimeter of the first antenna element defines a first antenna contour having a level of complexity defined by first complexity factor $F_{21}$ having a value of at least 1.20 and first complexity factor $F_{32}$ having a value less than 1.75; and a perimeter of the second antenna element defines a second antenna contour having a level of complexity defined by second complexity factor $F_{21}$ having a value of at least 1.20 and second complexity factor $F_{32}$ having a value less than 1.75.

7. The handheld multifunction wireless device of claim 6, wherein the first antenna element is configured to transmit and receive signals from a 4 G communication standard.

8. The handheld multifunction wireless device of claim 6, wherein the first antenna contour comprises at least thirty-five segments.

9. The handheld multifunction wireless device according to claim 8, wherein the second antenna contour comprises at least twenty segments.

10. The handheld multifunction wireless device according to claim 6, wherein the first antenna contour comprises at least two disjointed subsets of segments, each of the at least two subsets of segments comprising at least ten segments.

11. The handheld multifunction wireless device according to claim 6, wherein the handheld multifunction wireless device comprises a third antenna configured to operate in a frequency band within 2400-2480 MHz frequency range.

12. A handheld multifunction wireless device having at least one of multimedia functionality and smartphone functionality, the handheld multifunction wireless device comprising:

a touch screen;

a processing module;

a memory module;

a communication module;

a power management module;

an antenna system within the handheld multifunction wireless device and comprising:

a ground plane layer;

a first antenna element configured to simultaneously support radiation modes for first, second, and third frequency bands, the first frequency band being contained within a first frequency region of an electromagnetic spectrum, the second frequency band being contained within a second frequency region of the electromagnetic spectrum that is higher in frequency than the first frequency region, the third frequency band of operation being used by a 4 G communication standard, wherein a perimeter of the first antenna element defines a first antenna contour comprising at least thirty-five segments, the first antenna element defining an antenna box, an orthogonal projection of the antenna box along a normal to a face with a largest area of the antenna box defining an antenna rectangle, wherein a length of the first antenna contour is greater than four times a diagonal of the antenna rectangle; and a second antenna element configured to operate in at least one frequency band used by a 4 G communication standard, wherein a perimeter of the second antenna element defines a second antenna contour comprising at least twenty segments.

13. The handheld multifunction wireless device according to claim 12, wherein the communication module is configured to simultaneously transmit signals from a CDMA communication standard, a WiFi communication standard, and a 4 G communication standard.

14. The handheld multifunction wireless device according to claim 12, wherein each of the first frequency band and the second frequency band is used by at least one communication standard selected from: GSM, UMTS, CDMA, and W-CDMA.

15. The handheld multifunction wireless device according to claim 12, wherein the ground plane layer defines a ground plane rectangle, the projection of the antenna rectangle on the ground plane rectangle partially overlapping the ground plane rectangle.

16. A handheld multifunction wireless device having at least one of multimedia functionality and smartphone functionality, the handheld multifunction wireless device comprising:

a touch screen;

a microprocessor;

at least one memory module; and a communication module configured to operate in a first frequency band used by at least one communication standard and contained within a first frequency region of an electromagnetic spectrum, in a second frequency band used by at least one communication standard and contained within a second frequency region of the electromagnetic spectrum that is higher in frequency than the first frequency region, and in a third frequency band used by a 4 G communication standard;

the communication module comprising an antenna system within the handheld multifunction wireless device having at least a first and a second antenna elements and a ground plane layer, the first antenna element being configured to transmit and receive signals from a 4 G communication standard, and the second antenna element being configured to receive signals from a 4 G communication standard, wherein:

the ground plane layer defines a ground plane rectangle;

the first antenna element is proximate to a first short side of the ground plane rectangle;

the second antenna element is proximate to a second short side of the ground plane rectangle; and a perimeter of the second antenna element defines an antenna contour having a level of complexity defined by complexity factor $F_{21}$ having a value of at least 1.20 and complexity factor $F_{32}$ having a value less than 1.75.

17. The handheld multifunction wireless device according to claim 16, wherein an antenna box is defined by the first antenna element, an antenna rectangle is defined by an orthogonal projection of the antenna box along a normal to a face with a largest area of the antenna box, and wherein a longer side of said antenna rectangle is substantially parallel to the first short side of the ground plane rectangle.

18. The handheld multifunction wireless device according to claim 16, wherein the first frequency region is delimited by 810-960 MHz frequency range, and the second frequency region is delimited by 1710-1990 MHz frequency range.

19. The handheld multifunction wireless device according to claim 16, wherein the complexity factor $F_{21}$ has a value less than 1.45.

20. The handheld multifunction wireless device according to claim 16, wherein the handheld multifunction wireless device is configured to use the first antenna element and the second antenna element as a diversity system.

* * * * *